United States Patent [19]

Uramoto et al.

[11] Patent Number: 5,400,087
[45] Date of Patent: Mar. 21, 1995

[54] MOTION VECTOR DETECTING DEVICE FOR COMPENSATING FOR MOVEMENTS IN A MOTION PICTURE

[75] Inventors: Shinichi Uramoto, Hyogo; Mitsuyoshi Suzuki, Kanagawa; Akihiko Takabatake, Hyogo, all of Japan

[73] Assignee: Mitsubishi Denki Kabushiki Kaisha, Tokyo, Japan

[21] Appl. No.: 85,952

[22] Filed: Jul. 6, 1993

[30] Foreign Application Priority Data

| Jul. 6, 1992 | [JP] | Japan | 4-178399 |
| Aug. 13, 1992 | [JP] | Japan | 4-215966 |
| May 6, 1993 | [JP] | Japan | 5-105432 |

[51] Int. Cl.⁶ ............................................. H04N 7/137
[52] U.S. Cl. ..................................... 348/699; 348/402
[58] Field of Search ........................ 348/699, 402; H04N 7/137

[56] References Cited

U.S. PATENT DOCUMENTS

| 4,777,530 | 10/1988 | Kondo . | |
| 4,937,666 | 6/1990 | Yang . | |
| 5,072,293 | 12/1991 | De Haan et al. . | |
| 5,142,361 | 8/1992 | Tayama | 348/699 |
| 5,173,771 | 12/1992 | Kitazato . | |
| 5,276,513 | 1/1994 | van der Wal | 348/699 |
| 5,280,351 | 1/1994 | Wilkinson | 348/699 |

FOREIGN PATENT DOCUMENTS

| 309251 | 3/1989 | European Pat. Off. . |
| 395293 | 10/1990 | European Pat. Off. . |
| 415737 | 3/1991 | European Pat. Off. . |
| 479511 | 4/1992 | European Pat. Off. . |
| 4023449 | 1/1992 | Germany . |
| 1295379 | 11/1989 | Japan . |
| 2214751 | 9/1989 | United Kingdom . |
| WO89/08891 | 9/1989 | WIPO . |

OTHER PUBLICATIONS

Foreign Official Action with English language translation.

"A Family of VLSI Designs for the Motion Compensation Block-Matching Algorithm", Kun-Min Yang, IEEE Transactions on Circuits and System, 36 No. 10, Oct. 1989, pp. 1317–1325.

"A Flexible Motion–Vector Estimation Chip for Real–Time Video Codecs", Kun-Min Yang et al, IEEE 1990 Custom Integrated Circuit Conference.

"Very High Efficiency VLSI Chip-Pair for Full Search Block Matching with Fractional Precision", Kun-Min Yang et al., 1989 IEEE.

"A Study on Internal Data Memory of DSP for Motion Compensation", K. Ishihara et al., 1992 Institute of Electronics, Information, Communication and Electric Engineers of Japan, Spring National Conference.

"A Versatile and Powerful Chip for Real Time Motion Estimation", A Artieri, ICASSP '89, IEEE 1989, pp. 2453–2456.

*Primary Examiner*—Howard W. Britton
*Attorney, Agent, or Firm*—Lowe, Price, LeBlanc & Becker

[57] ABSTRACT

A motion vector detector includes a processor array having a plurality of processing elements arranged in a two dimensional array. Each of the processing elements includes storage elements for storing search window data of a reference frame and associated template block date of a current frame and a circuit for obtaining an absolute difference of the stored search window data and template data. Each processing element shifts the stored data to an adjacent processing element in a one-way direction on a data transfer path. The processing elements shift the stored search window data while holding the template block data. A displacement vector is calculated in each cycle of the shifting of the search window data by a summation unit receiving outputs of the processing elements in parallel. A comparison unit receives outputs of the summation unit to detect a motion-vector for the template block.

45 Claims, 69 Drawing Sheets

| PE 0 | PE 8 | PE 16 | PE 24 | PE 32 | PE 40 | PE 48 | PE 56 |
|---|---|---|---|---|---|---|---|
| PE 1 | PE 9 | PE 17 | PE 25 | PE 33 | PE 41 | PE 49 | PE 57 |
| PE 2 | PE 10 | PE 18 | PE 26 | PE 34 | PE 42 | PE 50 | PE 58 |
| PE 3 | PE 11 | PE 19 | PE 27 | PE 35 | PE 43 | PE 51 | PE 59 |
| PE 4 | PE 12 | PE 20 | PE 28 | PE 36 | PE 44 | PE 52 | PE 60 |
| PE 5 | PE 13 | PE 21 | PE 29 | PE 37 | PE 45 | PE 53 | PE 61 |
| PE 6 | PE 14 | PE 22 | PE 30 | PE 38 | PE 46 | PE 54 | PE 62 |
| PE 7 | PE 15 | PE 23 | PE 31 | PE 39 | PE 47 | PE 55 | PE 63 |

FIG.18

| $a_{0,0}$ | $a_{0,1}$ | $a_{0,2}$ | $a_{0,3}$ | $a_{0,4}$ | $a_{0,5}$ | $a_{0,6}$ | $a_{0,7}$ |
|---|---|---|---|---|---|---|---|
| $a_{1,0}$ | $a_{1,1}$ | $a_{1,2}$ | $a_{1,3}$ | $a_{1,4}$ | $a_{1,5}$ | $a_{1,6}$ | $a_{1,7}$ |
| $a_{2,0}$ | $a_{2,1}$ | $a_{2,2}$ | $a_{2,3}$ | $a_{2,4}$ | $a_{2,5}$ | $a_{2,6}$ | $a_{2,7}$ |
| $a_{3,0}$ | $a_{3,1}$ | $a_{3,2}$ | $a_{3,3}$ | $a_{3,4}$ | $a_{3,5}$ | $a_{3,6}$ | $a_{3,7}$ |
| $a_{4,0}$ | $a_{4,1}$ | $a_{4,2}$ | $a_{4,3}$ | $a_{4,4}$ | $a_{4,5}$ | $a_{4,6}$ | $a_{4,7}$ |
| $a_{5,0}$ | $a_{5,1}$ | $a_{5,2}$ | $a_{5,3}$ | $a_{5,4}$ | $a_{5,5}$ | $a_{5,6}$ | $a_{5,7}$ |
| $a_{6,0}$ | $a_{6,1}$ | $a_{6,2}$ | $a_{6,3}$ | $a_{6,4}$ | $a_{6,5}$ | $a_{6,6}$ | $a_{6,7}$ |
| $a_{7,0}$ | $a_{7,1}$ | $a_{7,2}$ | $a_{7,3}$ | $a_{7,4}$ | $a_{7,5}$ | $a_{7,6}$ | $a_{7,7}$ |

|   | 16 PIXELS |  |  |  |  |  |  |  |
|---|---|---|---|---|---|---|---|---|
|   | b 0,0 | b 0,1 | b 0,2 | b 0,3 | ------ | b 0,13 | b 0,14 | b 0,15 |
|   | b 1,0 | b 1,1 | b 1,2 | b 1,3 | ------ | b 1,13 | b 1,14 | b 1,15 |
|   | b 2,0 | b 2,1 | b 2,2 | b 2,3 | ------ | b 2,13 | b 2,14 | b 2,15 |
| 24 PIXELS | b 3,0 | b 3,1 | b 3,2 | b 3,3 | ------ | b 3,13 | b 3,14 | b 3,15 |
|   | ⋮ | ⋮ | ⋮ | ⋮ | ⋮ | ⋮ | ⋮ | ⋮ |
|   | b 21,0 | b 21,1 | b 21,2 | b 21,3 | ------ | b 21,13 | b 21,14 | b 21,15 |
|   | b 22,0 | b 22,1 | b 22,2 | b 22,3 | ------ | b 22,13 | b 22,14 | b 22,15 |
|   | b 23,0 | b 23,1 | b 23,2 | b 23,3 | ------ | b 23,13 | b 23,14 | b 23,15 |

FIG. 47

| | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|
| 7 | 1 | 2 | 3 | 4 | 5 | 6 | 7 | 8 | 7 | 6 | 5 | 4 | 3 | 2 | 1 |
| 6 | 2 | 3 | 4 | 5 | 6 | 7 | 8 | 9 | 8 | 7 | 6 | 5 | 4 | 3 | 2 |
| 5 | 3 | 4 | 5 | 6 | 7 | 8 | 9 | 10 | 9 | 8 | 7 | 6 | 5 | 4 | 3 |
| 4 | 4 | 5 | 6 | 7 | 8 | 9 | 10 | 11 | 10 | 9 | 8 | 7 | 6 | 5 | 4 |
| 3 | 5 | 6 | 7 | 8 | 9 | 10 | 11 | 12 | 11 | 10 | 9 | 8 | 7 | 6 | 5 |
| 2 | 6 | 7 | 8 | 9 | 10 | 11 | 12 | 13 | 12 | 11 | 10 | 9 | 8 | 7 | 6 |
| 1 | 7 | 8 | 9 | 10 | 11 | 12 | 13 | 14 | 13 | 12 | 11 | 10 | 9 | 8 | 7 |
| 0 | 8 | 9 | 10 | 11 | 12 | 13 | 14 | 15 | 14 | 13 | 12 | 11 | 10 | 9 | 8 |
| -1 | 7 | 8 | 9 | 10 | 11 | 12 | 13 | 14 | 13 | 12 | 11 | 10 | 9 | 8 | 7 |
| -2 | 6 | 7 | 8 | 9 | 10 | 11 | 12 | 13 | 12 | 11 | 10 | 9 | 8 | 7 | 6 |
| -3 | 5 | 6 | 7 | 8 | 9 | 10 | 11 | 12 | 11 | 10 | 9 | 8 | 7 | 6 | 5 |
| -4 | 4 | 5 | 6 | 7 | 8 | 9 | 10 | 11 | 10 | 9 | 8 | 7 | 6 | 5 | 4 |
| -5 | 3 | 4 | 5 | 6 | 7 | 8 | 9 | 10 | 9 | 8 | 7 | 6 | 5 | 4 | 3 |
| -6 | 2 | 3 | 4 | 5 | 6 | 7 | 8 | 9 | 8 | 7 | 6 | 5 | 4 | 3 | 2 |
| -7 | 1 | 2 | 3 | 4 | 5 | 6 | 7 | 8 | 7 | 6 | 5 | 4 | 3 | 2 | 1 |

MOTION VECTOR DETECTING DEVICE FOR COMPENSATING FOR MOVEMENTS IN A MOTION PICTURE

BACKGROUND OF THE INVENTION

Field of the Invention

The present invention relates to a device for detecting a motion vector used in compensating for movements in a motion picture.

Description of the Background Art

For transmission and storage of image signals having a large amount of data, data compression technique for reducing the amount of data is indispensable. Image data have a great degree of redundancy due to correlationship between adjacent pixels and perception characteristics of the human being. This data compression technique for suppressing redundancy of data to reduce the amount of transmission data is called high efficiency coding. Interframe predictive coding is known as one of the high efficiency coding system. Interframe predictive coding is set forth in the following.

Prediction error is calculated which is the difference between each pixel data in the current frame to be coded and each pixel data of the corresponding position in the preceding frame to be referred to. This calculated prediction error is used in the subsequent coding process. This system is advantageous of coding in high efficiency the pictures that have little movement on account of its high correlation between frames. However, there is a problem that the error is great for pictures having significant movements due to its low correlation between frames, which increases the amount of data to be transmitted.

An interframe predictive coding system with motion compensation is known to solve the above-described problem. According to this system, a motion vector is calculated in advance using pixel data of a current frame and a preceding frame before the calculation of a prediction error. The prediction picture of the preceding frame is moved according to the calculated motion vector. More specifically, a reference pixel which is the pixel data in a position shifted by a motion vector in the preceding frame is used as an estimation value. Then, the prediction error of each pixel between the moved preceding frame and the current frame is calculated, and the prediction error and the motion vector are transmitted.

FIG. 92 is a block diagram of a structure of an encoder for coding picture data according to a conventional predictive coding system with motion compensation. Referring to FIG. 92, an encoder includes a preprocessing circuit 910 for executing a predetermined pre-process to an input picture signal, a source coding circuit 912 for removing redundancy and executing quantization with respect to a pre-processed signal from pre-processing circuit 910, a video multiplex coding circuit 914 for coding according to a predetermined format and multiplexing into a code train of a predetermined data structure a signal from source coding circuit 912.

Pre-processing circuit 910 uses time and spatial filters to convert an input picture signal into a common intermediate format (CIF) and applies a filter process for removing noise.

Source coding circuit 912 carries out an orthogonal transform process such as a discrete cosine transform (DCT) to a supplied signal, compensates for movement with respect to the input signal, and quantizes the orthogonal transformed picture data.

Video multiplex coding circuit 914 applies two dimensional variable length coding with respect to a supplied picture signal, and also carries out variable length coding to each of the various attributes (such as motion vector) of a block which is the data processing unit, followed by multiplexing the same into a code train of a predetermined data structure.

The encoder further includes a transmission buffer 916 for buffering picture data from video multiplex coding circuit 914, and a transmission coding circuit 918 for adapting picture data from transmission buffer 916 to the transmission channel.

Transmission buffer 916 smooths the information generating speed to a constant rate. Transmission coding circuit 918 carries out addition of an error correction bit and an audio signal data.

FIG. 93 shows a specific structure of the source coding circuit shown in FIG. 92. Referring to FIG. 93, the source coding circuit includes a motion compensation predictor 920 for detecting a motion vector for an input picture signal to generate a motion compensated reference pixel according to the detected motion vector, a loop filter 922 for applying a filter process to the reference pixel data from motion compensation predictor 920, a subtractor 924 for obtaining the difference between an output of loop filter 922 and an input picture signal, an orthogonal transformer 926 for applying orthogonal transform to the output of subtractor 924, and a quantizer 928 for applying quantization to the orthogonal transformed data from orthogonal transformer 926.

Motion compensation predictor 920 of which structure will be described in details afterwards includes a frame memory for storing pixel data of the very preceding frame, whereby a motion vector is detected according to an input picture signal data and the pixel data in the frame memory to generate reference pixel data having the motion compensated for. Loop filter 922 is provided for the purpose of improving picture quality.

Orthogonal transformer 926 carries out orthogonal transform such as DCT transform to data from subtractor 924 in a unit of a block of a predetermined size (generally, 8×8 pixels). Quantizer 928 applies quantization to the orthogonal transformed pixel data.

By motion compensation predictor 920 and subtractor 924, interframe predictive coding with motion compensation is carried out to remove time redundancy in a motion picture signal. Furthermore, by an orthogonal transform of orthogonal transformer 926, spatial redundancy in a motion picture signal is removed.

The source coding circuit further includes an inverse quantizer 930 for converting the signal state of the data quantized by quantizer 928 to its pre-quantized state, an inverse orthogonal transformer 932 for carrying out inverse orthogonal transform to the output of inverse quantizer 930, and an adder 934 for adding the outputs of loop filter 922 and inverse orthogonal transformer 932. A picture used for interframe prediction for the next frame is generated by inverse quantizer 930 and inverse orthogonal transformer 932. The generated picture data is written into the frame memory in motion compensation predictor 920. Since an input picture signal (interframe differential data) is added, data of the current frame is reproduced. In general, this inverse quantization process, inverse orthogonal transform process, and adding process are called a local decoding procedure.

The calculation of a motion vector will be described in details hereinafter. In general, a block matching method is used for calculating a motion vector.

Referring to FIG. 94A, a case is considered where a picture A in the (m-1)th frame is displaced as a picture A' in the m-th frame. In the block matching method, a picture (1 frame) is divided into blocks of P×Q pixels (generally P=Q). A block closest to the block of interest in the current frame is searched from the preceding frame. This displacement from the block of interest to the closest block in the preceding frame is called the motion vector.

Referring to FIG. 94B, it is assumed that the m-th frame is the frame to be coded. The frame is divided into blocks of N×N pixels. It is assumed that the value of the pixel data in the left upmost pixel position (Nk, Nl) in the block of N×N pixels in the m-th frame is Xm (Nk, Nl). The sum of the absolute difference of the preceding frame having the pixel position displaced by position (i, j) and the block of the current frame is obtained. Varying the value of displacement (i, j), respective sums of the absolute difference are obtained. The position (i, j) that yields the smallest value of the absolute difference sum is called the motion vector.

It is necessary to transmit one motion vector per 1 pixel block. If the block size is reduced, the transmission information is increased to prevent effective data compression. If the block size is increased, effective detection of a motion vector will become difficult. Here, the block size is set to 16×16 pixels, and the motion vector search range (maximum varied width of i, j) is set to the level of −15 to +15 pixels. Calculation of a motion vector according to a block matching method will be described in details hereinafter.

FIG. 95 is a diagram for describing the motion vector calculation method according to the block matching method. A picture 950 of 352 dots×288 lines is taken as an example. Picture 950 is divided into blocks with a pixel group of 16×16 as 1 block. Detection of a motion vector is carried out in this unit of a block. It is assumed that a search block 956 (referred to as a "search area" hereinafter) is a block area including ±16 pixels in the horizontal and vertical directions of a block 954 which is a block in the preceding frame at a position corresponding to a block 952 subjected to detection (referred to as a "template block" hereinafter). In other words, a search block 956 formed of 48×48 pixels centering about block 954 is set as the search area. Search of a motion vector with respect to template block 952 is carried out within this search area. Detection of a motion vector according to the block matching method includes the following steps.

A predictive image block (indicated by (i, j) in FIG. 95) having a displacement corresponding to a candidate of a motion vector is obtained. Then, an evaluation function value such as a sum of the absolute difference (or sum of squared differences) of the pixels of the obtained block and those at a corresponding position of the template block is obtained.

The above-described operation is carried out for all displacements (i, j) in the range of (−16, −16) to (+16, +16). When the evaluation functions (evaluation values) for all the predictive picture blocks are obtained, the predictive picture block having the minimum evaluation function is detected. From the block (block 954 indicated by (0, 0) in FIG. 95) of a position identical in the template block (referred to as the true backside hereinafter), the vector towards the predictive picture block having the smallest evaluation function is determined as the motion vector for the template block.

Various structures for obtaining this motion picture in a hardware manner has been proposed.

FIG. 96 shows a structure of a conventional motion vector detecting device which is disclosed in Proceedings of ICASSP'89, IEEE 1989, pp. 2453-2456 by A. Artier et al. Referring to FIG. 96, a motion vector detecting device includes a search area input register 962 for entering pixel data of a search area of 1 column, a processor array 966 including a plurality of processors arranged in an matrix of row and columns identical in number with the template block evaluation dots, search area side registers 964a and 964b for storing one column of data in the search area for the processor array, and a motion vector detecting unit 968 for detecting a motion vector according to the calculation result of processor array 966.

Processor array 966 has the processors each arranged corresponding to a displacement vector (i, j). More specifically, a processor Pij placed at the i-th row and the j-th column calculates displacement vector D (i, j).

FIG. 97 shows a structure of a processor included in the processor array shown in FIG. 96. Referring to FIG. 97, a processor 970 includes a 3-input register 972 for receiving search area data transmitted from processors of three directions in the horizontal and vertical direction of the array and responsive to a select signal SEL for passing one of the three inputs, a deviation calculating unit 974 for calculating deviation (sum of the absolute difference) according to search area data Y from 3-input register 972 and externally applied template block data X, and a 2-input register 976 for receiving deviation D from deviation calculating unit 974 and a deviation from a horizontally adjacent processor to selectively pass one of the deviations in response to a select signal To.

In the processor array shown in FIG. 96, this processor is arranged in a two-dimensional manner corresponding to all the displacement vectors which are the candidates of a motion vector in the search area. Each processor 970 of processor array 966 (refer to FIG. 96) has the same template block data X applied. Here, the corresponding data of the search area block is applied to processor 970. More specifically, when template block data X is, for example, X (m, n), a search area block data Y (i+m, j+n) is supplied to a processor Pij. Search window data is transferred via search area side registers 964a and 964b and each processor 970 in processor array 966. To provide a precise search area block data Y (m+i, n+j) with respect to an externally applied template block data X (m, n), the template block data and the search area block data must be scanned according to a certain rule.

FIG. 98 shows a method of scanning data of the template block. Referring to FIG. 98, the template block data is scanned, as shown by the arrow in template block 999, downwards along one column and then to an adjacent column in an upward direction. This scan method is called a "snake scan". According to the "snake scan" of the template block data, the search area block data applied to the processor array is scanned in a similar manner. Each processor must transfer the search area data in the vertical direction of FIG. 91 or in the horizontal direction of FIG. 97 according to its position in the arrangement. The three-input register 972 is provided for this purpose.

2-input register 976 is provided to transfer the deviation calculated by the processor to motion vector detecting unit 968 in order to obtain a displacement vector providing the minimum deviation. Motion vector detecting unit 968 detects the minimum of the deviation from each processor to obtain the processor position providing the minimum deviation, i.e. the motion vector. The operation of the motion vector detecting unit of FIG. 96 will be described briefly hereinafter.

In processor array 966, processor Pij arranged at the i-th row and the j-th column calculates a deviation D (i, j) expressed as:

$$D(i, j) = \Sigma |X(m, n) - Y(m+i, n+j)|$$

Here, the total sum Z is carried out for m and n. The varying range of m and n is determined by the size of the search area.

A case is considered where pixels are arranged in M rows and N columns as template block 980, as shown in FIG. 99. In the first cycle, the search area block data indicated by reference number 982 is stored in each processor in the processor array. Pixel X (1, 1) of the first row and the first column in template block 980 is applied to all the processors in the processor array as external data. Each processor 970 obtains the absolute difference between the stored search window data Y and the externally applied template block data X and accumulates the values.

In the next cycle, the search area data in the processor array is shifted downwards by 1 line in FIG. 99. Under this state, the next pixel data X (2, 1) is provided from template block 980. The stored search area data in each processor 970 is Y (m+i+1, n+j). The absolute difference of data X and data Y is calculated and then accumulated. This operation is repeated M times.

By repeating the above-described operation M times, one column of search area pixel data are written via search area input register 962 shown in FIG. 96. The pixel data of one column in the search area that are no longer necessary are discarded. Then, new search area data is stored in search area side registers 964a and 964b and processor array 966. This operation is executed repeatedly.

In other words, as shown in FIG. 100, a sum of the absolute difference is calculated using search window 990, followed by M cycles thereof. Then, a similar calculation is carried out using data of search window 992, search window 994, . . . . When calculation of pixel data for search area 996 is carried out, deviation D (i, j) is obtained and held in processor Pij.

The deviation D (i, j) obtained in each processor Pij is transmitted to motion vector detecting unit 968 (refer to FIG. 96), whereby the minimum deviation is detected as the motion vector.

The above motion vector detecting device detects a motion vector using pixel data of a search area and pixel data of a template block. The obtained motion vector is called a motion vector of integer precision. This is because the minimum unit of the horizontal and vertical components of the motion vector is in the unit of one pixel. This motion vector of integer precision is defined in motion picture coding system for TV telephones and TV conference (CCITT Recommendation H.261).

In a storage type motion picture coding system using digital storage media, detection precision in the Knit of a ½ pixel (referred to as ½ pixel precision hereinafter) is required. Detection of a precision more definite than integer precision is called "fractional precision". In compensating for motion at ½ pixel precision, a position shifted by 1 pixel on a reference frame used for prediction is searched. Also, a data between pixels is produced by interpolation, whereby matching is carried out for the interpolated data. Motion compensation using a motion vector of ½ pixel precision is called "half pel motion compensation".

FIG. 101 schematically shows a structure of a conventional fractional precision motion vector detecting device. The structure of the device shown in FIG. 101 is disclosed in Proceedings of ICASSP'89, IEEE, 1989, pp. 2437-2440, for example.

Referring to FIG. 101, a fractional precision motion vector detecting device includes a reference picture frame memory 101 for storing pixel data of a whole reference frame picture of 1 preceding frame, a current picture frame memory 102 for storing image data of the whole current frame picture, and a first operator 805 for reading out search window block data and template block data from frame memories 801 and 802 via data lines 807 and 809 to detect a motion vector in integer precision. The contents of the process carried out by first operator 805 is similar to that already described.

The fractional precision motion vector detecting device further includes a fractional precision search window memory 804 for receiving search window block data from reference picture frame memory 801 via a data line 808 and storing the same, a fractional precision template memory 803 for receiving the currently used template block data from current picture frame memory 802 via a data line 810 to store the same, and a second operator 806 for receiving pixel data from fractional precision template memory 803 and fractional precision search window memory 804 via data lines 811 and 812, respectively, to detect a motion vector of fractional precision. The motion vector detected by first operator 805 is applied to second operator 806 via a signal line 813. Second operator 806 transmits on a signal line 814 a set of a motion vector of this integer precision and a newly obtained motion picture of fractional precision. The operation thereof will be described hereinafter.

First operator 805 reads out search window block data and template block data from reference picture frame memory 801 and current picture frame memory 802, respectively, to calculate an evaluation function (evaluation value) for each displacement vector. When all search window block data in the search area is read out from reference picture frame memory 801 to obtain evaluation values, first operator 805 detects the minimum evaluation value from the obtained evaluation values to determine the displacement vector corresponding to the minimum evaluation value as the motion vector.

When a motion vector is detected, current picture frame memory 802 transmits the used template block data to fractional precision template memory 803 via data line 810. The search window block data corresponding to the displacement vector providing the motion vector and peripheral data thereof in reference image frame memory 801 are transmitted to fractional precision search window memory 804 via data line 808. When the search window block is formed of 16×16 pixels, for example, 18×18 pixel data including peripheral pixel data are transmitted to fractional precision search window memory 804 from reference picture frame memory 801.

As a result, pixel data of the template block of region 820 (indicated by blank circles) is stored in template memory 803, as shown in FIG. 102. In search window memory 804, the search window block data indicated by region 822 is stored. The operation of second operator 806 is set forth in the following.

An interpolation process is carried out for each pixel data (indicated by a blank circle) of search window block 822 to generate interpolation data between pixels. FIG. 102 shows the case of detecting a motion picture in ½ pixel precision. The candidates of a motion vector are 16 displacement vectors including the fractional components between $(-\frac{1}{2}, -\frac{1}{2})$ to $(\frac{1}{2}, \frac{1}{2})$. In other words, in the case of ½ pixel precision, 16 search window blocks are formed where calculation of evaluation values is carried out for each block. In detecting a motion vector in ½ pixel precision, the interpolation data between two pixels P(A) and P(B) is calculated by (P(A)+P(B))/2 and interpolation data between four pixels P(A), P(B), P(C) and P(D) is calculated by (P(A)+P(B)+P(C)+P(D))/4, as shown by the x marks in FIG. 102. A rounding process is executed for the interpolation data. An operation similar to that of motion vector detection in integer precision is carried out for the generated interpolation data.

FIG. 103 shows the relationship between a motion vector of integer precision and a motion vector of fractional precision. Referring to FIG. 103, a displacement vector is arranged in the unit of one pixel in the vertical and horizontal directions (indicated by a blank circle in the drawing). A displacement vector in fractional precision is obtained by the second operator for the periphery of a motion vector MI (indicated by a broken line of a blank circle). Then, a displacement vector providing the minimum value is obtained from the displacement vectors and the fractional precision component is combined with the motion vector MI in integer precision, whereby a motion vector MF in fractional precision is obtained.

The above-described conventional motion vector detecting device has problems to be solved as set forth in the following.

In the motion vector detecting device shown in FIG. 96, the same template block data is applied to all the processors in the processor array. This means that a great driving capability is required in the circuit for writing the pixel data of the template block, resulting in increase in the current consumption in the template block pixel data writing circuit. As a result, the power consumption of the entire device is increased.

In the motion vector detecting device shown in FIG. 96, each processor in the processor array corresponds to a displacement vector which is the candidate for a motion vector. If the search area is +16 to −16 in the vertical direction and −16 to +16 in the horizontal direction, the number of displacement vectors which becomes the candidates of a motion vector is 33×33=1089, which accordingly increases the number of processors. This results in a problem that the occupying area of the device is great.

In each operation cycle, data transfer is carried out via a processor. A 3-input register is used for determining the data transfer direction, resulting in a problem that power consumption is increased at the time of data transfer.

Also, the motion vector detecting device of FIG. 96 has each processor calculate an evaluation value (deviation). More specifically, calculation of the absolute difference (or squared difference) is carried out, followed by accumulation of the calculated result. As a result, the occupying area of the processors is increased to increase consumed current.

The fractional precision motion vector detecting device of FIG. 101 is provided with a frame memory for integer precision and a frame memory for fractional precision. In the motion vector detection operation in fractional precision, the required search window block data must be transferred from the integer precision reference picture frame memory to the fractional precision search window memory. After transfer of data to the search window memory, search window block data must be read out from the search window memory again to carry out detection of a motion vector in fractional precision. The access to the memory is frequently made, whereby the throughput of the entire motion vector detecting device is rate-determined by the access time to the memory. This results in a problem that a motion vector can not be detected at a high speed.

Similarly, after data is transferred from the current picture frame memory to the fractional precision template memory, the template block data must be read out from the template memory, whereby the access time to the frame memory storing the current frame picture data is increased. The throughput of the motion vector detecting device is rate-determined by the access time to the current picture frame memory. Therefore, a motion vector can not be detected at high speed.

SUMMARY OF THE INVENTION

An object of the present invention is to provide a motion vector detecting device that can detect a motion vector at high speed.

Another object of the present invention is to provide a motion vector detecting device that operates at low power consumption.

A further object of the present invention is to provide a motion vector detecting device that is reduced in occupying area.

Still another object of the present invention is to provide a motion vector detecting device that can identify a motion vector accurately.

Succinctly stated, a motion vector detecting device according to the present invention has element processors arranged in an array and each storing template block data and search window block data differing from others, whereby an evaluation value of one displacement vector is calculated by driving simultaneously the processors arranged in the array. The search window block data is transferred in a one-way direction in the processor array, and search window block data no longer required is shifted out sequentially.

In the detection of a motion vector of fractional precision and a motion vector of interpolation prediction, the data shifted out from the processor array is used.

In the motion vector detecting device according to the present invention, the maximum number of element processors corresponds to the number of pixels in the template block. Therefore, the number of element processors can be reduced.

The template block data resides in the processor until an associated motion vector is detected. Because only the search window data is transferred, the current/- power consumption at the time of data transfer can be reduced.

Because only a predetermined calculation is carried out in the element processor, and a final evaluation value indicating the relationship between the blocks is obtained by evaluation value generating means provided external to the array, the occupying area of the processor array can be reduced, resulting in reduction of the occupying area of the device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 17 shows element processor arrangement in the processor array.

FIG. 18 shows arrangement of the template data stored in the element processor of FIG. 17.

FIG. 47 shows a table of priority specification values for each displacement vector held by the priority comparator of FIG. 44.

DESCRIPTION OF THE PREFERRED EMBODIMENTS

EMBODIMENT 1

Figure 1:
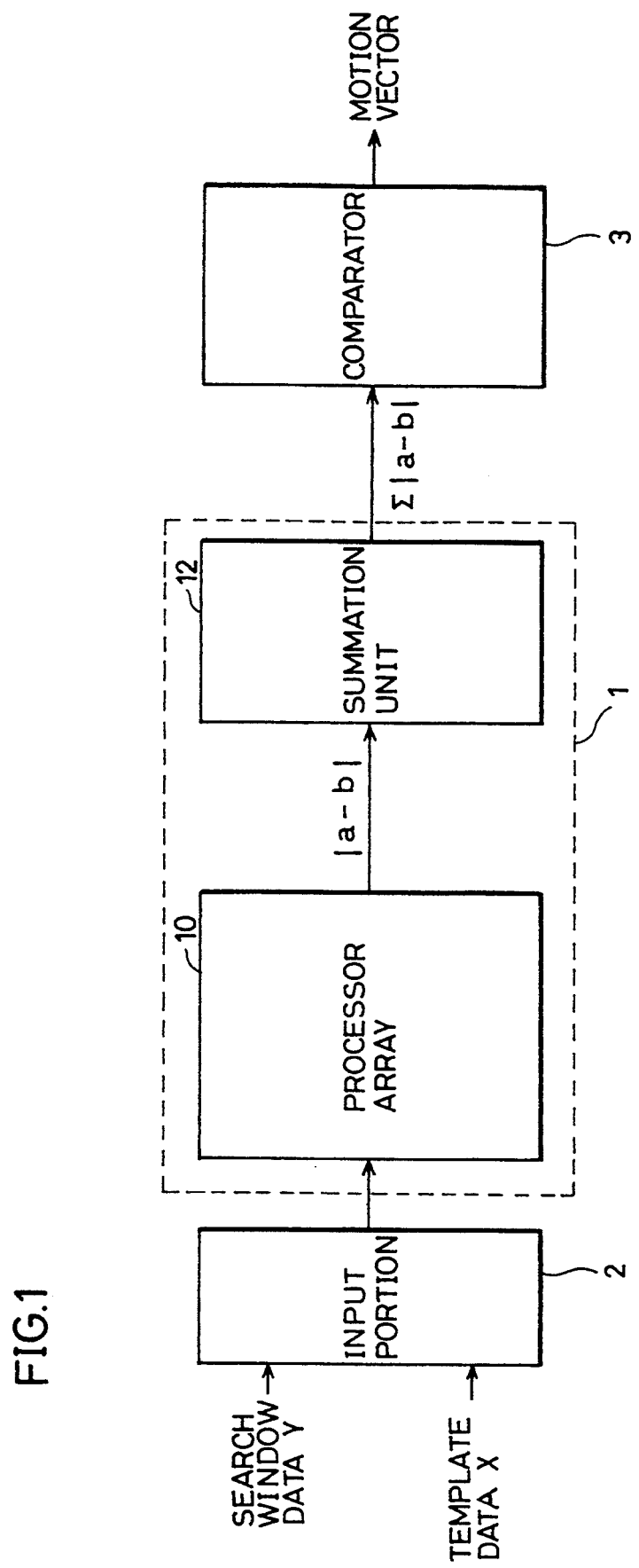
FIG. 1 is an overview of a structure of a motion vector detecting device according to an embodiment of the present invention.

FIG. 1 is a block diagram schematically showing a structure of a motion vector detecting device according to a first embodiment of the present invention. The motion vector detecting device of FIG. 1 detects a motion vector in integer precision.

Referring to FIG. 1, the motion vector detecting device includes an input unit 2 for receiving search window data Y and template data X for providing the supplied data at a predetermined timing, an operational unit 1 for calculating an evaluation value (evaluation function) relating to a displacement vector for one template block according to the data output from input unit 2, and a comparator unit 3 to receive an evaluation value ($\Sigma|a-b|$) obtained by operational unit 1 and obtaining a minimum evaluation value concerning one template block for determining a displacement vector corresponding to that minimum evaluation value as the motion vector. The motion vector is provided from comparator unit 3.

Operational unit 1 includes a processor array 10 including a plurality of element processors arranged in an array, and a summation unit 12 for obtaining the total sum of the calculation result values (absolute difference in the present embodiment) provided from each element processor in processor array 10. Each element processor in processor array 10 stores different template block data and calculates the component of an evaluation value indicating the correlation between one template block and one search window block. In processor array 10, template block data is constantly stored during the operation cycle for obtaining a motion vector for that template block. The search window block data is shifted by 1 pixel data in the processor array for every 1 calculation cycle. Thus, an evaluation value for each displacement vector can be calculated with the minimum search window data transfer operation to reduce current/power consumption. The structure of operational unit 1 shown in FIG. 1 will be described specifically hereinafter.

Figure 2:
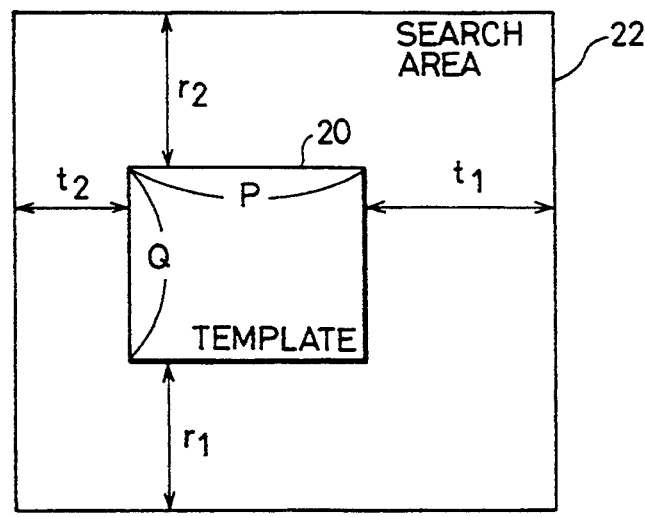
FIG. 2 shows the search area and the range of search of a template block used by the motion vector detecting device of FIG. 1.

FIG. 2 is a diagram indicating the size of a template block and a search area used in the present embodiment. Template block 20 includes pixels arranged in Q rows and P columns. Search area 22 has a search range of $+t1$ to $-t2$ in the horizontal direction and a search range of $+r1$ to $-r2$ in the vertical direction. More specifically, search area 22 includes pixels of $(t2+P+t1)\times(r2+Q+r1)$.

Figure 3:
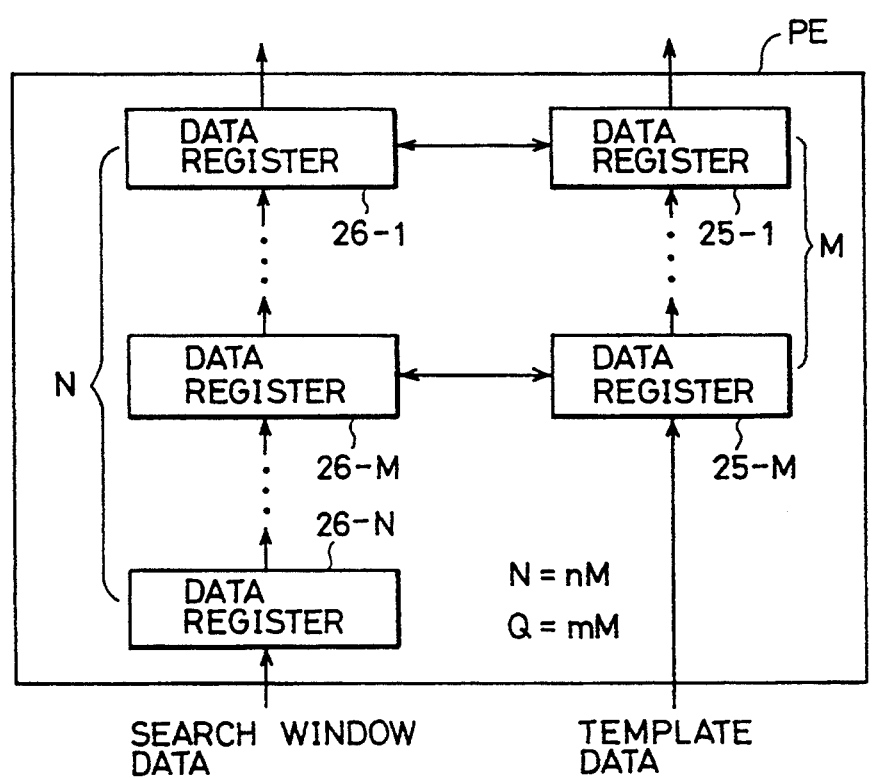
FIG. 3 shows a structure of an element processor included in the processor array of FIG. 1.

FIG. 3 schematically shows a structure of an element processor included in the processor array of FIG. 1. Referring to FIG. 3, an element processor PE includes M data registers 25-1 to 25-M cascade-connected for storing template block data. Data registers 25-1 to 25-M have different template block data stored therein. Data registers 25-1 to 25-M correspond to the memory means in the first storage means.

Element processor PE further includes N stages of cascade-connected data registers 26-1 to 26-N for storing search window data. Data registers 26-1 to 26-N correspond to each memory means in the second storage means. N is an integer multiple of M (n times). The number of rows Q in the template block is an integer multiple of the number of stages M of data registers 25-1 to 25-M. In this element processor PE, calculation is carried out using the template block data stored in the M data registers 25-1 to 25-M. Here, the data registers 261 to 26-N for storing the search window data may be provided in a one-to-one correspondence with data registers 25-1 to 25-M for storing the template block data (N=M) to carry out calculation using the stored data in each corresponding register.

Element processor PE carries out calculation for the M template block data. The calculation means in element processor PE is used in a multiplexed manner for the M data registers 25-1 to 25-M. More specifically, only one calculating means is provided in element processor PE in the present embodiment.

Search window data and template block data are transferred only between element processors adjacent in a one-way direction.

Figure 4:
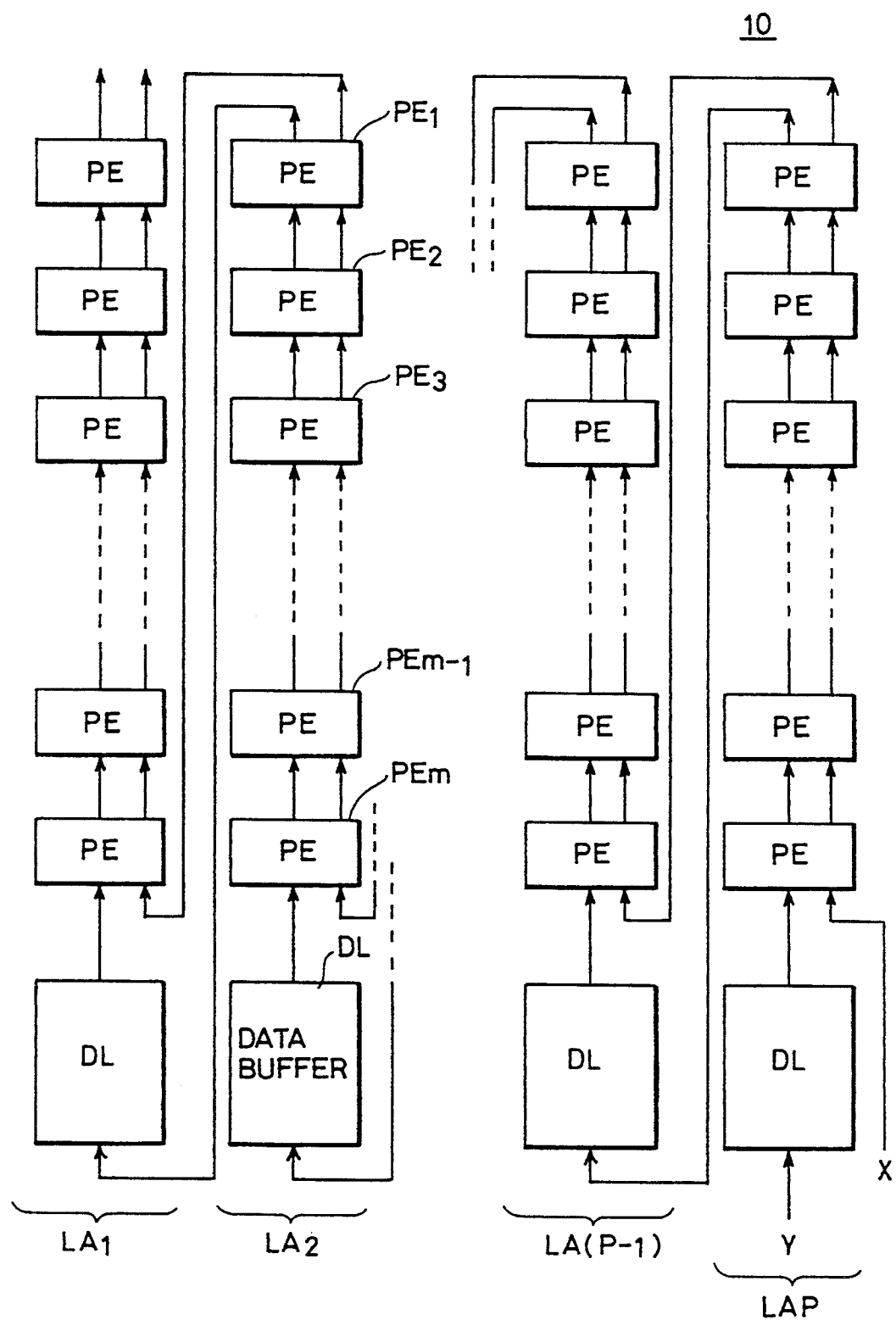
FIG. 4 shows the structure of the entire processor array of FIG. 1.

FIG. 4 shows a structure of the processor array of FIG. 1. Referring to FIG. 4, a processor array 10 includes linear processor arrays LA1 to LAP arranged in P columns. Linear processor arrays LA1-LAP have the same structure, each including m element processors PE1-PEm arranged in a cascaded manner, and a data buffer DL for storing R ($=r1+r2$) search window data and functioning as delay means.

Element processors PE1-PEm transfer the search window data and template block data along a one-way direction (vertically upwards in FIG. 4) in the same linear processor array LA1. In transferring data into an adjacent linear processor array, the search window data from the most upstream element processor PE1 is applied to the data buffer DL of an adjacent linear processor array (leftwards in FIG. 4). The template block data from the most upstream element processor PE1 is applied to the most downstream element processor PEm of the adjacent linear processor array. More specifically, search window data is transferred via element processor PE and data buffer DL, and template block data is transferred via only element processor PE.

In addition to the above-mentioned delay function, data buffer DL includes a function to output the applied data in a first-in first-out (FIFO) manner. Therefore, R data latches with shifting function or R register files storing data may be used as data buffer DL.

In the above-described processor array 10, sufficient interconnection area for signal lines can be ensured and the interconnection occupying area can be made minimum, by arranging in parallel the signal line transferring search window data and the signal line transferring the template data. This is because the region corresponding to the width of element processor PE can be used as the interconnection region.

Figure 5:
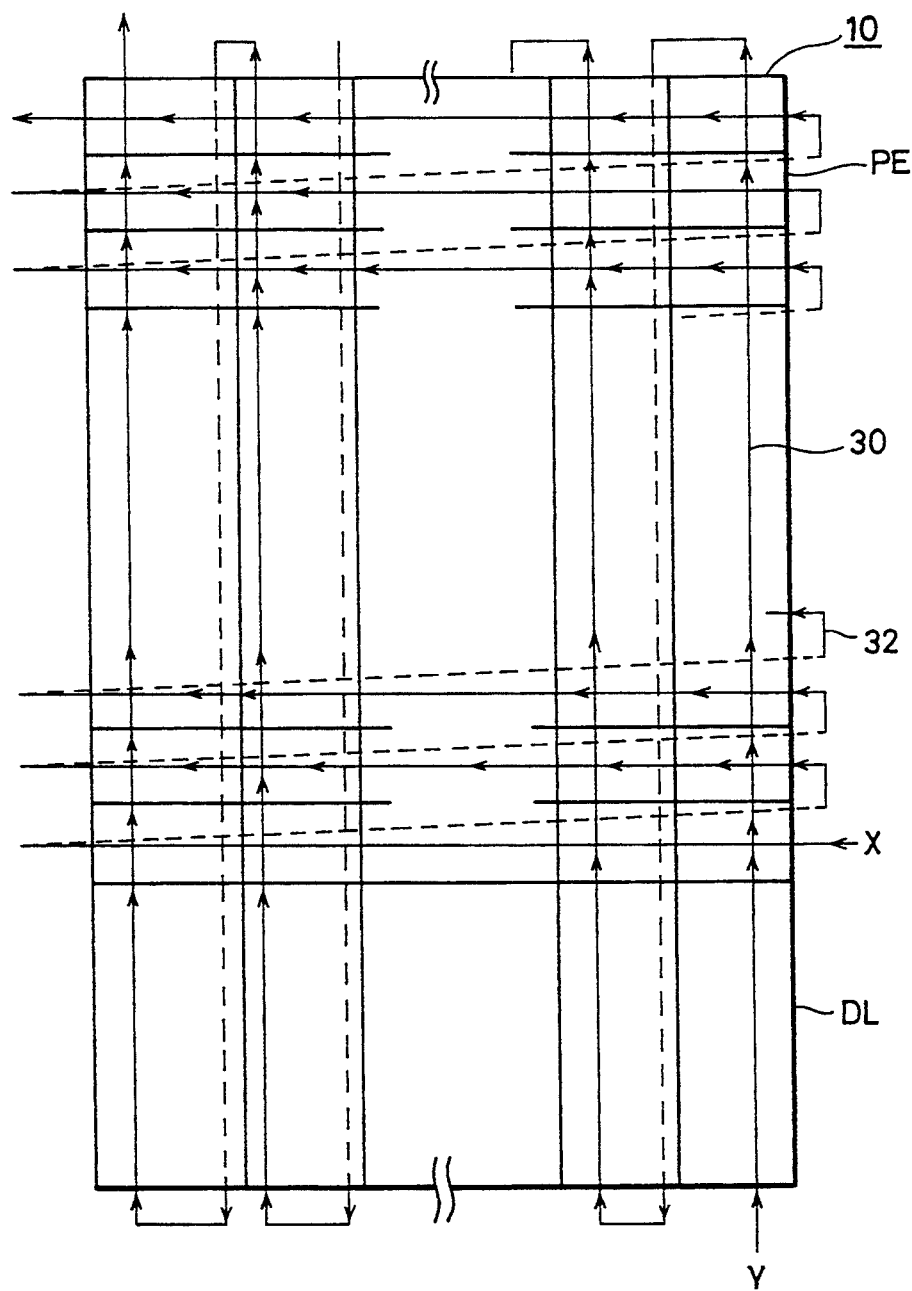
FIG. 5 shows a modification of the processor array of FIG. 4.

FIG. 5 shows another manner of the data transfer path. The data transfer path may be set so that the template data transfer direction 32 and the search window data transfer direction 30 are orthogonal to each other as shown in FIG. 5. Because picture signals are scanned in a raster manner in a general frame memory, successive picture data are stored sequentially along the row direction (horizontal direction in the figure). When data is to be transferred in the horizontal direction as in FIG. 5, data of the same row can be accessed and sequentially read out from the frame memory. This is very convenient for data reading and transfer. The search window data and the template data are transferred only in a one-way direction in each element processor. The operation will be described hereinafter.

Figure 6A:
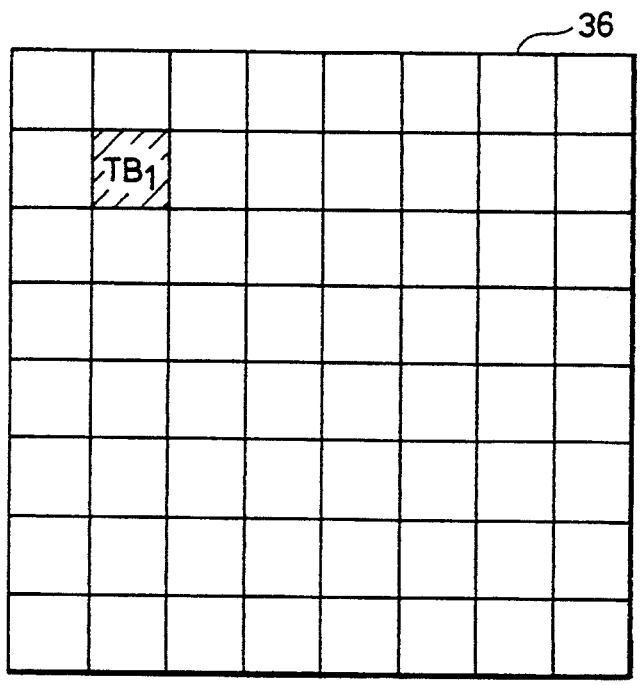
FIGS. 6A and 6B shows the position relationship of the stored data in the processor array of FIG. 1.

The case will be considered where a picture of one frame is divided into $8\times8$ macroblocks as shown in FIG. 6. Referring to FIG. 6A, the shaded area of a macroblock in the current frame picture 36 is assumed to be template block TB1. A motion vector is to be detected for template block TB1.

Figure 6B:
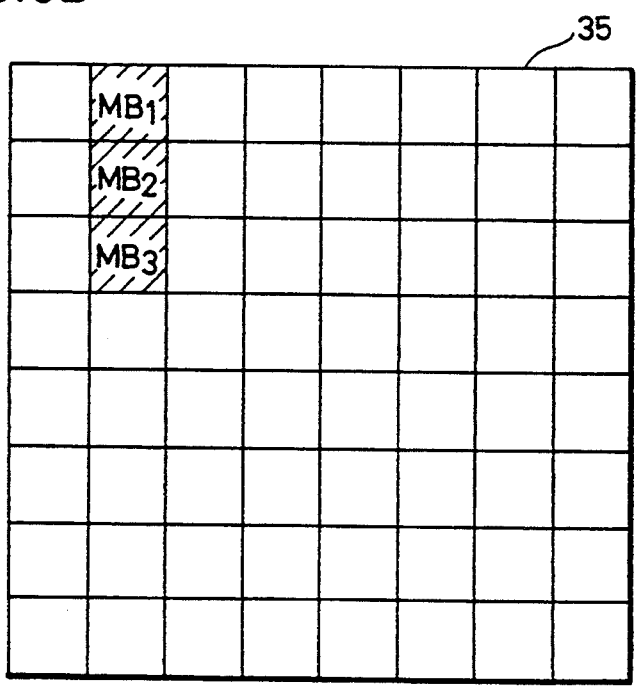
Figure 7:
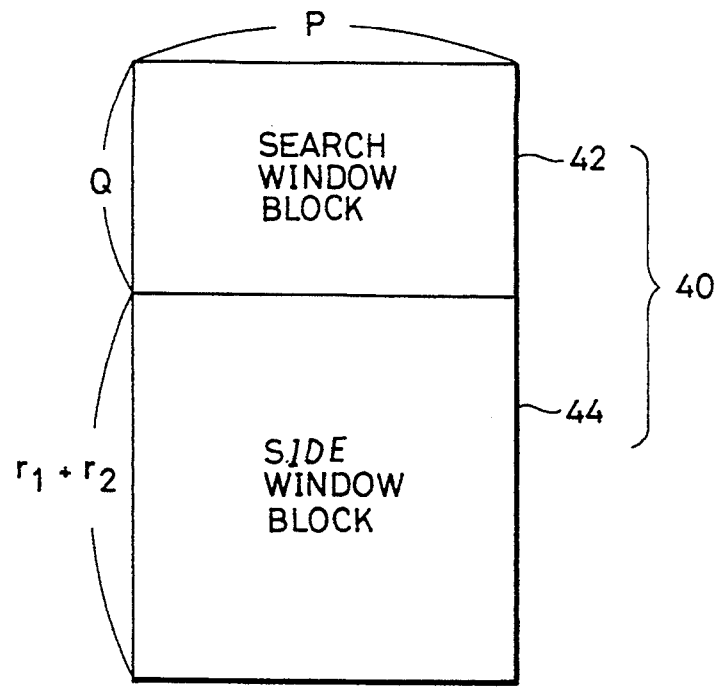
FIG. 7 shows the distribution of the stored data in the processor array of FIG. 4.

Here, the shaded three macroblocks MB1, MB2 and MB3 in a preceding frame picture 35 as shown in FIG. 6B are stored in processor array 10. Pixel data of template block TB1 shown in FIG. 6(A) is stored in each data register in element processor PE. Q/m template block data arranged in the vertical direction in the figure are stored in one element processor PE. Regarding search window data, $Q.n/m$ pixel data adjacent in the vertical direction are stored in one element processor. In an element processor array 10, search window pixel data of Q in the vertical direction and P in the horizontal direction, i.e. a total of P.Q search window pixel data are stored. Each of P.Q pixel data is referred to as "search window block pixel data" in the following description. The remaining R search window pixel data are stored in data buffer DL. This state is shown in FIG. 7.

More specifically, search window data of P.Q pixel data implement a search window block 42, and are stored in each element processor PE in the processor array. The remaining (r1+r2).P pixel data are stored in data buffer DL. The pixel data region 44 stored in data buffer DL is referred to as a "side window block" hereinafter. In the following description, search window block 42 combined with side window block 44 is referred to as a search window 40 hereinafter.

Figure 8:
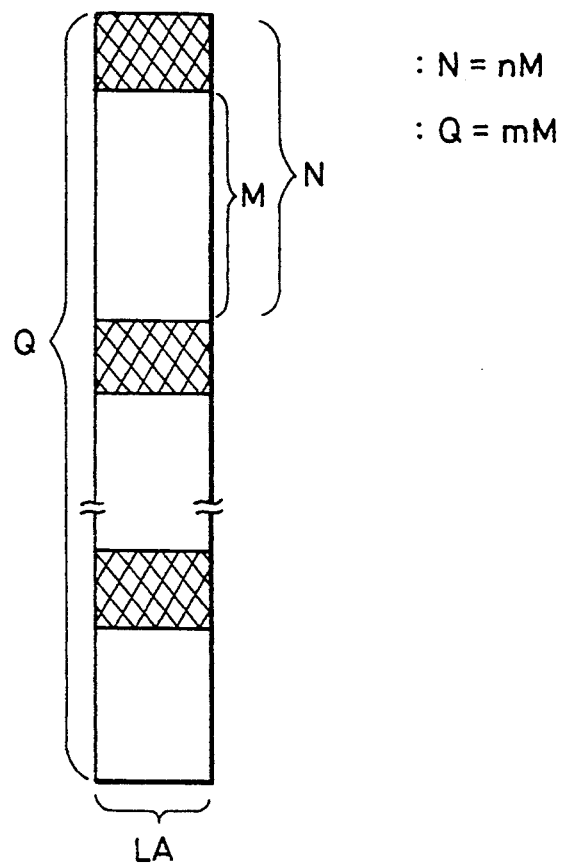
FIG. 8 shows the distribution of the stored data in the linear processor array of one column in the processor array of FIG. 4.

Referring to FIG. 8, M template block data and N search window block data are stored in one element processor PE. Since m element processors PE are cascade-connected, the template pixel data arranged by each column in Q columns are stored in element processor PE in one linear processor array. Specific operation thereof will be described hereinafter.

In order to simplify the following description, the following conditions are assumed.

Template block size: $P=Q=16$

Search range of motion vector: $r1=r2=15$, $t2=2$, $t1=15$, $m=8$ $M=N=2$

Figure 9:
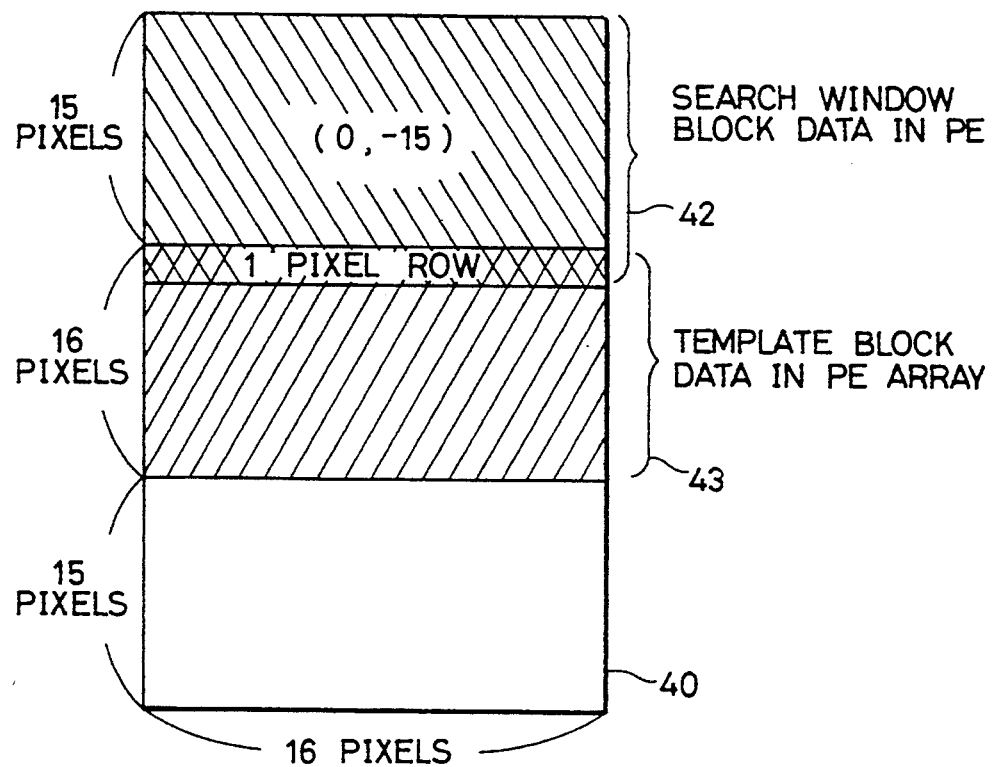
FIG. 9 is a diagram for describing the operation of the motion vector detecting device of FIG. 1.

FIG. 9 shows the data storage status in the first operation cycle in the motion vector detection operation. Referring to FIG. 9, the data of template block 43 formed of pixel data of 16 rows and 16 columns are stored in each element processor PE of processor array 10. Correspondingly, pixel data of search window block 42 of 16 rows×16 columns are stored in each element processor PE in the processor array. This state corresponds to a displacement vector $(0, -15)$. Under this state, each element processor obtains the absolute difference of template block data and a corresponding search window block data. The absolute difference obtained by each element processor PE is transferred to summation unit 12 to be accumulated. The total sum is used to obtain an evaluation value (evaluation function) corresponding to this displacement vector $(0, -15)$.

With the template block data held in each element processor PE, only the search window block data is transferred by 1 pixel.

Figure 10A:
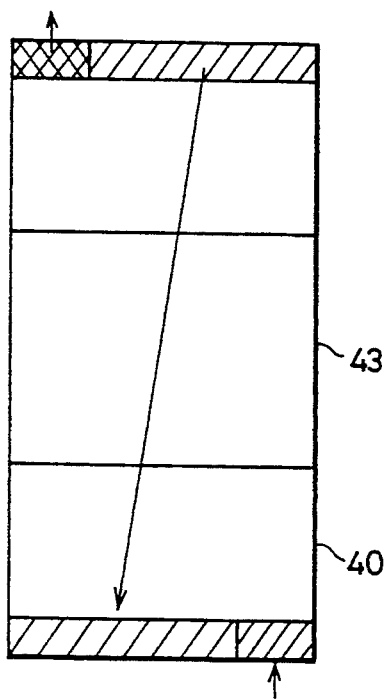
FIGS. 10A and 10B show the change and distribution of data in the processor array after completion of one evaluation value generation.
Figure 10B:
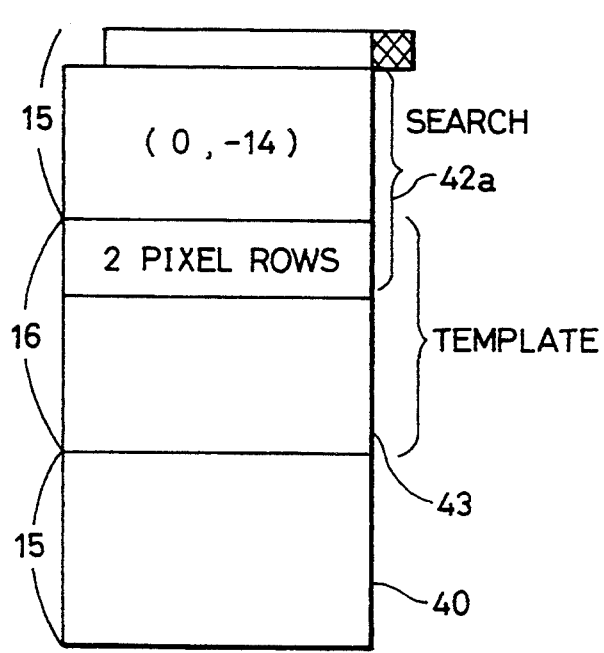

In this state, data in the uppermost row in search window block 42 is transferred to the data buffer DL of the adjacent column, as shown in FIG. 10A. In response, the first pixel data of the search window block is shifted out. In parallel to this shift out operation, a new search window block data is input. The shifted out search window block data and the newly shifted-in search window block data are shown in the shaded regions of FIG. 10A.

Thus, in element processor PE in processor array 10, search window block 42a shifted by one row downward in search window 40 is stored. Here, the displacement between template block 43 and search window block 42a is vector $(0, -14)$.

Under this state, calculation of the absolute difference and accumulation similar to the above-described operation is carried out to obtain an evaluation value for a displacement vector $(0, -14)$.

Figure 11A:
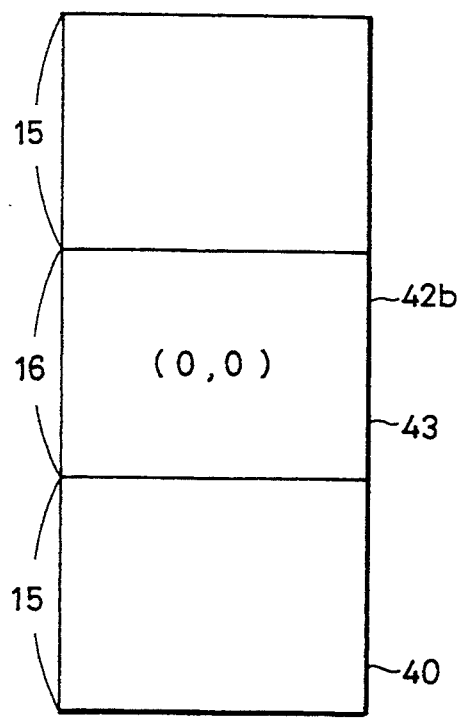
FIGS. 11A and 11B show the relationship between stored data and a displacement vector in the processor array of FIG. 4 and a distribution of the stored data thereof.
Figure 11B:
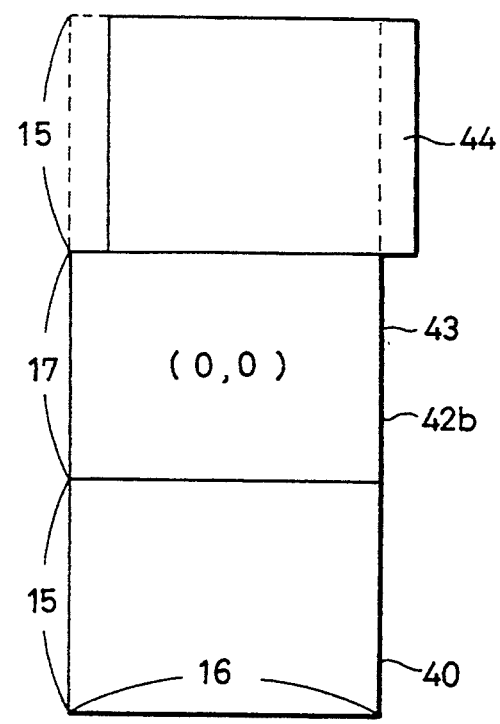

When this operation is repeated to arrive at a displacement vector $(0, 0)$, search window block 42b in search window 40 corresponds to the true backside of template block 43 as shown in FIG. 11A. Regarding data in search window 40 stored in the processor array, search window data of a position shifted rightwards by 1 column in the upper region of 15 pixels×16 pixels are stored. By shifting out 1 bit of search window data no longer required for the evaluation value calculating operation and by shifting in search window data by 1 pixel, search window data of the next column is newly stored in parallel to the evaluation value calculation.

Figure 12A:
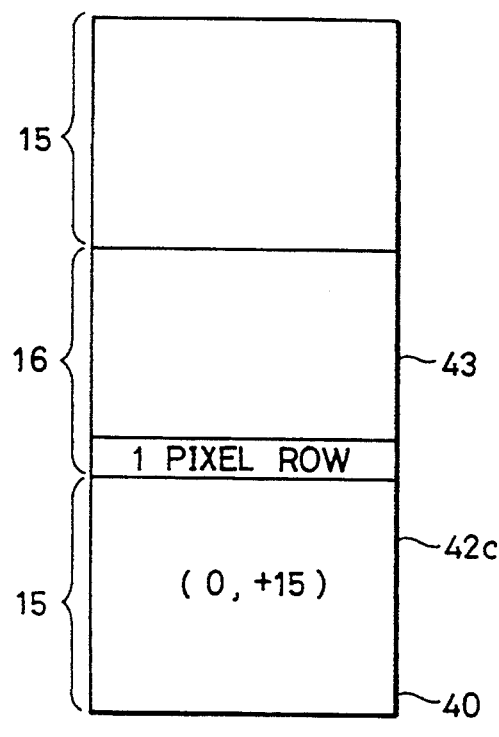
FIGS. 12A and 12B show the position relationship between the template block and the search window block when generation of an evaluation value for one search window is completed and a distribution of the stored data in the processor array.

When the displacement vector eventually becomes $(0, 15)$, search window block 42c is located at the bottom area in search window 40, as shown in FIG. 12A. After an evaluation value is calculated for this displacement vector $(0, +15)$ under this state, the search window data PY1 no longer required is shifted out from the processor array, and a new search window data PY2 is shifted in. This shift operation is repeated 16 times. By the shifting operations, all the data required for the calculation operation in the next step is obtained.

Figure 12B:
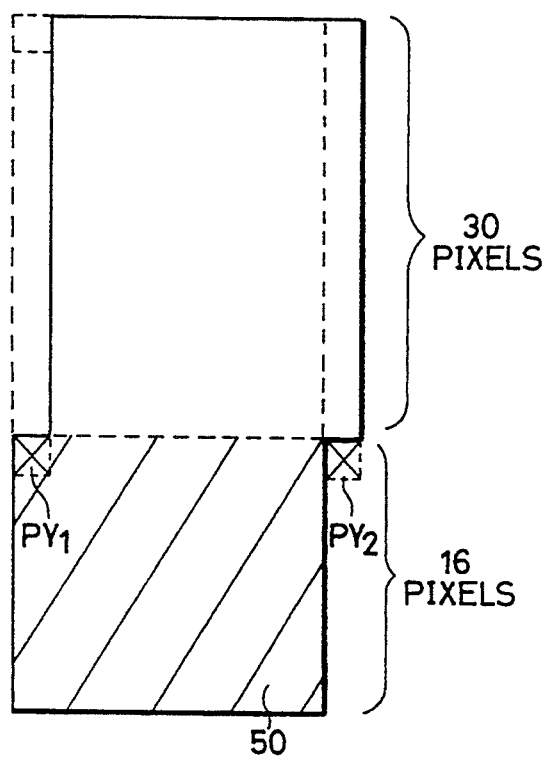
Figure 13:
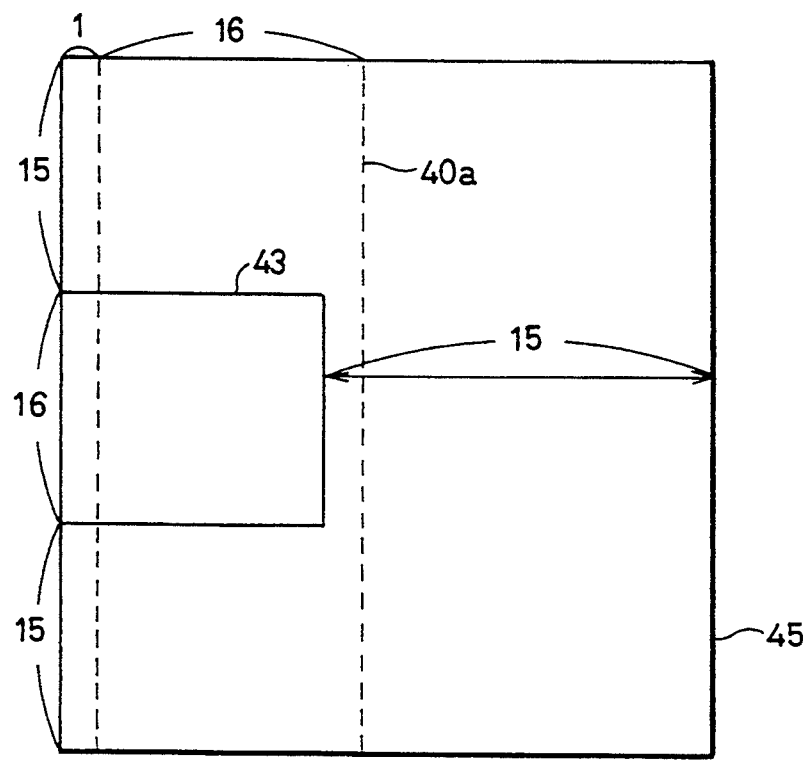
FIG. 13 shows the position relationship between the template block and the search window in loading the next search window according to an embodiment of the present invention.
Figure 14:
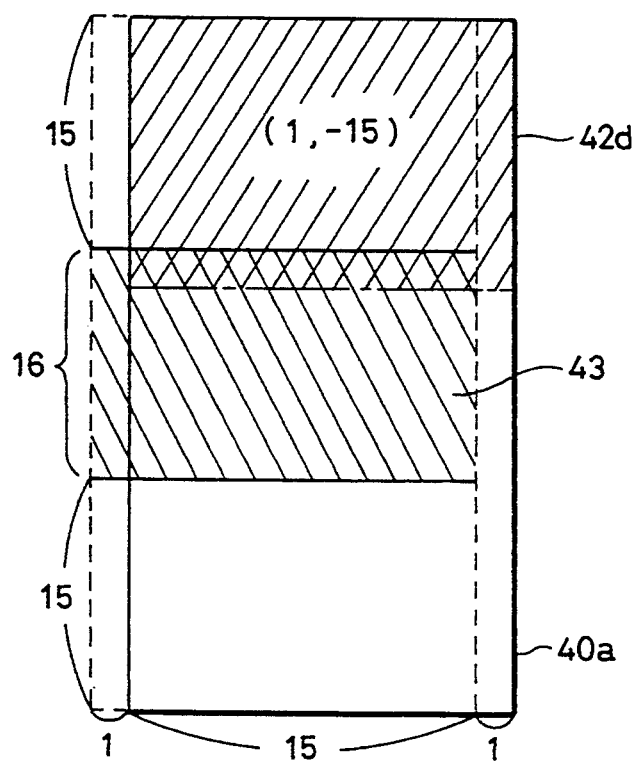
FIG. 14 shows the position relationship between the search window block and the template block when an evaluation value is generated using the search window shown in FIG. 13.

At the next step, calculation of an evaluation value for the search window shifted rightwards by 1 column in the search area is carried out. More specifically, referring to FIG. 13, the next search window 40a in search area 45 is formed of pixel data of the position shifted rightwards by 1 column from the original search window 40. In the state shown in FIG. 12B, the pixel data of a region 50 indicated by hatched lines are stored in the processor array. In order to store in each element processor in the processor array the search window block data at the top position of search window 40a shown in FIG. 13, the remaining 15 pixel data are shifted in as described above in the state of FIG. 12B. As a result, the topmost search window block 42d in search window 40a is newly stored in each element processor PE in the processor array. This corresponds to the state where search window block 42d and template block 43 corresponding to a displacement vector $(1, -15)$ are stored in the element processor. The calculation of the absolute difference and total sum, i.e. calculation of an evaluation value is carried out under this state. Referring to FIG. 14, the region of 1 column indicated by a broken line shows the shifted out search window data and the shifted in search window data.

Figure 15:
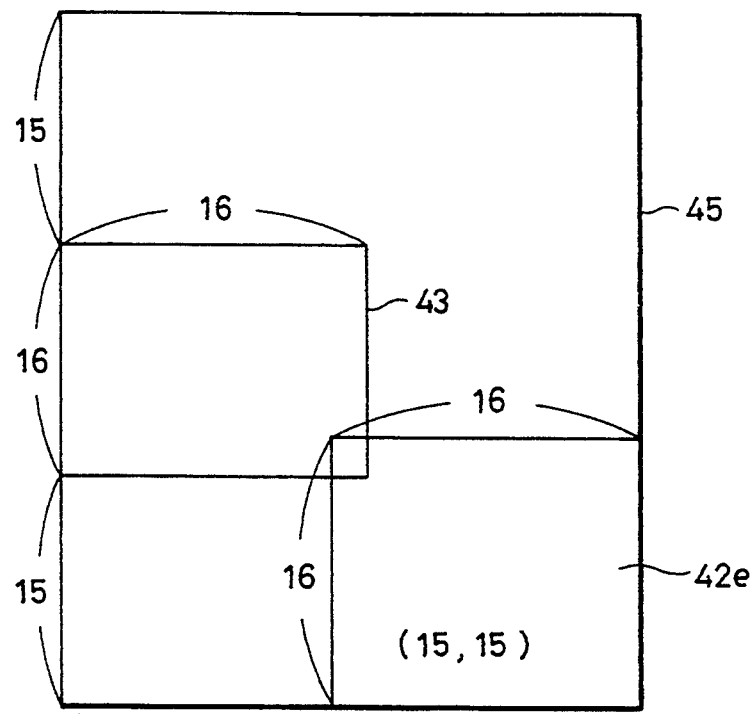
FIG. 15 shows the position relationship between the search window block and the template block when a motion vector evaluation operation is completed.

By carrying out the above-described shift operation $(15+15+1+16)\times15+(15+15+1)=736$ times, calculation of an evaluation value for a displacement vector $(15, 15)$ as shown in FIG. 15 is carried out. More specifically, calculation of an evaluation value for the right bottom search window block 42e in search area 45 is carried out for template block 43.

Figure 16:
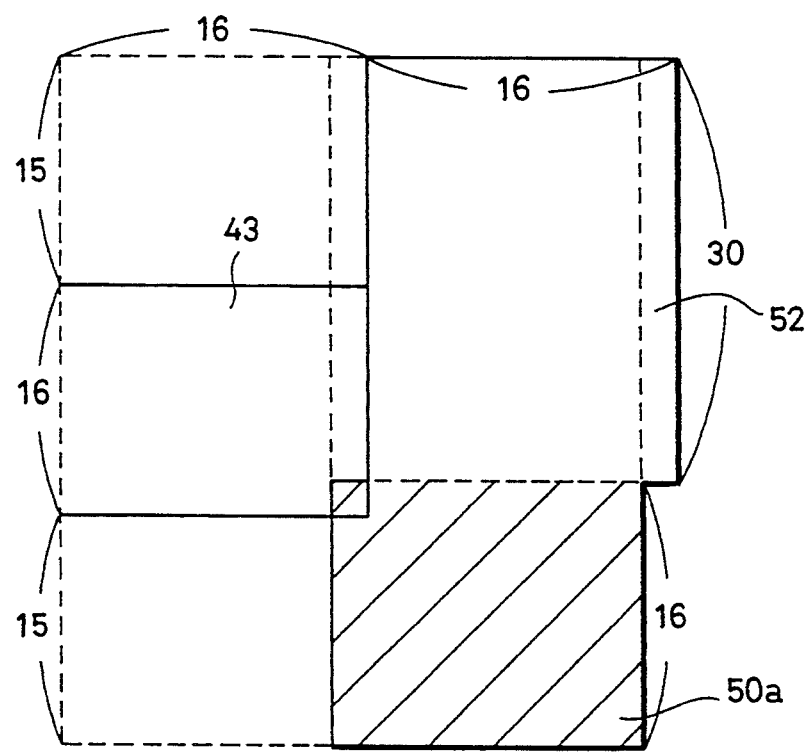
FIG. 16 shows the distribution of the stored data in the processor array with respect to the search window block and the template block position relationship shown in FIG. 15.

Under this state, data of a region 50a indicated by the hatched line is stored in the element processor in the processor array, as shown in FIG. 16. The data in the remaining region (side window region) 52 of 16×30 pixels are stored in the data buffer. By carrying out the above operation, all the evaluation functions (evaluation values) required for template block 43 can be calculated. The minimum evaluation value (evaluation function) out of all the calculated evaluation functions (evaluation values) is obtained in the comparator unit, whereby the corresponding displacement vector is determined as a motion vector for template block 43.

The movement of the above described pixel data will be described hereinafter on the basis of search window pixel data. As shown in FIG. 17, it is assumed that processor array 10 includes 64 element processors PE0–PE63 arranged in 8 rows and 8 columns. Buffer DL is not shown in FIG. 17. Element processors PE0–PE63 have each pixel data of the template block stored therein. This template block includes pixel data a0,0 to a7,7 arranged in 8 rows and 8 columns as shown in FIG. 18. Pixel data ai,j indicates pixel data located at the i-th row and j-th column in the template block of 8 rows and 8 columns. Template pixel data a0,0–a7,7 reside in a corresponding element processor during the motion vector calculation period.

Figures 19, 20:
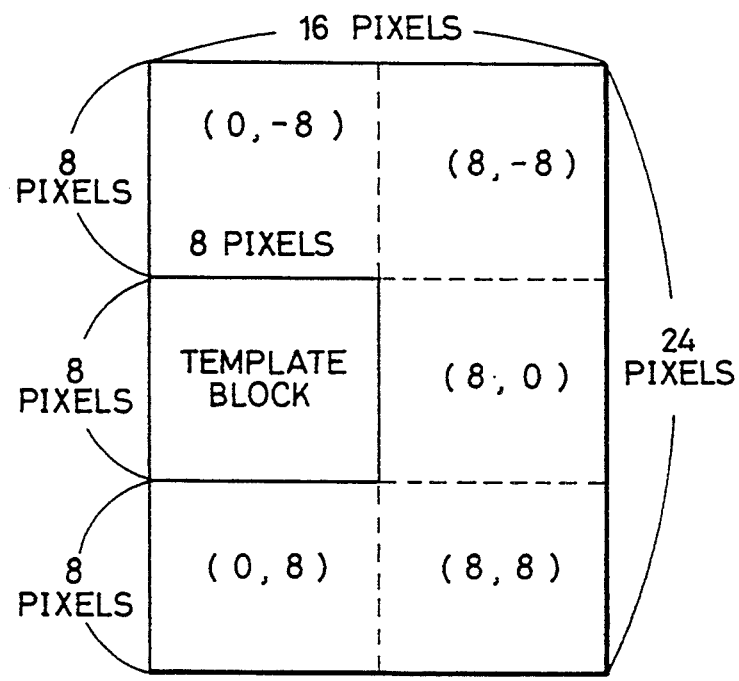
FIG. 19 shows arrangement of pixel data in the search area for the template block of FIG. 18.
FIG. 20 shows the variation range of a displacement vector in the search area of FIG. 19.

It is assumed that the search range is −8 to +8 in the horizontal direction and −8 to +8 in the vertical direction. FIG. 19 shows an arrangement of the pixel data in half of the search area, i.e. in the area of the search range of 0 to +8 in the horizontal direction. More specifically, the search area includes pixel data b0,0 to b23,15 arranged in 24 rows and 16 columns in FIG. 19. bi, j indicates a reference pixel arranged in the i-th row and j-th column in the search area.

With the arrangement shown in FIGS. 17, 18 and 19, an evaluation value for each of displacement vectors (0, −8) to (8, 8) is calculated. Although element processors PE0–PE63 are arranged in a matrix, the transfer direction of data is a one-way direction. Therefore, as shown in FIG. 21, element processors PE0–PE63 of processor array 10 and buffer DL are arranged in one column for the search window pixel data.

Figure 21:
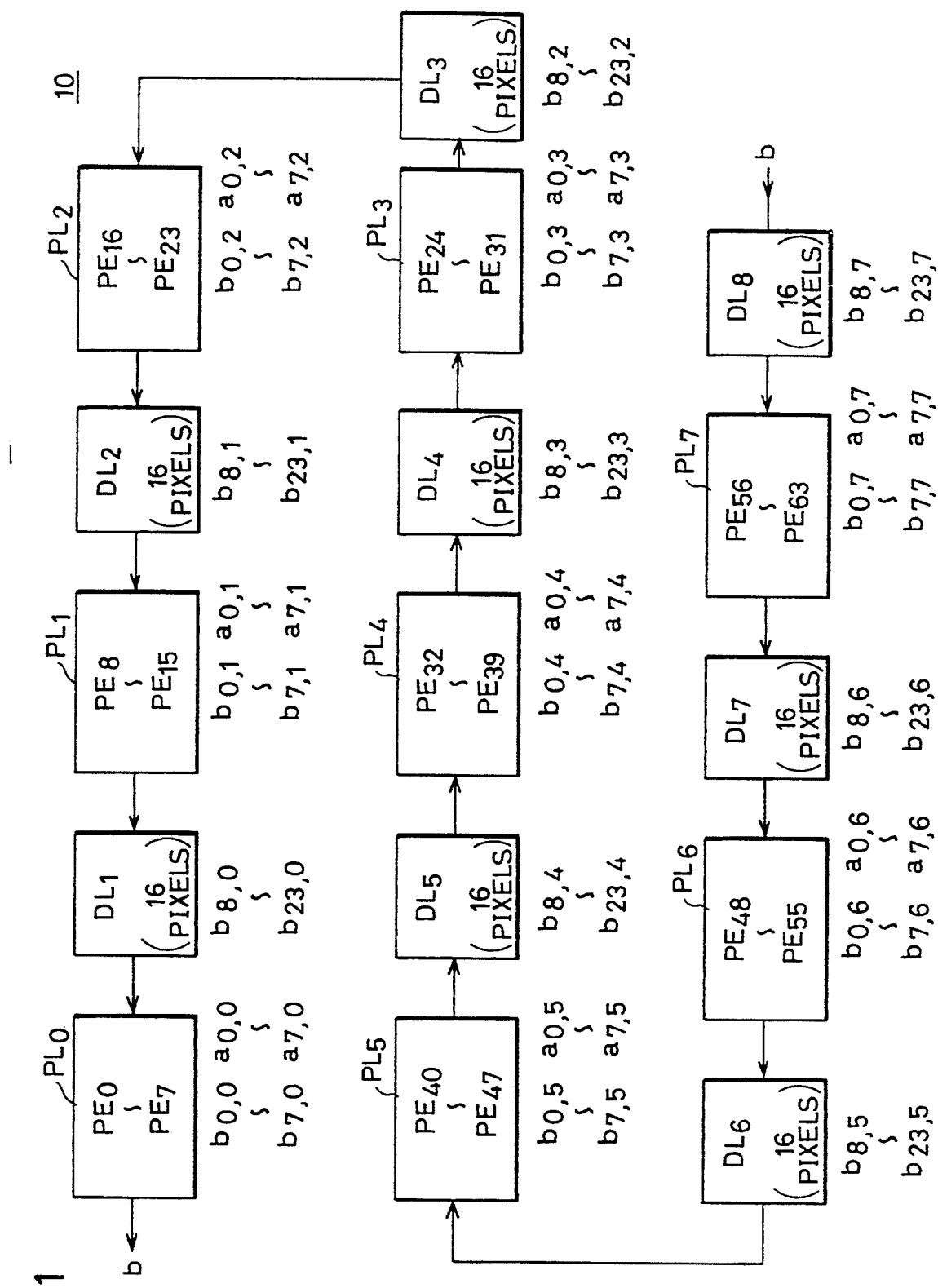
FIG. 21 shows the distribution of search window data in the processor array under starting state.

Referring to FIG. 21, a processor column PL1 includes element processors PE0–PE7, and a processor column PL2 includes element processors PE8–PE15. A processor column PLk includes element processors PE (8 k) to PE (8 k+7), where k=0–7. A buffer DL (k+1) is arranged between processor columns PLk and PL (k+1). Furthermore, a buffer DL8 is provided at the input portion of the most downstream (nearest to the pixel data input portion) processor column PL7. Each of buffers DL1–DL8 stores pixel data and transfer the data in a one-way direction.

As an initial state, the state where search window pixel data b0, 0–b7, 0 stored in processor column PL0 and pixel data b8, 0 and b23, 0 stored in buffer DL1, as shown in FIG. 21, is to be considered. In other words, the state where the 0th to 23th rows and the 0th to 7th columns are stored in the search area of FIG. 19 will be considered. Pixel data of the 0th–7th rows and the 0th–7th columns in the search area of FIG. 19 are stored in processor columns PL0–PL7. Here, pixel data of template pixel data a0, 0–a7, 7 indicated in FIG. 18 are stored in corresponding element processors PE0–PE63 such that 1 column of template pixel data a0, k–a7, k are stored in 1 processor column PLk. This state corresponds to a displacement vector (0, −8), and an evaluation value for this displacement vector is calculated.

Figure 22:
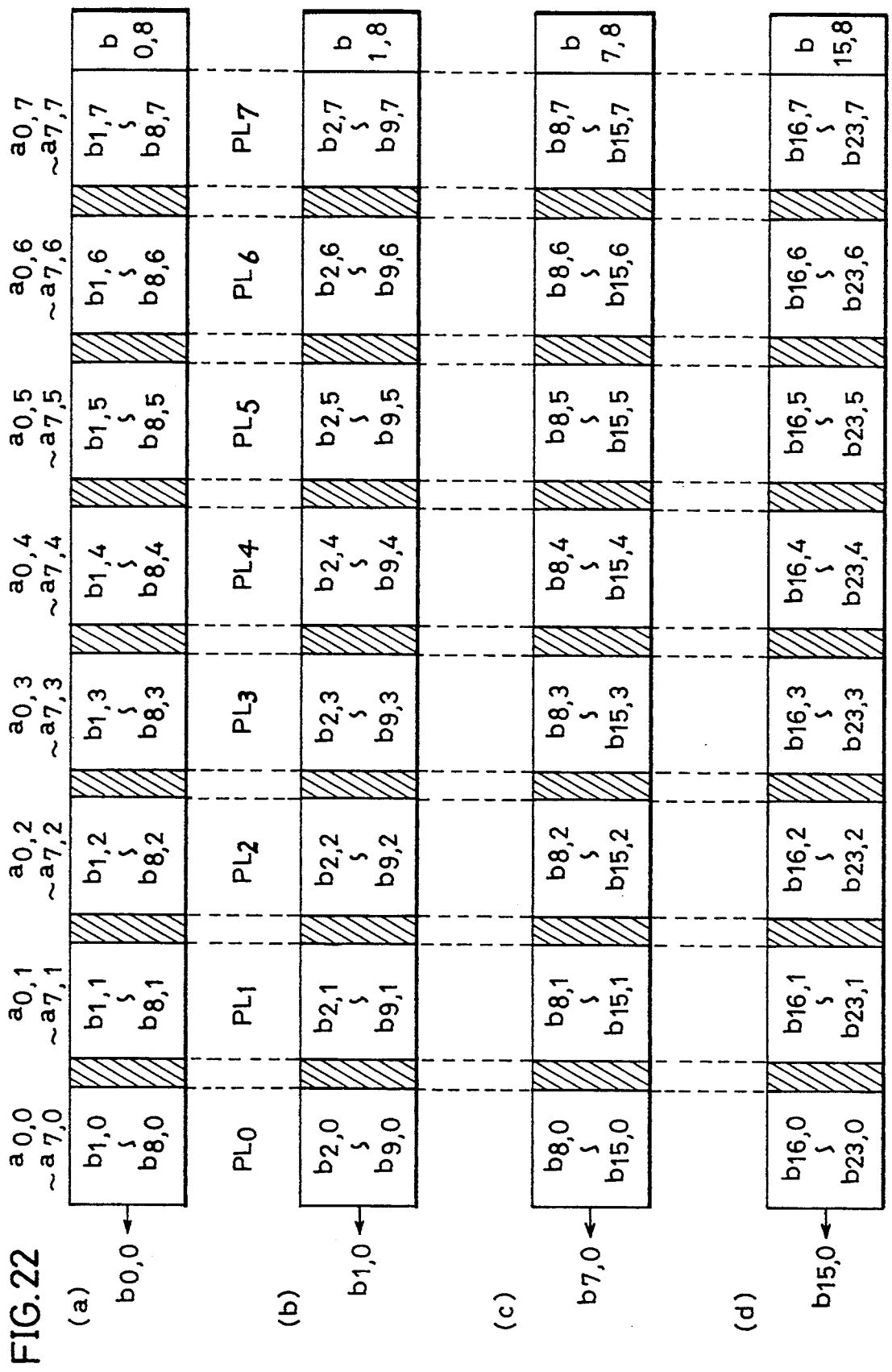
FIGS. 22 and 23 show change in the distribution of search window data in the processor array.

In the next cycle, shifting of the search window pixel data is carried out. More specifically, as shown in FIG. 22(a), pixel data b0, 0 is shifted out and pixel data b0, 8 is shifted in. This shifting operation is carried out via a buffer (indicated by a hatched line in FIG. 22). Pixel data of a search window block downwards by 1 row in the search area shown in FIG. 19 are stored in processor columns PL0–PL7. This new search window block corresponds to a displacement vector (0, −7). (The template block data is not shifted). By carrying out calculation under this state, an evaluation value for a displacement vector (0, −7) is calculated.

Then, as shown in FIG. 22(b), pixel data b1, 8 of the 1st row and the 8th column is shifted in, and pixel data b1, 0 is shifted out. Storage pixel data in processor columns PL0–PL7 is shifted downwards by 1 row (in FIG. 19). That is to say, a processor column PLk has search window block pixel data b2, k–b9, k stored therein. This search window block corresponds to a displacement vector (0, −6), and an evaluation value for this displacement vector is calculated.

By carrying out the above-described shifting and calculation operation, pixel data b7, 8 is shifted in and pixel data b7, 0 is shifted out as shown in FIG. 22(c). Pixel data b8, k–b15, k are stored in processor column PLk. The search window block stored in processor columns PL0–PL7 corresponds to a displacement vector (0, 0).

When the shift/calculation operation is carried out 8 times after calculation of an evaluation value for a displacement vector (0, 0), pixel data b15, 8 is shifted in and pixel data b15, 0 is shifted out, as shown in FIG. 22(d). The pixel data of a search window block corresponding to displacement vector (0, 8) is stored in the processor column. This search window block corresponds to a displacement vector (0, 8).

Figure 23:
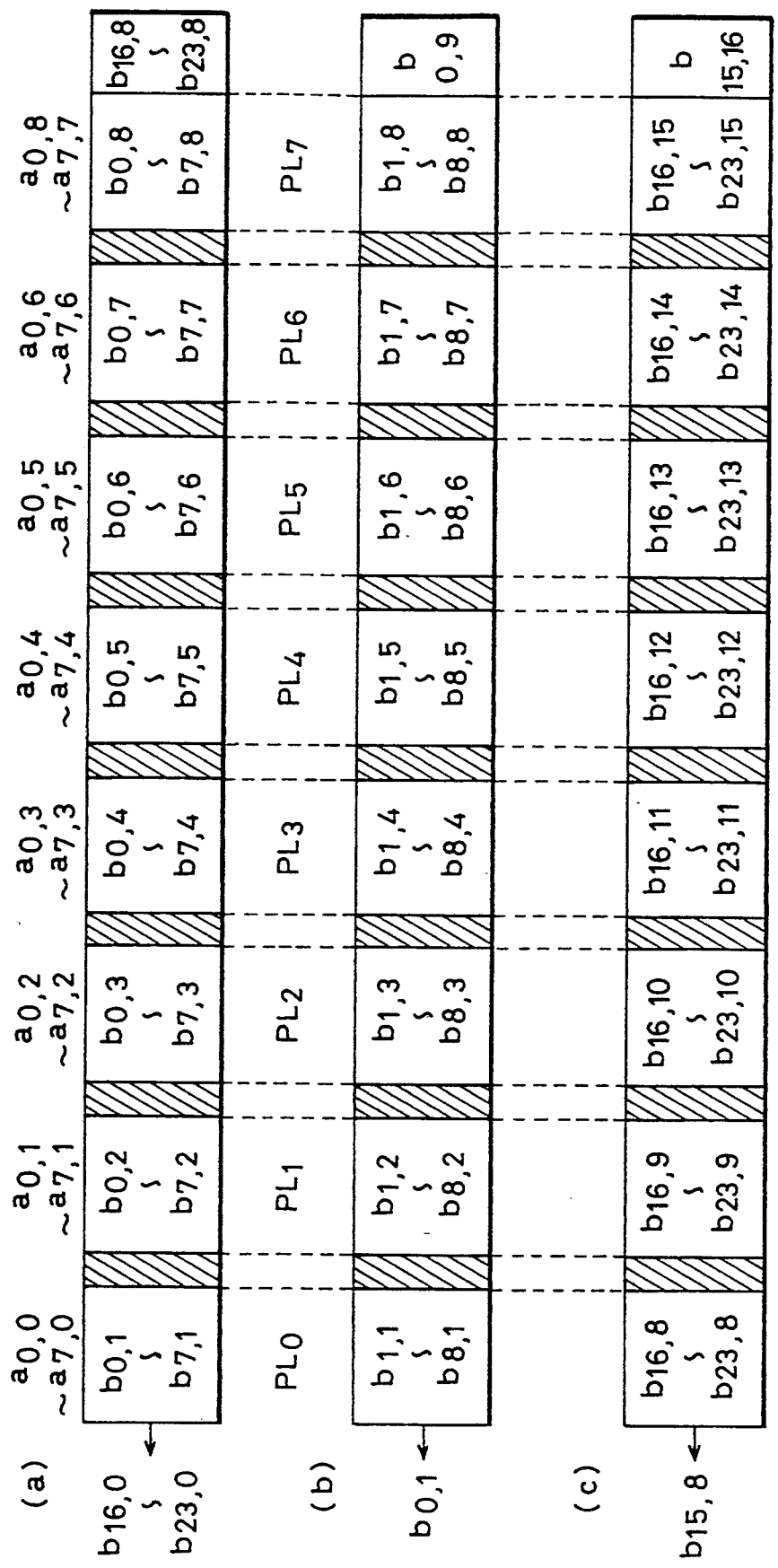

Following calculation of an evaluation value for a displacement vector of (0, 8), calculation of an evaluation value for a displacement vector (1, −8) is carried out. Here, all the pixel data of the 8th column in the search area are not yet shifted in. Therefore, the remaining search window pixel data b16, 8–b23, 8 in the 8th column are shifted in. In response, the unnecessary pixel data b16, 0–b23, 0 are shifted out. This is shown in FIG. 23(a). In the state shown in FIG. 23(a), pixel data b0, k+1 to b7, k+1 are stored in a processor column PLk. More specifically, the search window block pixel data for a displacement vector (1, −8) is stored in element processors PE0–PE63, and an evaluation value for a displacement vector (1, −8) is calculated.

Again, the shift/calculation operation of 1 pixel data is carried out. Specifically, pixel data b0, 9 is shifted in and pixel data b0, 1 is shifted out as shown in FIG. 23(b), whereby calculation of an evaluation value for a displacement vector (1, −7) is carried out.

The above-described operation is repeated until pixel data b15, 16 and pixel data b15, 8 are shifted in and shifted out, respectively, as shown in FIG. 23(c), to carry out calculation of an evaluation value for the last displacement vector (8, 8).

The above-described shift operation of a search area pixel data is equivalent to forming 1 pixel data column by concatenating each column in the matrix of the search area of FIG. 19 and shifting 1 pixel data one by one. The buffer is inserted so that only the required pixel data (search window block data) is stored in the element processor.

Figure 24:
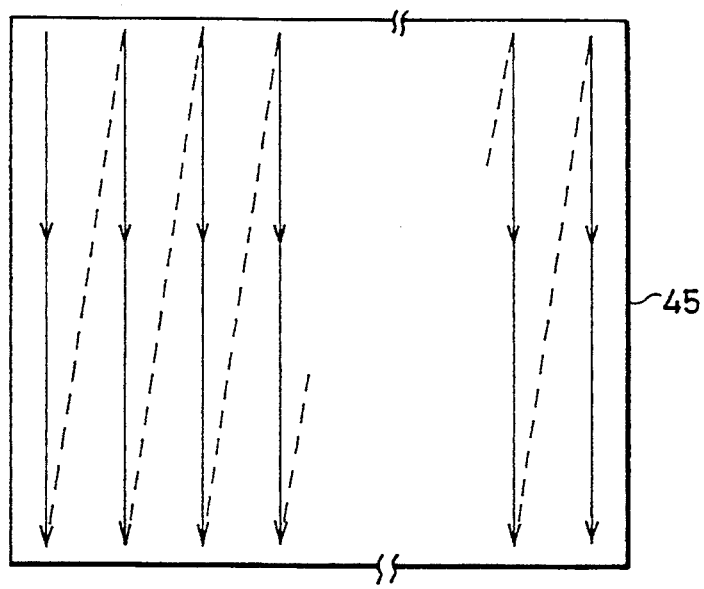
FIG. 24 shows the direction of scan of search window data in the search area.

In the above-described structure, the template block data resides in each element processor in the processor array. Only the data in the search area is shifted for each operation cycle. The scan direction of data in the search area is, as shown in FIG. 24, a one-way direction (downwards in the figure) in search area 45. Because data transfer of the search area is carried out in a one-way direction, a circuit arrangement that selects the data transfer direction is not required to reduce the complexity necessary for data transfer. Furthermore, power consumption can be reduced in response to reduction of the circuit complexity.

Figure 25:
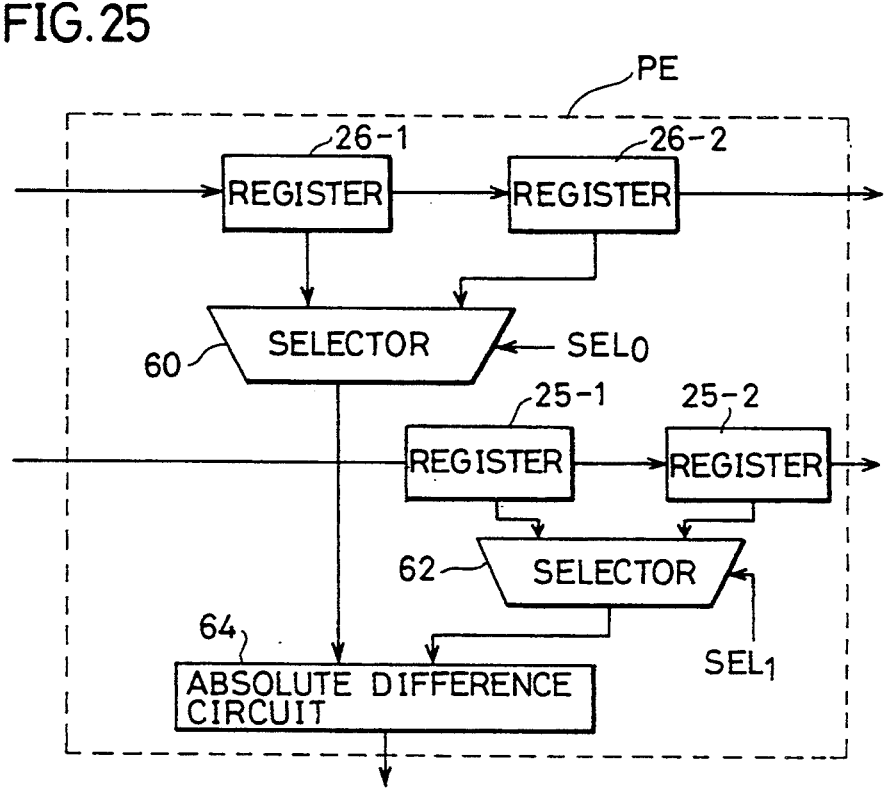
FIG. 25 specifically shows a structure of an element processor of FIG. 3.

FIG. 25 specifically shows a structure of an element processor PE. In the prior structure, only the search window data storage means and the template block data storage means were described. A specific structure of an element processor PE will be described hereinafter with reference to FIG. 25.

Referring to FIG. 25, an element processor PE includes two stage cascade-connected registers 26-1 and 26-2 for storing search window data, a selector 60 for selecting the data stored in one of registers 26-1 and 26-2 according to a select signal SEL, two stage cascade-connected registers 25-1 and 25-2 for storing template data, a selector 62 for selecting data stored in one of registers 25-1 and 25-2 according to a select signal SEL 1, and an absolute difference circuit 64 for obtaining an absolute difference of data selected by selectors 60 and 62. This structure corresponds to M=N=2 in FIG. 3.

Registers 26-1 and 26-2 form a shift register stage to carry out transfer and latching of data applied according to a clock signal not shown. Similarly, registers 25-1 and 25-2 form a shift register to carry out shifting and latching of template block data applied according to a transfer clock signal not shown.

Selector 60 operates in synchronization with selector 62, and selects a set of pairs of register 26-1 and register 25-1 or registers 26-2 and 25-2.

In the structure shown in FIG. 25, one element processor PE carries out calculation for 2 pixels of template block data.

Template block data resides in registers 25-1 and 25-2 until a corresponding motion vector is detected. Registers 26-1 and 26-2 storing search window data are shifted by 1 pixel for every cycle. Selectors 60 and 62 alternately select two registers during a transfer cycle of search window of 1 pixel data. In other words, absolute difference circuit 64 carries out calculation for obtaining an absolute difference at a half cycle of the search window data transfer cycle.

Figure 26:
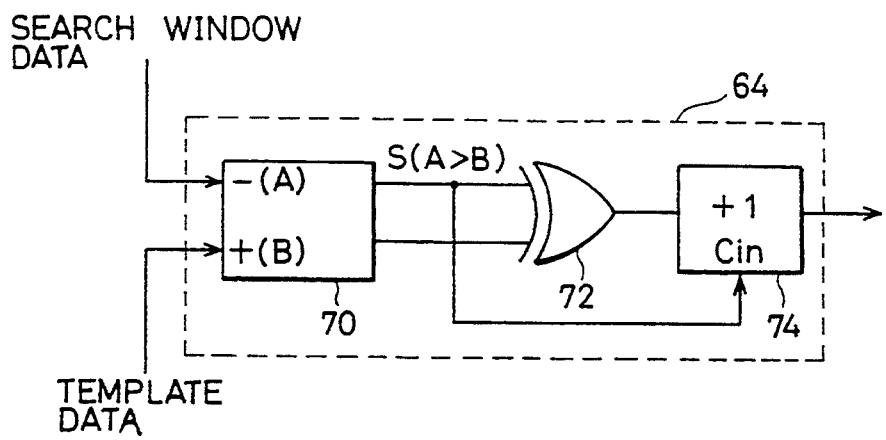
FIG. 26 specifically shows a structure of an absolute difference circuit of FIG. 25.

FIG. 26 shows specifically a structure of the absolute difference circuit of FIG. 25. Referring to FIG. 26, an absolute difference circuit 64 includes a subtractor 70 having a negative input (A) for receiving search window data from selector 60 of FIG. 25 and a positive input (B) for receiving template block data from selector 62 of FIG. 25. Subtractor 70 represents the subtraction result in signed multibit notation. Sign bit S (A>B) becomes "1" when the search window data is greater than the template block data, and otherwise becomes "0". It is assumed that the output of subtractor 70 represents data in the two's complement notation. Absolute difference circuit 64 further includes an ExOR circuit 72 for receiving the sign bit S (A>B) and the remaining bits from subtractor 70 (referred to as "magnitude bit" hereinafter), and an incrementer 74 for adding 1 to the output of ExOR circuit 72 according to the sign bit S (A>B). Incrementer 74 adds 1 to the output of ExOR circuit 72 when the sign bit S (A>B) is "1". When the sign bit S (A>B) is "0", incrementer 74 does not add 1 to the output of ExOR circuit 72 and intactly passes the value. ExOR circuit 72 carries out calculation for a pixel data (multibits). Each bit of the pixel data is inverted or not inverted depending on the value of the magnitude bit.

When the sign bit S (A>B) is "0", ExOR circuit 72 passes the magnitude bit (the remaining bit excluding the sign bit of the output of subtractor 70) from subtractor 70. When the sign bit S (A>B) is "1", ExOR circuit 72 inverts each bit in the magnitude bit of subtractor 70. More specifically, a module 2 addition of each bit of the magnitude bit from subtractor 70 and the sign bit S (A>B) is carried out in ExOR circuit 72.

Subtractor 70 carries out calculation of (B-A). If the subtraction result is positive, the sign bit S (A>B) is "0", if negative "1". The output of subtractor 70 is represented in the two's complement. Therefore, the absolute difference of |B-A| is output by selectively carrying out a bit inversion or a 1 increment of the output of the subtractor according to the sign bit S (A>B) with ExOR circuit 72 and incrementer 74.

Figure 27:
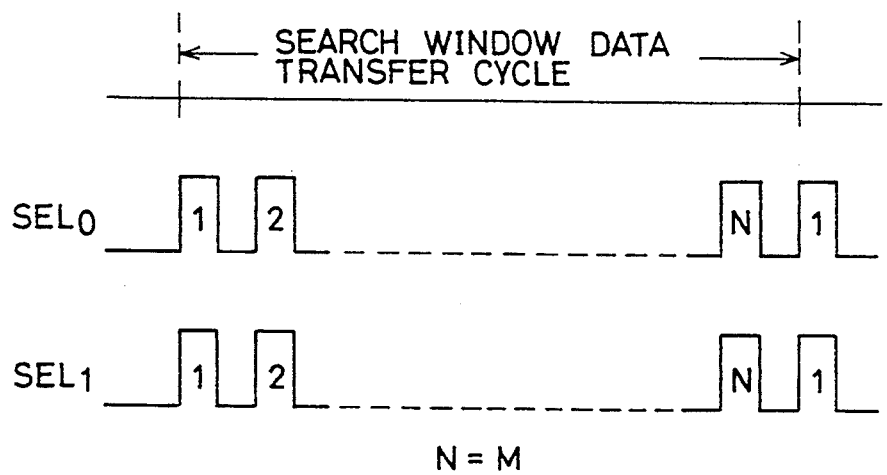
FIG. 27 is a signal waveform diagram showing operation of a generalized element processor of FIG. 25.

In the structure shown in FIG. 25, an element processor PE includes 2 search window block data storage registers and 2 template block data storage registers. This state corresponds to M=N=2. Under this state, selectors 60 and 62 carries out a selection operation at the cycle of 2 times the bit transfer rate of the search window data. Accordingly, absolute difference circuit 64 carries out calculation at the doubled speed of the search window data bit transfer rate. When N registers are provided, selectors 60 and 62 sequentially select N registers according to select signals SEL 0 and SEL 1 within 1 cycle of search window data transfer, as shown in FIG. 27. In this case, the absolute difference circuit carries out calculation at N times the bit transfer rate of the search window data (here, N=M).

Figure 28:
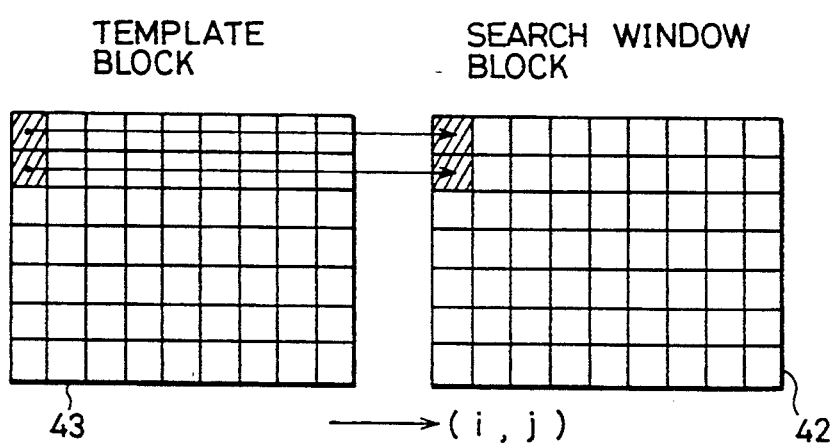
FIG. 28 is a diagram for describing the operation of the element processor of FIG. 25.

By using the two search window block data storage registers and the two template block data storage registers shown in FIG. 25 to carry out absolute difference calculation by alternately driving the two sets of registers, absolute difference calculation regarding two pixel data within 1 transfer cycle is carried out in 1 element processor, as shown in FIG. 28. Such a structure allows absolute difference calculation with the number of element processors reduced to a half, and has an advantage of reducing the size of the processor array. Another advantage can be obtained by providing a plurality of data storage registers in this case.

Figure 29:
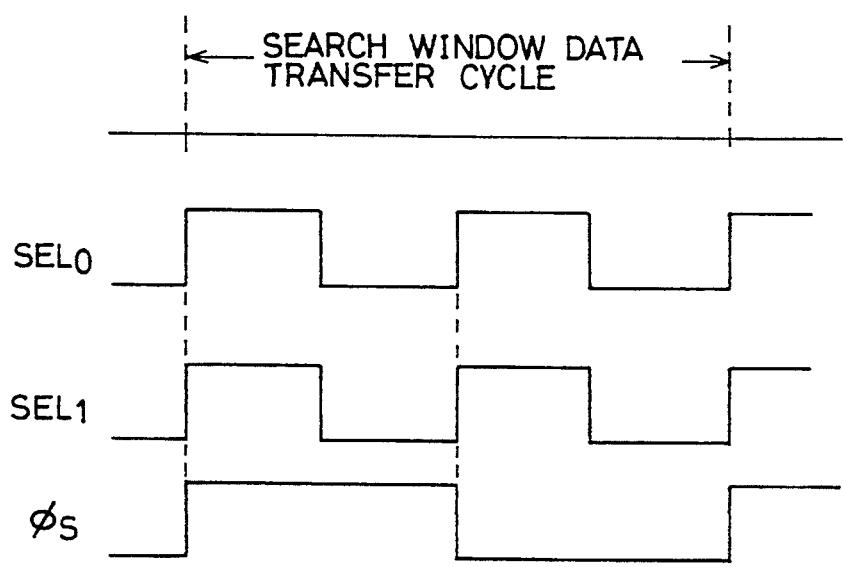
FIG. 29 is a signal waveform diagram showing another operation status of the element processor of FIG. 25.
Figure 30:
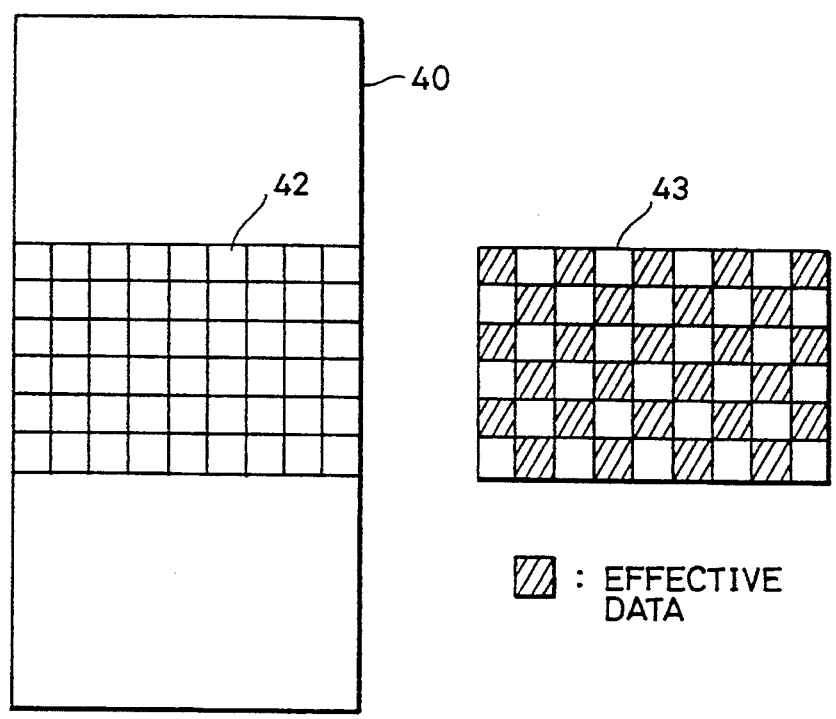
FIG. 30 shows the distribution of pixel data providing the effective calculation result at the time of operation in the operation waveform diagram of FIG. 29.

Referring to FIG. 29, select signals SEL 0 and SEL 1 are switched at two times the rate of the transfer rate of the search window data. In this case, a selection similar to that at the time of calculation for the two pixel data sets is carried out. An operational unit activation control signal $\phi S$ is generated at a cycle identical to the search window data transfer rate (refer to FIG. 29). Here, only the calculated result (absolute difference) for the set of pixel data first selected by select signals SEL0 and SEL1 is generated. The calculation result for the second set of pixel data specified by the second select signals SEL0 and SEL1 is not output. The search window block data is shifted by 1 pixel at each cycle. The template block data resides in the processor array until a motion vector is determined. Therefore, this is equivalent to carry out subsampling for a calculation result in a motion vector calculation, as shown in FIG. 30. The evaluation points in the absolute difference calculation can be culled out and an evaluation function (evaluation value) can be generated using a computing circuit of low speed. Thus, power consumption can be reduced and the circuit complexity of the evaluation value generating circuit can be reduced.

In an element processor, absolute difference calculation is carried out using only one of the template block data as shown in FIG. 30. (In FIG. 30, only the pixel data indicated by a hatched line is used in template block 43.) In this case, it is not necessary to store all the pixel data of template block 43 into the element processor of the processor array to carry out subsampling. The same effect can be obtained by storing only the required valid data in the element processor.

Figure 31:
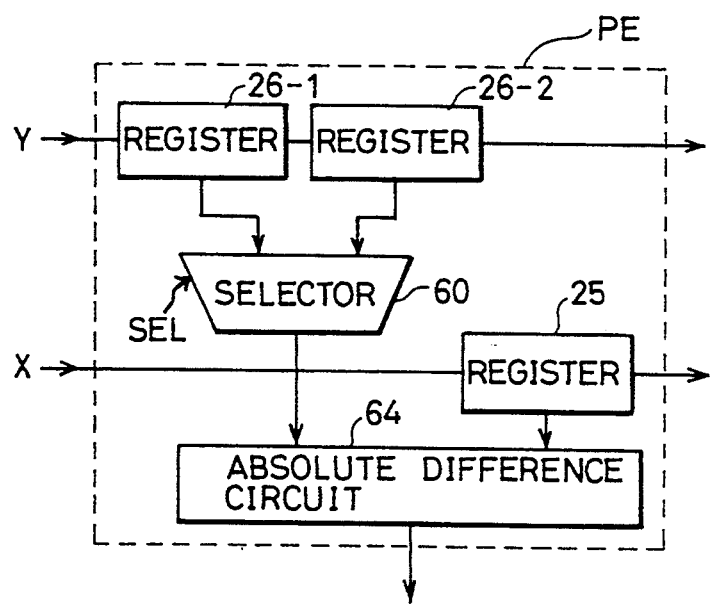
FIG. 31 specifically shows a structure of an element processor for realizing the operation of FIG. 30.

FIG. 31 shows another structure of an element processor. Referring to FIG. 31, an element processor PE includes two stage cascade-connected search window data storage registers 26-1 and 26-2, a selector 60 for sequentially selecting the stored data in registers 26-1 and 26-2 according to a select signal SEL, a one stage register 25 for storing template block data, and an absolute difference circuit 64 for obtaining the absolute difference of the data selected by selector 60 and the data stored in register 25.

In register 25 storing template block data, only the valid data (shaded area data) is stored in template block 43 of FIG. 30. Selector 60 selects the stored data in registers 26-1 and 26-2 according to a select signal SEL at two times the rate of the transfer rate of search window data Y. Absolute difference circuit 64 carries out calculation at a rate identical to the transfer rate of search window data Y. Therefore, the absolute difference of the stored data in one of registers 26-1 and 26-2 and the stored data in register 25 is constantly obtained. Absolute difference circuit 64 carries out calculation according to the applied data, and a data latch for subsampling may be provided at the output stage of absolute difference circuit 64.

In accordance with the above-described structure, calculation of a motion vector for a template block can be carried out at high speed. Also, the circuit complexity of an element processor can be reduced.

Instead of using selector 60, a structure may be implemented to transfer data from either register 26-1 or 26-2 to absolute difference circuit 64 by wiring so that evaluation value calculation is carried out for the valid data of template block 43 shown in FIG. 30.

Figure 32:
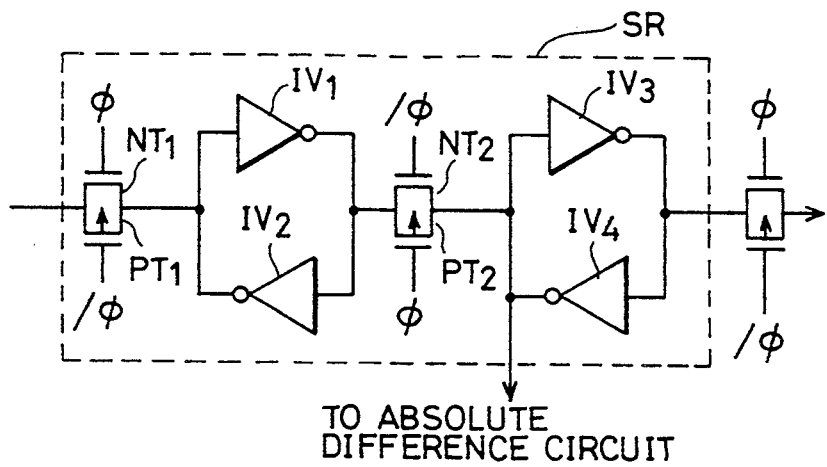
FIG. 32 shows an example of a structure of a data register used in the element processor.

FIG. 32 shows an example of structure of a data register. Referring to FIG. 32, a data register includes the structure of a shift register. Shift register SR includes an n channel MOS transistor (insulated gate type field effect transistor) NT1 for receiving a transfer clock signal $\phi$ at its gate, and a p channel MOS transistor PT1 for receiving a complementary transfer clock signal/$\phi$ at its gate. Transistors NT1 and PT1 implement a CMOS transmission gate for transferring an applied data in response to a clock signal $\phi$.

Shift register SR further includes an inverter circuit IV1 for inverting data transferred from transistors NT1 and PT1, an inverter circuit IV2 for inverting and transmitting the output data of inverter circuit IV1 to the input of inverter circuit IV1, an n channel MOS transistor NT2 for receiving a transfer clock signal/$\phi$ at its gate, a p channel MOS transistor PT2 for receiving a transfer clock signal $\phi$ at its gate, an inverter circuit IV3 for inverting the data transferred by transistors NT2 and PT2, and an inverter circuit IV4 for inverting and providing the output data of inverter circuit IV3 to provide the same to the input of inverter circuit IV3.

Inverter circuits IV1 and IV2 form one inverter latch circuit, and inverter circuits IV3 and IV4 form the other inverter latch circuit. Transistors NT2 and PT2 implement a CMOS transmission gate for transmitting applied data in response to a complementary transfer clock signal/$\phi$.

A plurality of shift registers shown in FIG. 32 are provided in parallel according to the bit number of the pixel data.

By using the shift register SR of FIG. 32 as a search window storage data register and a template block data storage data register, a one way transfer of pixel data and data selection is easily realized. When data is to be applied to an absolute difference circuit, data is to be derived from the input portion of inverter circuit IV3.

Figure 33:
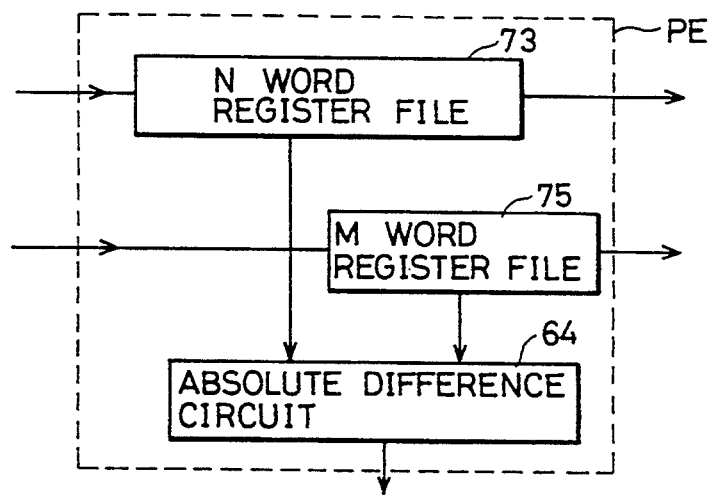
FIG. 33 shows another structure of an element processor.

FIG. 33 shows another structure of an element processor. Referring to FIG. 33, an element processor PE includes an N word register file 73 for storing search window data of N words, an M word register file 75 for storing template block data of M-words, and an absolute difference circuit 64 for taking an absolute difference of word data read out from N word register file 73 and M word register file 75. 1 word corresponds to 1 pixel data. From N word register file 73 and M word register file 75, data of 1 word are respectively read out and applied to absolute difference circuit 64. Register files 73 and 75 include a plurality of register having a FIFO structure.

In the above-described structure, it is not necessary to provide a select circuit. A set of corresponding pixel data can be applied to absolute difference circuit 64 by carrying out data read out in synchronization in register files 73 and 75. The structure of a register file will be described in details afterwards. Absolute difference circuit 64 has the calculation rate or data output rate determined according to the processing method (subsampling or sampling of all pixel data).

Figure 34:
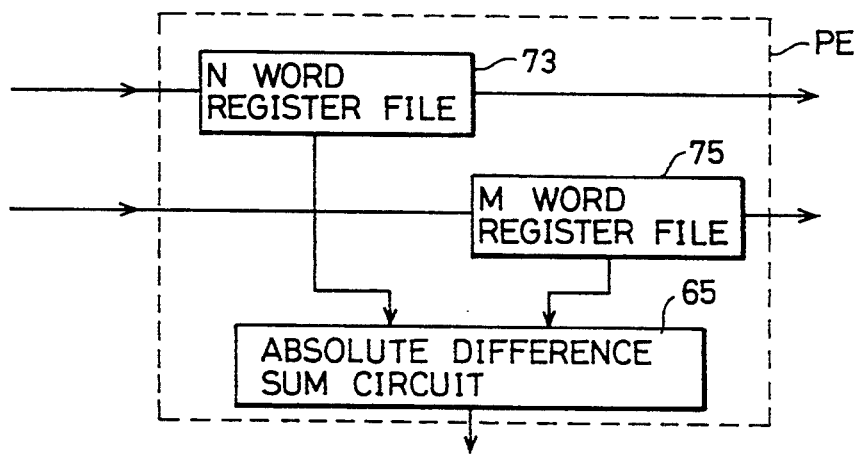
FIG. 34 shows another structure of an element processor.

FIG. 34 shows another structure of an element processor. Referring to FIG. 34, an element processor PE includes an absolute difference summation circuit 65 instead of an absolute difference circuit 64 in element processor PE. More specifically, the element processor PE shown in FIG. 34 carries out calculation of an absolute difference of template block data of M words stored in M word register file 75 and accumulation of the absolute difference. Because partial summation of the M template block pixel data is transferred to the summation unit, the total summation calculation can be increased in speed.

Figure 35:
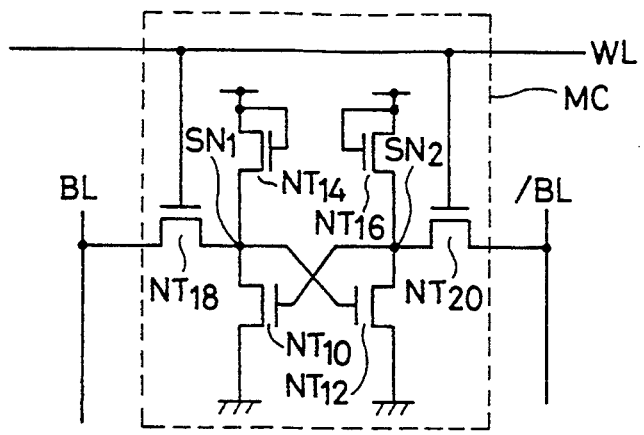
FIG. 35 shows another structure of a data register.

FIG. 35 shows a structure of 1 bit in the register file shown in FIG. 33 and 34. Referring to FIG. 35, the basic unit of a register file includes a memory cell MC arranged corresponding to the crossing of a word line WL and a bit line pair BL and/BL. Memory cell MC of a SRAM cell structure includes n channel MOS transistors NT10 and NT12 having the source and drain cross-coupled, a resistor-connected n channel MOS transistor NT14 functioning as a load element for pulling a storage node SN1 to a H level (logical high), a resistor-connected n channel MOS transistor NT16 for pulling up the level of a storage node SN2, and n channel MOS transistors NT18 and NT20 for connecting storage nodes SN1 and SN2 to bit lines BL and/BL, respectively, in response to the signal potential on word line WL. This memory cell MC utilizes a cross-coupled inverter circuit as a storage element. Because the structure components thereof are 6 transistors, the occupying area per 1 bit can be reduced than the shift register shown in FIG. 32.

Figure 36:
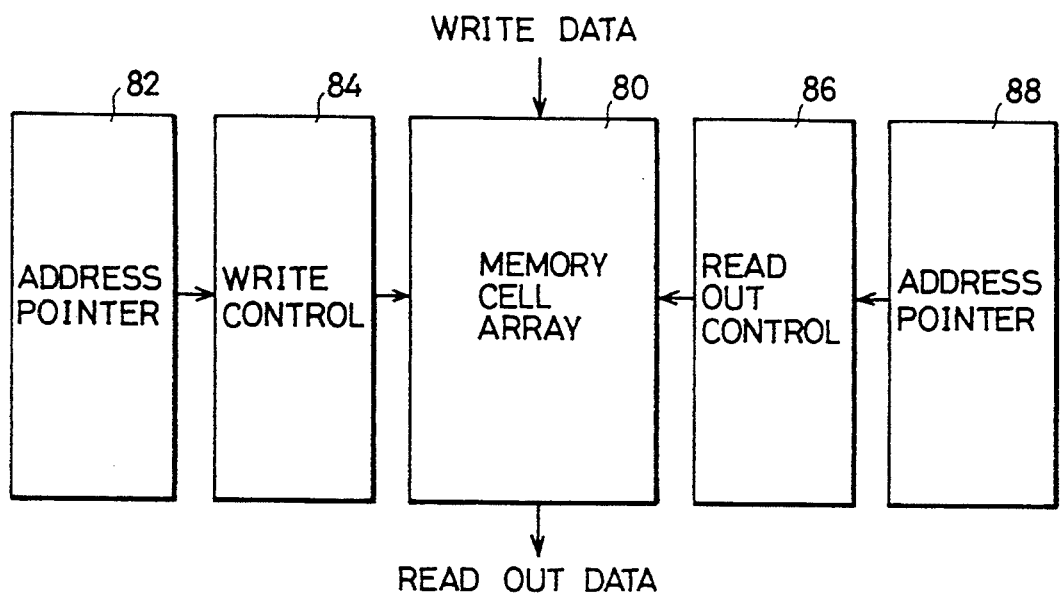
FIG. 36 shows a structure of a data register including the unit structure of FIG. 35.

FIG. 36 shows a structure of a register file. Referring to FIG. 36, a register file includes a memory cell array 80 having the memory cells of FIG. 35 arranged in a matrix, a write address pointer 82 for generating a write address, a write control circuit 84 to select one word in memory cell array 80 according to an address from address pointer 82 for writing data into the selected word, a read out address pointer 88 for generating a read out word address, and a read out control circuit 86 to select a corresponding word in memory cell array 80 according to an address from address pointer 88 for reading out data from the selected word. Memory cell array 80 stores 1 pixel data in 1 word region. 1 word may correspond to 1 word line.

In data writing, address pointer 82 generates a write address. Write control circuit 84 selects a corresponding word line WL and a bit line pair (when a plurality of words are stored in 1 word line) according to the generated write address. Write data is written into the selected word under control of write control circuit 84. In data reading, a word is similarly selected by address pointer 88 and read out control circuit 86, whereby data of a selected word is read out.

In pixel data shift operation, the address at which the oldest data is stored is generated from address pointer 88. Read control circuit 86 selects this oldest data word and reads out data of the corresponding word from memory cell array 80. Address pointer 82 specifies an address succeeding the most recently written address. Write control circuit 84 selects the address position succeeding the most recently written word to write data into that address position. As a result, transfer of search window data of 1 pixel or transfer of template block data is realized. Because the write path and the read path are different, the read out data and the write data will not collide. This structure can easily be realized by using a ring counter of the maximum count value M as address pointer 82 and 88.

In the calculation operation for obtaining an absolute difference, read out address pointer 88 generates an address so that the M words stored in a predetermined order are sequentially selected. In this case, read out of a data word is sequentially carried out starting from the least recently written data when the structure is N>M where subsampling is carried out. When N=M and subsampling is not carried out, address pointer 88 generates an address so as to sequentially read out all the stored word data in a predetermined order.

When subsampling is carried out, only the required data may be read out at a predetermined subsampling rate.

When data of N words or M words are to be written into each register file at the time of initialization, data transfer is carried out via the register file. In this case, a structure is allowed where data is read out and written by 1 word sequentially when data of N or M words are stored in the most downstream register file. This is realized by a structure where read out control circuit 86 is enabled when the address of the write address pointer 82 reaches a predetermined value. Also, a path may be provided that bypasses the write data to a read out data both paths only at the time of initialization. In the case of such a structure, the bypass path is blocked when the count of transfer clocks in each register file reaches a predetermined value. After data writing is carried out and writing is completed, data writing is inhibited.

The register file shown in FIG. 36 may be used as the side window data storage data buffer shown in FIG. 4.

Figure 37:
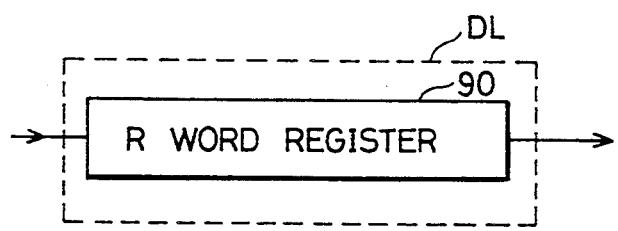
FIG. 37 shows a structure of the data buffer shown in FIG. 4.

FIG. 37 shows an example of a structure of the data buffer shown in FIG. 4. Referring to FIG. 37, data buffer DL includes R word registers 90 for storing data of R words. R word register 90 may include the structure of the dual port memory shown in FIG. 36. It may be formed of a shift register storing data of R words. Furthermore, a structure may be used having delay elements such as D latches cascade-connected.

By using a register file as delay means different from shift registers, the circuit complexity and power consumption can be reduced (due to the reduced number of transistors).

Figure 38:
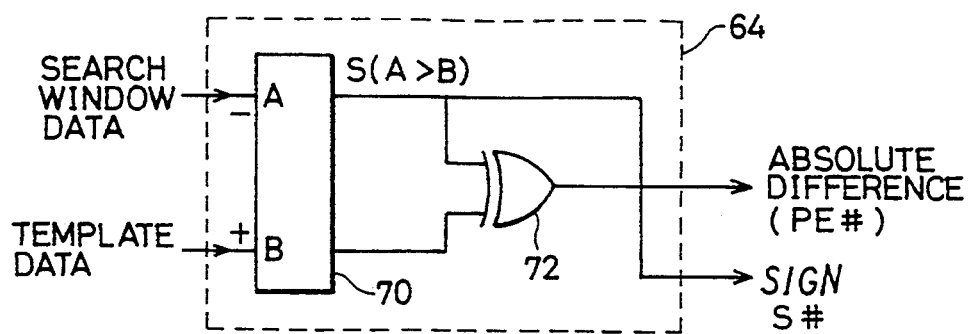
FIG. 38 shows a structure of another absolute difference circuit used in the element processor according to the present invention.

FIG. 38 shows another structure of an absolute difference circuit. The absolute difference circuit of FIG. 38 includes a subtractor 70 for carrying out subtraction between search window data and template block data, and an ExOR circuit 72 for receiving a magnitude bit and a sign bit S (A>B) output from subtractor 70. Absolute difference circuit 64 of FIG. 38 differs from the absolute difference circuit of FIG. 26 in that an incrementer is not included. The incrementer serves to add 1 to the output of ExOR circuit 72 when the sign bit S (A>B) is "1". The operation of adding this 1 is not carried out in the absolute difference circuit 64 shown in FIG. 38. It is carried out in the summation unit of the next stage. More specifically, absolute difference circuit 64 of FIG. 38 provides an absolute difference PE# and a sign bit S# to apply the same to the summation unit of the next stage.

Figure 39:
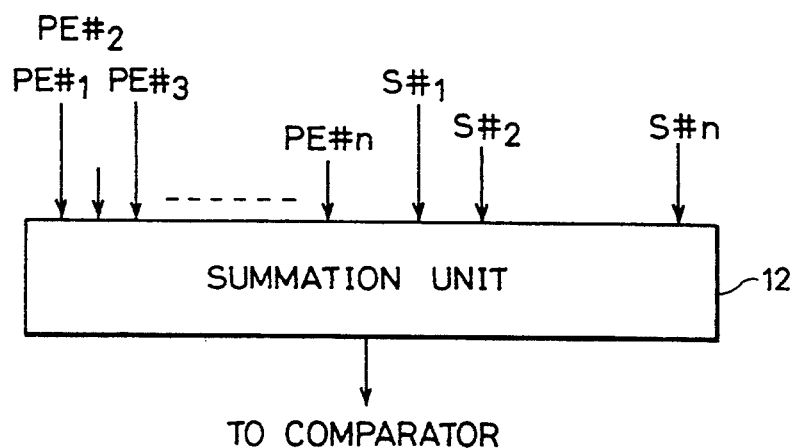
FIG. 39 shows a structure of the summation unit when the absolute difference circuit of FIG. 38 is used.

FIG. 39 is a block diagram showing a structure of the summation unit when the absolute difference circuit of FIG. 32 is used. Referring to FIG. 39, summation unit 12 adds the values of PE#i-PE#n corresponding to the absolute differences from the n element processors and sign bits S#i-S#n. PE#i-PE#n corresponding to the absolute differences are multi bit data, and sign bits S#i-S#n are a 1 bit data. Summation unit 12 is formed of a compressor including full adders receiving values PE#i-PE#n corresponding to absolute differences. The structure of summation unit 12 will be described afterwards. Sign bits S#i-S#n are provided to the carry input of the least significant bit of this compressor. Thus, the speed of summing operation is increased and the device complexity reduced.

Figure 40:
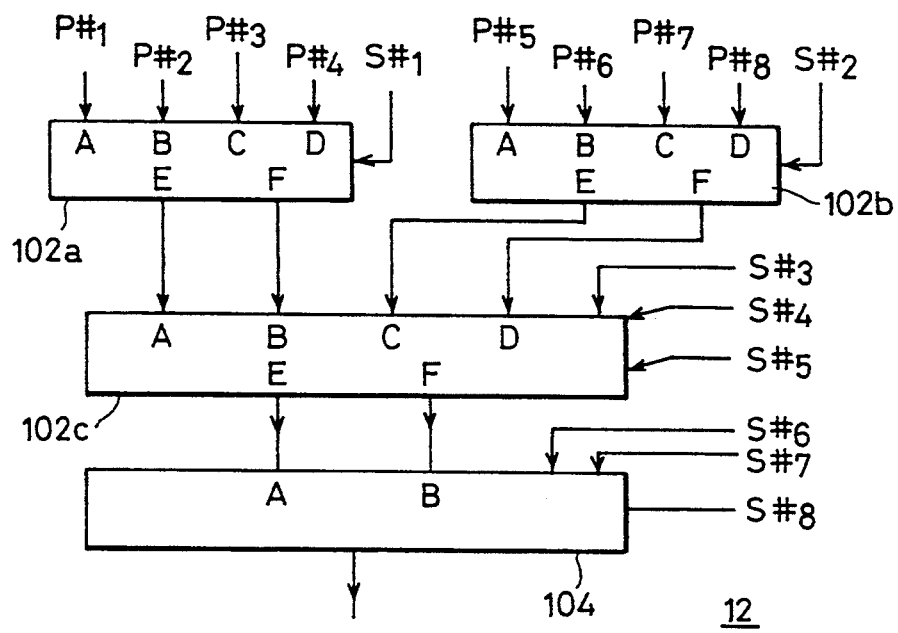
FIG. 40 shows a specific structure of the summation unit of FIG. 39.

FIG. 40 specifically shows an example of structure of the summing unit of FIG. 39. FIG. 40 shows a structure where the outputs of n element processors are added. The structure of FIG. 40 is expanded according to the number of the element processors.

Referring to FIG. 40, summation unit 12 includes a 4-to-2 compressor 102a for receiving values P#i-P#4 corresponding to the absolute differences from the four element processors at inputs A, B, C and D, respectively, and a sign bit S#1 at its carry input for addition thereof to provide the added result from the two outputs of E and F, a 4-to-2 compressor 102b for receiving values P#5-P#8 corresponding to absolute differences at inputs A-D, respectively, and a sign bit S#2 at the carry input of the least significant bit and carrying addition thereof to provide the addition result from the two outputs of E and F, and a 4-to-2 compressor 102c for receiving the outputs of 4-to-2 compressors 102a and 102b at the four inputs A, B, C and D, respectively, and sign bits S#3, S#4 and S#5 at its least significant bit positions. The 4-to-2 compressor 102c can receive the 3 bits of sign bits S#3, S#4 and S#5 because it includes 2 stages of full adder circuit stages. The structure thereof will be described specifically later.

Summation unit 12 further includes an adder 104 for receiving the outputs of 4-to-2 compressor 102c (E and F) at its input A and B and sign bits S#6, S#7 and S#8 at the carry inputs of the least significant bits. A summation result is provided from adder 104.

Summation unit 12 has the structure of the so-called Wallace Tree to allow summation at high speed minimizing the carry propagation delay. Summation unit 12 of FIG. 40 does not include an accumulator. When the calculation rate is faster than the search window data transfer rate, it is necessary to carry out addition a plurality of times. An accumulator is provided at the output portion of addition circuit 104 for this purpose (when the element processor includes a plurality of template block data storage means). The addition result (sum of the absolute difference) data may be transferred from the element processor to the summation unit for each calculation cycle.

Because the sign bit is applied to the carry input of the least significant bit in the above structure, addition can be carried out at high speed with a small circuit complexity. The structure of the 4-to-2 compressor (4-input 2-output adder) and specific structure of the summation unit will be described hereinafter.

Figure 41:
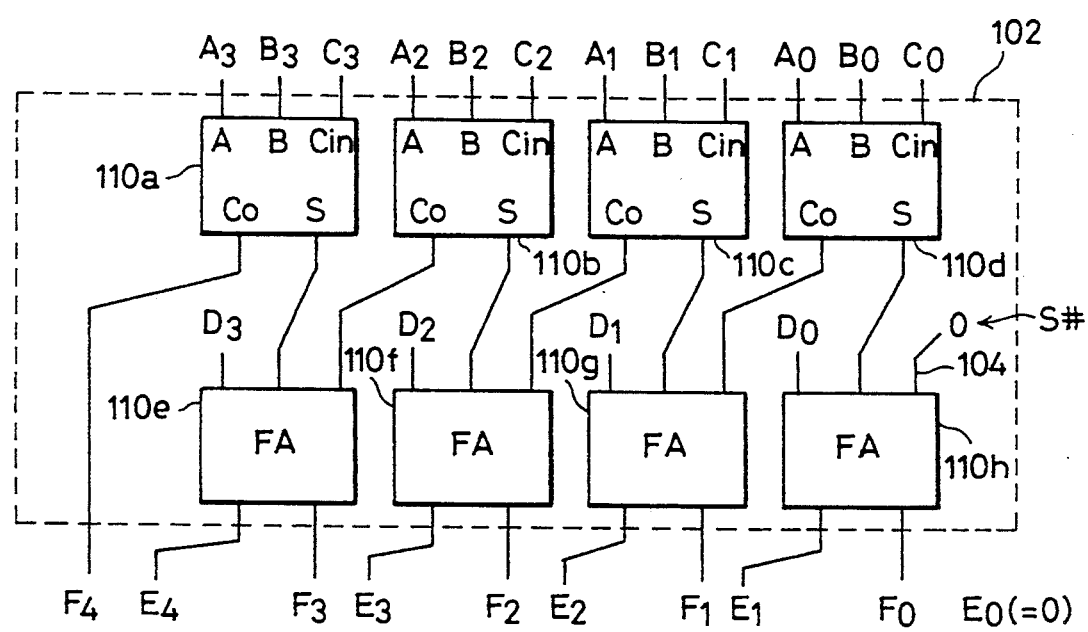
FIG. 41 shows a structure of the 4-to-2 compressor of FIG. 39.

FIG. 41 shows a specific structure of the 4-to-2 compressor of FIG. 4. The 4-to-2 compressor of FIG. 41 has a structure corresponding to data of a 4 bit width. The structure of FIG. 41 is expanded according to the increase of the bit width of the input data.

Referring to FIG. 41, a 4-to-2 compressor 102 includes full adder circuits 110a, 110b, 110c and 110e arranged in parallel, each having inputs A and B, a carry input Cin, a carry out Co and a sum output S. Each of full adder circuits 110a–110d have inputs A and B receiving 4 bit input data A<3;0> and B<3;0> and its carry input Cin receiving input data C<3;0>. Data A<3;0> indicates that data A are 4 bits of A3–A0 with the most significant bit A3 and the least significant bit A0.

4-to-2 compressor 102 further includes full adder circuits 110e, 110f, 110g and 110h for carrying out addition of sum outputs S and carry outputs Co of full adder circuits 110a–110d of the first stage and the input data D<3;0>. Full adder circuits 110a–110d and 110e–110h are arranged with the digits aligned. The sum outputs S of full adder circuits 110a–110d of the first stage are applied to the inputs (A or B) of the corresponding full adder circuit of the subsequent stage. The carry outputs Co of full adder circuits 110a–110d of the first stage are applied to the carry inputs of full adder circuits at 1 bit higher significance in the full adder circuit of the subsequent stage. In the full adder circuit (FA), 0 is applied to the carry input 104 of full adder circuit 110h of the least significant bit. That is to say, the carry input of full adder circuit 110h becomes an empty carry. In the present embodiment, a sign bit S# is applied to this empty carry 104. 5 bit data E<4;0> and F<4;0> are provided from 4-to-2 compressor 102. The sum output S of full adder circuit (FA) 110a–110h provides data bit F<3;0>, and the carry out of full adder circuits (FA) 110e–110h provides data bit E<4;0>. The carry output of full adder circuit 110a of the first stage provides data bit F<4>.

In the structure of 4-to-2 compressor 102 of FIG. 41, carry propagation does not exist. The delay time required for calculation is caused by the two stages of the full adder circuits. Thus, addition can be carried out at high speed. Also, addition of absolute differences can be carried out without increasing the circuit complexity on account of a sign bit S# applied to an empty carry 104.

Figure 42:
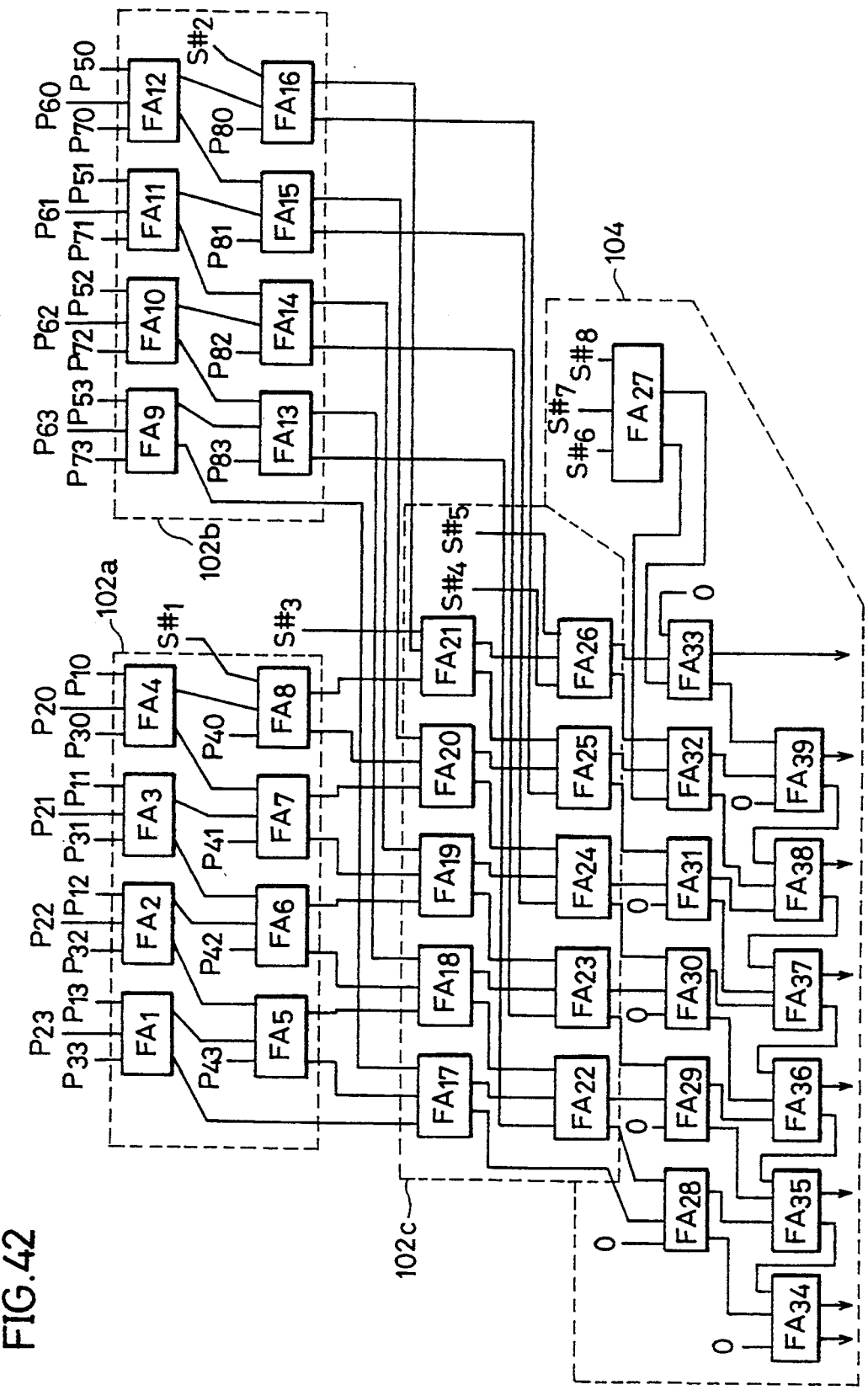
FIG. 42 shows a specific structure of the summation unit of FIG. 39.

FIG. 42 specifically shows the connection of the circuit structure of FIG. 40. The summation unit of FIG. 42 uses the 4-to-2 compressor of FIG. 41. Here, absolute difference P#i is expressed as (Pi3, Pi2, Pi1, Pi0).

4-to-2 compressor 102a includes full adder circuits FA1–FA4 for adding absolute difference P#1-P#3, and full adder circuits FA5, FA6, FA7 and FA8 for adding the outputs of full adder circuits FA1–FA4 and an absolute difference P#4. A sign bit S#1 is applied to the carry input of full adder circuit FA8.

4-to-2 compressor 102b includes full adder circuits FA9, FA10, FA11 and FA12 for adding absolute differences P#5-P#7, and full adder circuits FA13, FA14, FA15 and FA16 for adding the outputs of full adder circuits FA9–FA12 and an absolute difference P#8. A sign bit S#2 is applied to the carry input of full adder circuit FA16.

4-to-2 compressor 102c includes full adder circuits FA17–FA21 for adding the output of 4-to-2 compressor 102a to one output of 4-to-2 compressor 102b (the sum output of full adder circuits FA13–FA16 and the carry output of full adder circuit FA9), and full adder circuits FA22–FA26 for adding the outputs of full adder circuits FA17–FA21 to the other output of 4-to-2 compressor 102b (the carry output of full adder circuits FA13–FA16). Sign bits S#4 and S#5 are applied to the carry input and the one input of full adder circuit FA26, respectively.

Adder 104 includes a full adder circuit FA27 for adding sign bits S#6-S#8, full adder circuits FA28–FA33 for adding the output of full adder circuit FA27 and the output of 4-to-2 compressor 102c, and full adder circuits FA34–FA39 receive the outputs of full adder circuits FA28–FA33, and provide the final addition result. Full adder circuits FA28–FA33 form a 3-to-2 compressor. Full adder circuits FA34–FA39 form a ripple carry type adder. Other structures of adders (for example, a carry look-ahead adder) may be used.

By carrying out addition using such a compressor shown in FIG. 42, the delay accompanying carry propagation can be suppressed to a minimum to carry out addition at high speed.

Comparator I

Figure 43:
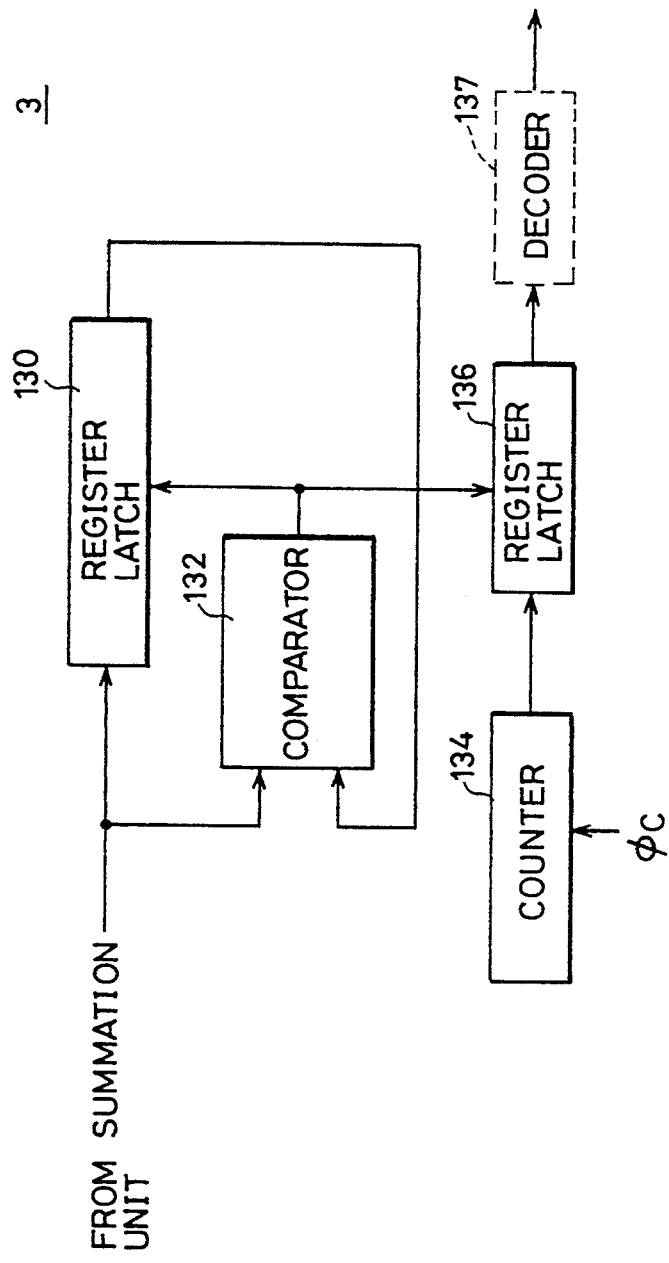
FIG. 43 shows a specific structure of the comparator of FIG. 1.

FIG. 43 specifically shows another structure of the comparator unit shown in FIG. 1. (The priority identification function is not indicated). Referring to FIG. 43, a comparator unit 3 includes a register latch 130 for storing an evaluation value (evaluation function provided from the summation unit, a comparator 132 for comparing the magnitude of the evaluation value stored in register latch 130 and the evaluation value (evaluation function) newly provided from the summation unit, a counter 134 for counting the evaluation value calculation cycle number, and a register latch 136 responsive to an output of comparator 132 to store the count value of counter 134. A motion vector may be directly output from register latch 136, or a decoder may be provided to code the output of register latch 136 in a predetermined format as shown in the block 137 of the broken line in the drawing. The operation thereof will be described hereinafter.

At the start of a motion vector calculation for one template block, counter 134, register latch 130, and register latch 136 are reset. The initialization value of register latch 130 is set to a value greater than the maximum evaluation value (for example full bit "1"). When an evaluation value for one displacement vector is provided, comparator 132 compares the value stored in register latch 130 with the evaluation value provided from the summation unit. If the newly applied evaluation value (evaluation function) from the summation unit is smaller than the value stored in register latch 130, comparator 132 generates a latch instructing signal. In response, register latch 130 stores the evaluation value (evaluation function) provided from the summation unit. Similarly, register latch 136 latches the count value of counter 134 as a candidate of a motion vector.

For the next displacement vector, counter 134 responds to a control signal $\phi C$ to increment the count value by 1. When an evaluation value calculation is completed, comparator 132 compares the magnitude of the evaluation value (evaluation function) newly applied from the summation unit with the value stored in register latch 130. If the newly applied evaluation value is greater than the value stored in register latch 130, comparator 132 does not generate a latch instructing signal. If the newly applied evaluation value (evaluation function) is smaller than the value stored in register latch 130, a latch instructing signal is generated. This operation is carried out for all the evaluation values for all displacement vectors. As a result, the minimum evaluation value of all the evaluation values is stored in register latch 130. Register latch 136 has the count value of counter 134 latched indicating the operation cycle provides the minimum evaluation value. The count value of counter 134 is used as a motion vector.

When this motion vector is obtained, counter 134 and register latches 130 and 136 are initiated again, whereby calculation for a motion vector of the next template block is carried out.

Comparator II

Figure 44:
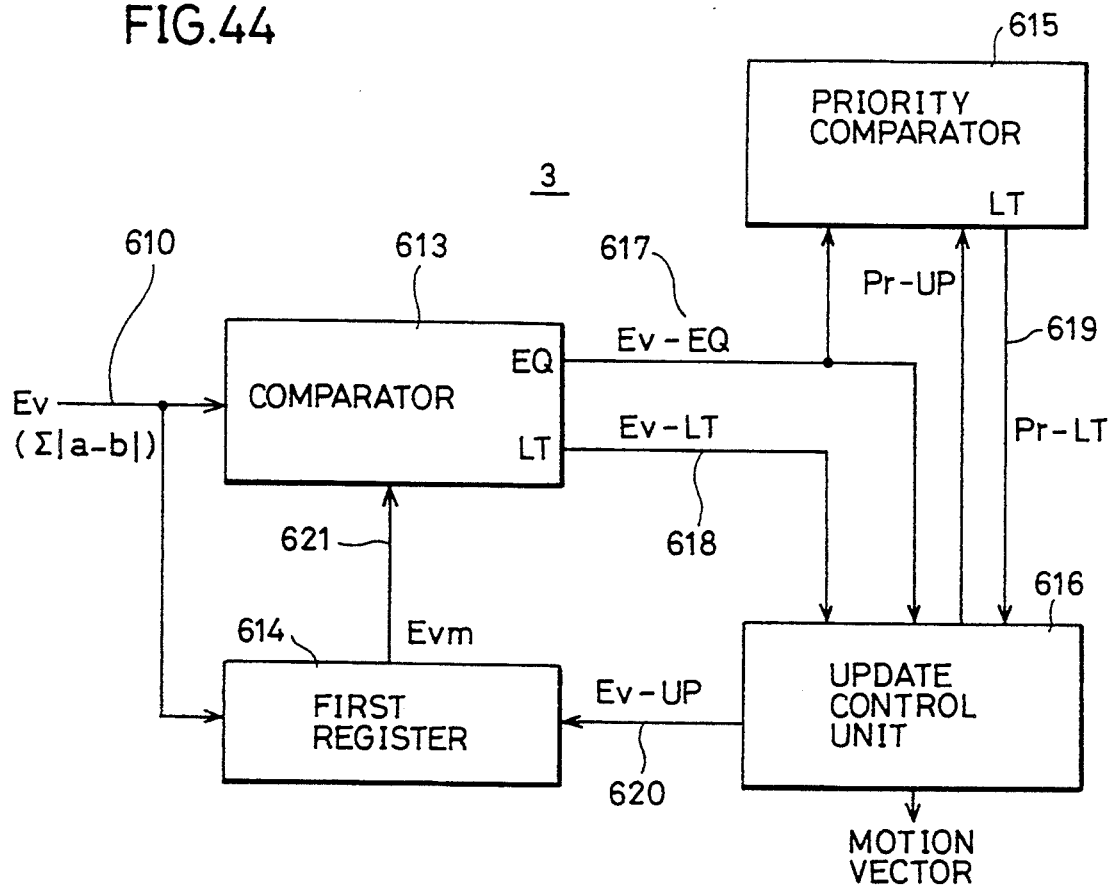
FIG. 44 specifically shows a structure of the comparator shown in FIG. 1.

FIG. 44 shows a another structure of a comparator unit.

Referring to FIG. 44, a comparator unit 3 includes a first register 621 for holding the minimum evaluation value Evm, and a comparator 613 for comparing an evaluation value Ev ($=\Sigma|a-b|$) provided from an operational unit 3 and the minimum evaluation value Evm held in first register 621. Comparator 613 asserts the signal Ev-EQ on a signal line 617 when the evaluation value Ev is equal to the minimum evaluation value Evm.

When an evaluation value Ev is smaller than the minimum evaluation value Evm, that evaluation value Ev newly provided from operational unit 3 is taken as the minimum value, and the signal Ev-LT on a signal line 618 is asserted.

Comparator unit 3 further includes a priority comparator 615 responsive to a signal Ev-EQ from comparator 613 for comparing a priority assigned to the displacement vector corresponding to evaluation value Ev and a priority assigned to the displacement vector corresponding to the minimum evaluation value Evm held in first register 614. Comparator 619 asserts a signal Pr-LT on signal line 619 when the priority of the displacement vector associated with the currently applied evaluation value Ev is higher than the priority of the displacement vector associated with the minimum evaluation value Evm.

Comparator unit 3 further includes an update control unit 616 for carrying out update/maintenance of the evaluation value data held in first register 614 according to signals Ev-EQ and Ev-LT from comparator 613 and a signal Pr-LT from priority comparator 615. Update control unit 619 asserts a signal Ev-UP on a signal line 620 when signals Pr-LT and Ev-EQ are both asserted, or when signal Ev-LT is asserted. First register 614 responds to the asserted signal Ev-UP to substitute the holding data with the currently applied evaluation value Ev.

The evaluation function Evm held in first register 614 is updated when: (i) the currently applied evaluation value Ev is smaller than the evaluation value Evm held in first register 614; and (ii) evaluation value Ev equals Evm, and the priority of the displacement vector associated with the new evaluation value Ev is higher than the priority of the displacement vector associated with the evaluation value Evm held in first register 614.

Figure 45:
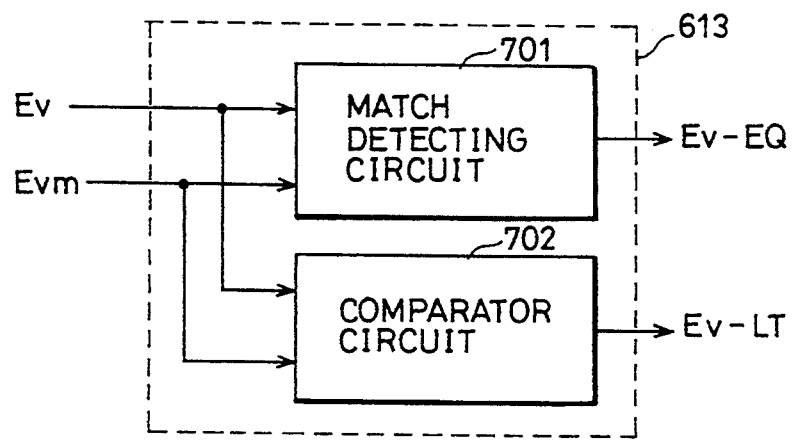
FIG. 45 shows the structure of the comparator of FIG. 44.

Referring to FIG. 45, comparator 613 includes a match detecting circuit 701 for detecting the match of the new evaluation value Ev and the evaluation value Evm held in first register 614, and a comparator circuit 702 for comparing the magnitude of the evaluation values Ev and Evm. A signal Ev-EQ is provided from match detecting circuit 701, and a signal Ev-LT is provided from comparator circuit 702. Comparator 702 asserts a signal Ev-LT when evaluation values Ev and Evm equal each other.

Figure 46:
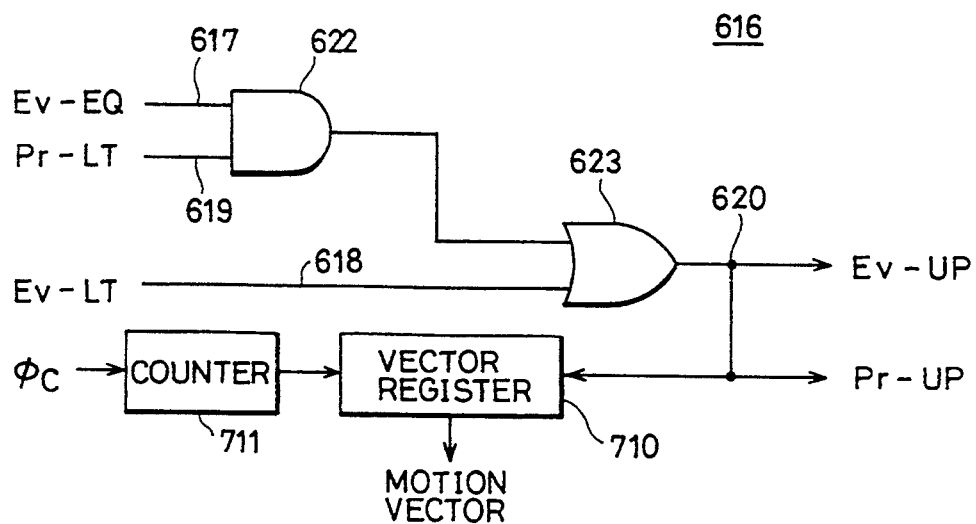
FIG. 46 shows a structure of the update control unit of FIG. 44.

Referring to FIG. 46, update control unit 616 includes an AND gate 622 and an OR gate 623. AND gate 622 has one input terminal supplied with a signal Ev-EQ described with reference to FIG. 45 via a signal line 617, and the other input terminal supplied with a signal Pr-LT via a signal line 619. OR gate 623 has one input terminal supplied with the output of AND gate 622, and the other input terminal supplied with a signal Ev-LT via signal line 618. A signal Ev-UP is provided from the output of OR gate 623 via a signal line 620. Therefore, output EvUP is expressed by the following logic equation.

$$Ev-UP=(Ev-EQ \bullet Pr-LT)+(Ev-LT)$$

Signal Ev-UP is provided to priority comparator 615 as a priority specification update instructing signal Pr-UP.

Update control unit 616 further includes a vector register 710 responsive to a signal Ev-UP (Pr-UP) for latching and holding a displacement vector corresponding to the current evaluation value provided from counter 711. Counter 711 increments the count value every time an evaluation value Ev is provided, to output data indicating a corresponding displacement vector. Counter 711 may be provided separately for the horizontal component and the vertical component of the motion vector. The count value of counter 711 may directly be used as value of a motion vector. Only encoding is required so as to correspond to a motion vector at the time of coding.

FIG. 47 shows a priority specifying value for each displacement vector used by priority comparator 615 in determining the priority. In FIG. 47, priority specifying values for each displacement vector is indicated when there are 15×15=225 displacement vectors of (−7, −7)-(7, 7).

Referring to FIG. 47, the numbers in the top row and the leftmost column indicate the horizontal component and the vertical component, respectively, of a motion vector (displacement vector). The numbers in FIG. 47 indicate the priority for a motion vector having horizontal/vertical components indicated in the upper and the leftside portion. It is assumed that a greater number has a higher priority.

For example, the priority for a motion vector (horizontal component, vertical component)=(0, 0), i.e. the true backside is the highest, 15, and the priority for motion vectors (−7, −5) and (−7, −7) is 3 and 1, respectively. Therefore, when the values of the two evaluation functions for motion vectors (−7, −5) and (7, −7) are identical and minimum, the motion vector (−7, −5) of the higher priority is employed.

It can be appreciated from FIG. 45 that some have the same value of priority. In the case of equal priority, the left side i.e. the horizontal component of a motion vector closer to the negative maximum value is given priority. If the priority is still not determined, in other words, if the value is identical and the horizontal component of the motion vector is identical in FIG. 47, the upper side, i.e. the vertical component of the motion vector closer to the negative maximum value is given priority.

The priority shown in FIG. 47 is based on the 4-way distance from the true backside. More specifically, those having a smaller sum of the absolute value of the horizontal component and the absolute value of the vertical component of a motion vector are given a higher priority.

In general, a motion vector per se is transmitted from the encoder side to the decoder side using a variable length code. As the absolute value of respective components of a motion vector is greater, the corresponding variable length code is often also longer. For example, in a motion picture coding system (CCITT H.261) for television telephones and television conferences, the variable length code for the horizontal and vertical components of a motion vector with a value of 3 is "00010". When the value of a motion vector is 4, the variable length code is "0000110". By increasing the priority of a motion vector (displacement vector) in proportion to a smaller sum of the absolute values of the horizontal component and a vertical component of a motion vector, a motion vector of a short code length is selected, and the transmission data can be compressed effectively. This will be described in details hereinafter.

A case is considered where the values of evaluation functions for two predictive picture blocks for a motion vector (3, 3) and a motion vector (3, 4) take an identical number and the minimum value. Since the priority of the above two motion vectors is 9 and 8 from FIG. 47, the former is given priority, resulting in a motion vector of (3, 3). Therefore, when priority is assigned according to the method of FIG. 47, one having a smaller code length is selected.

Because the one having a smaller sum of the absolute values of the horizontal component and the vertical component of a motion vector is given a higher priority in any two points of FIG. 47 in the present embodiment, the one with the longer code length will not be selected.

When the priority is equal in FIG. 47, the horizontal component of the motion vector closer to the negative maximum value is given priority. If the priority can still not be determined, the vertical component of the motion vector closer to the negative maximum value is given priority. However, this is only a way of example, and the motion vector of the same priority may undergo another priority designation. When the priority in FIG. 47 is identical, the vertical component of a motion vector closer to the negative maximum value may be given priority, and if the priority is still not determined, the horizontal component of a motion vector closer to the negative maximum value may be given higher priority. Alternatively, when the priority is identical in FIG. 47, the horizontal component of the motion vector closer to the positive maximum value may be given higher priority, and if the priority is still not determined, the vertical component of the motion vector closer to the positive negative value may be given the higher priority.

Furthermore, the direction given priority for every one vertical or horizontal line may be changed. For example, if the priority is identical in FIG. 47, the horizontal component of the motion vector closer to the negative maximum value may be given priority. If the horizontal component of the motion vector is equal, the vertical component of a motion vector closer to the negative value is given higher priority in the first column, and the vertical component of a motion vector closer to the positive maximum value may be given the higher priority in the second column, followed by a priority specification of the repetition of the above described method.

It is also possible to give priority in an ascending order or a descending order to one evaluated according to the evaluation order of a motion vector without regard to the magnitude of the values of a horizontal component, a vertical component, or both thereof of a motion vector.

When the priority is equal, the sum of the absolute value of a horizontal component and an absolute value of a vertical component of a displacement vector is identical. In any case, the code length is generally the same at the time of coding for transmission, so that a similar effect can be obtained.

Figure 48:
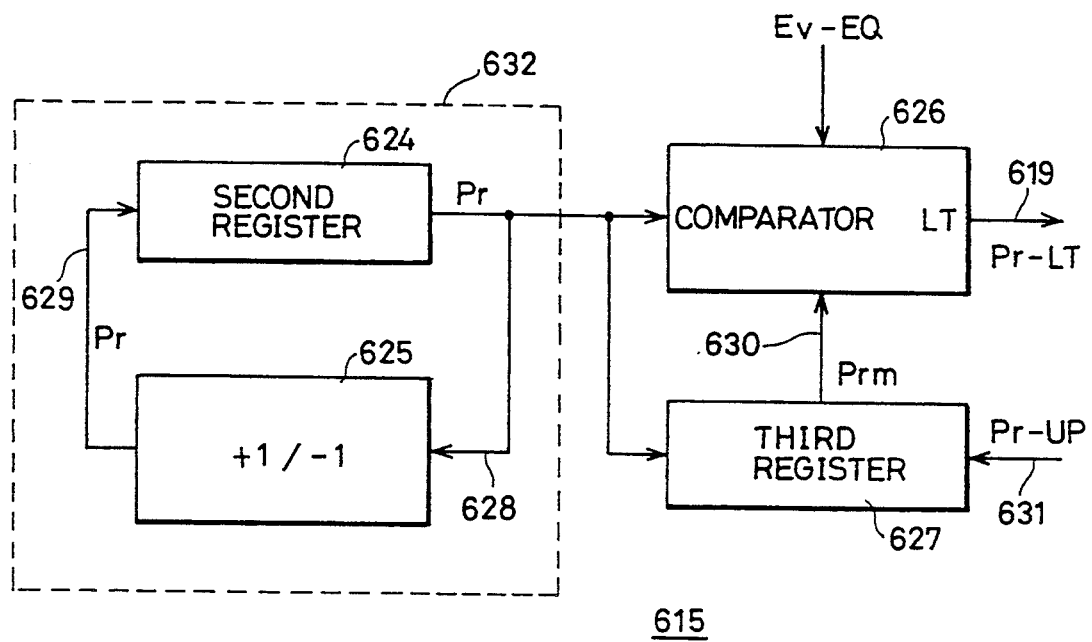
FIG. 48 shows a structure of the priority comparator of FIG. 44.

FIG. 48 specifically shows a structure of a priority comparator of FIG. 44. Referring to FIG. 48, priority comparator 615 includes a priority generation circuit 632 for generating priority data of a motion vector (displacement vector) associated with the current evaluation value Ev, a third register 627 for holding priority data associated with the evaluation value (with respect to a displacement vector) held in first register 614 (refer to FIG. 44), and a comparator 626 for comparing the priority data Pr from generating circuit 632 with priority data Prm held in third register 627. Third register 627 updates its content according to the assertion of signal Pr-UP.

Comparator 626 attains an active state when a signal Ev-EQ is asserted to carry out comparison of priority data Pr and Prm. Comparator 626 may be formed so as to constantly carry out comparison. When priority data Pr is smaller than data Prm, comparator 626 asserts a signal 619 on signal line 619. The structure for operation when data Pr equals Prm is not definitely shown here. In FIG. 46, because vector register 710 is updated according to the assertion of a signal Pr-UP, the indicated structure will lead to a deassert state of a signal Pr-LT when Pr=Prm, and vector register 710 is not updated. The prior generated motion vector (displacement vector) is held (when Pr=Prm).

When data Pr equals data Prm, a signal Pr-EQ is generated from comparator 626. A structure may be implemented where selection is carried out according to a predetermined rule (any of the above described priority decision methods) for the displacement vector in vector register 710 and the current displacement vector (output of counter 711 in FIG. 46) according to an assertion of this signal Pr-EQ.

Priority generation circuit 632 includes a second register 624 for holding a priority data Pr for the current displacement vector, and an adder/subtractor circuit 625c for incrementing or decrementing by one the priority data Pr generated from second register 624. The output Pr' of adder/subtractor circuit 625 is provided to second register 624.

The operation of the priority comparator unit shown in FIG. 48 will be described. Priority data Pr is applied to a first input of comparator 626 via a signal line 628. To the second input of comparator 626, an output Prm of third register 627 is input via a signal line 630. Comparator 626 carries out comparison of the magnitudes of the two priorities Pr and Prm applied to the two inputs.

As a result, when Pr>Prm, a signal Pr-LT is asserted as the priority corresponding to the compared evaluation function Ev is higher than the priority corresponding to the evaluation value Evm.

In response to assertion of a signal Pr-LT, vector register 710 has its content updated, and the third register 627 has its content updated by priority data Prm.

In priority generation circuit 632, update of priority data Pr is carried out automatically. Priority data Pr is held in second register 624. In response to a control signal such as an externally applied clock signal, adder/subtractor 625 with an input of data Pr is incremented or decremented, whereby the result is returned to second register 624 to obtain a desired priority data.

Figure 49:
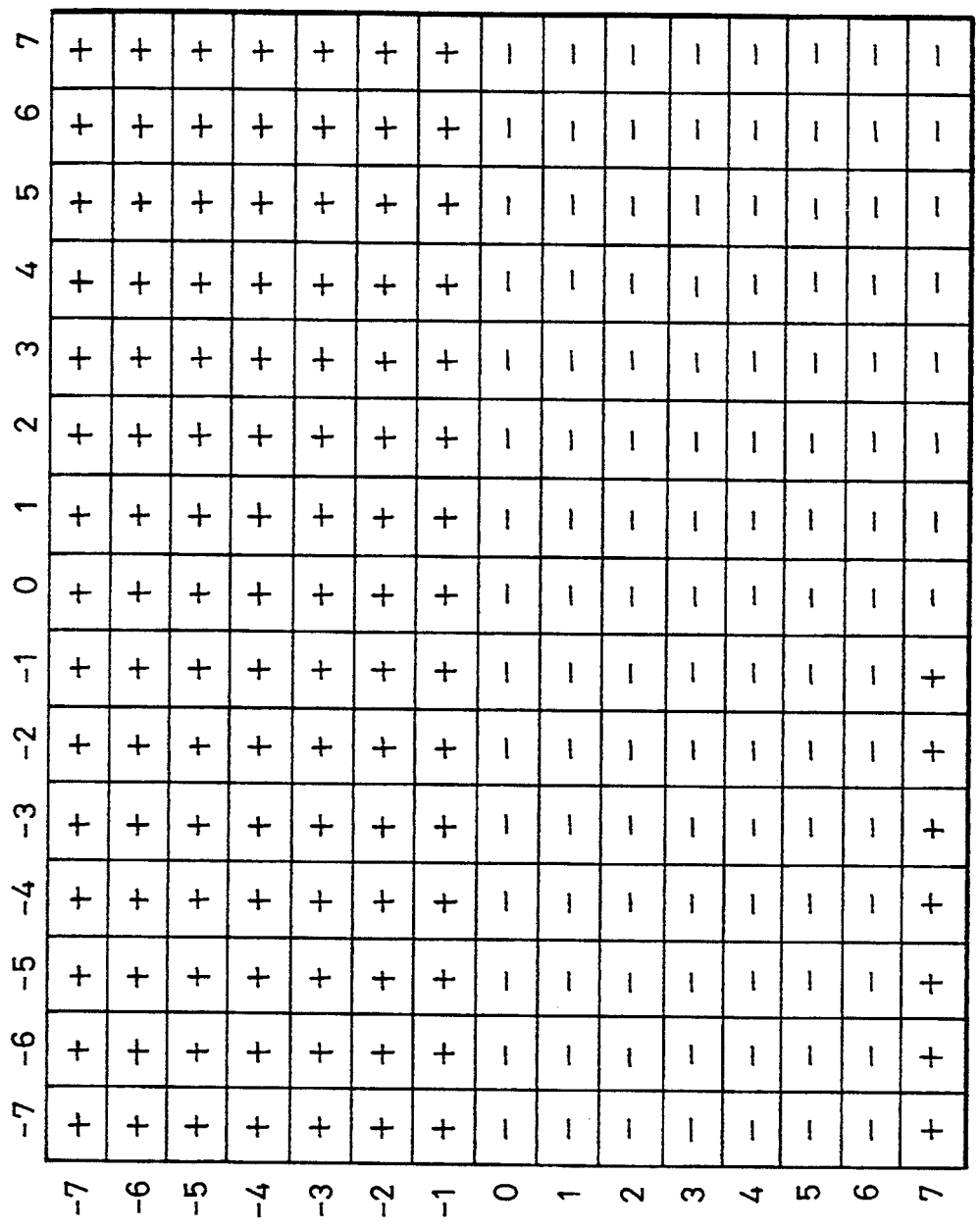
FIG. 49 shows an example of sequence of the increment/decrement of the adder/subtractor circuit of FIG. 48.

A case is considered where priority is established starting from the leftmost top row downwards by 1 column as shown in FIG. 47. In this case, 1 is stored in second register 624 and increment or decrement is carried out sequentially according to the rule indicated in FIG. 49. Referring to FIG. 49, the plus sign "+" indicates that increment is required for generating priority data for the next motion vector, and the minus sign "−" indicates that decrement is necessary for generating priority data of a subsequent motion vector. Here, a subsequent vector is the motion vector of an adjacent lower row (vertical component of motion vector is incremented by +1) if not the last row. In the case of the last row, a subsequent vector is the motion vector corresponding to the top row of the right column. Desired priority data is generated by this increment/decrement.

Figure 50:
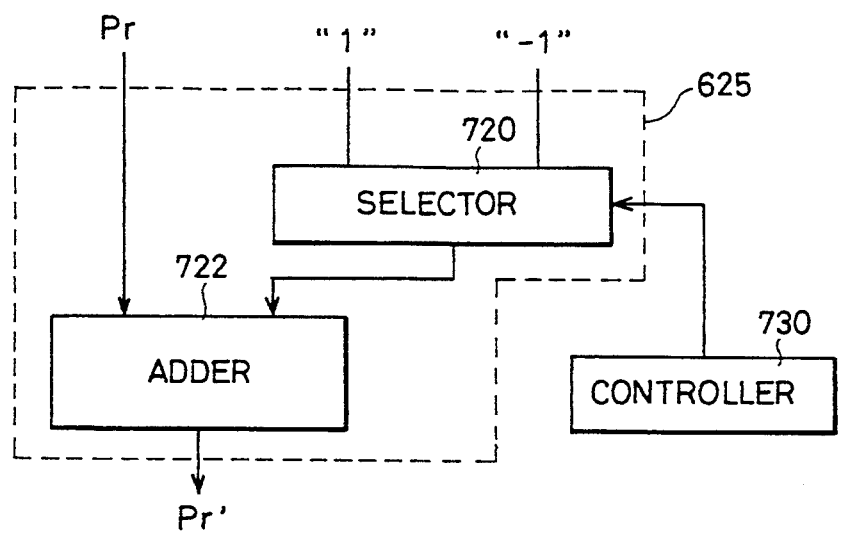
FIG. 50 shows a specific structure of the adder/subtractor circuit of FIG. 48.

Referring to FIG. 50, priority generation circuit 625 includes a selector 720 for passing one and data "1" and "−1" under the control of controller 730, and an adder 722 for adding the output of selector 720 and data Pr. Data Pr' is provided from adder 722. Controller 730 generates a control signal in a sequence indicated in FIG. 49 ("+" corresponds to "1" selection, and "−" corresponds to "−1" selection) with a clock signal (not shown) defining the output timing of an evaluation value as a timing signal. Controller 730 is realized by a preprogrammed sequence controller, for example.

Although the above description was given where the value of priority takes only a natural number, the value is not necessarily set to a natural number since only the absolute value of the values is of concern. Therefore, the process of priority generation circuit 632 is not limited to increment/decrement, and any value for increment and decrement may be taken as long as the absolute value of increment/decrement is equal.

Considering the circuit complexity in realizing a priority generation circuit 632, a register of 4 bits and a circuit including increment/decrement function of 4 bits, a 4 bit adder, for example, are to be provided for priority specification of FIG. 47 since the upper limit of the priority is 15. In the case of implementation with a normal CMOS integrated circuit, it can be realized by approximately 200 transistors. This results in a circuit complexity sufficiently lower in comparison with the case of implementation by ROMs. In the case of implementation by ROMs, 4 bits is required in the horizontal and vertical direction (a total of 15 with −7 to 0-7), resulting in $2^8$ words for a motion vector. Because the data (priority) has a maximum value of 15, 4 bits are required, resulting in a capacity of $4 \times 2^8 = 1024$ bits.

EMBODIMENT 2

Figure 51:
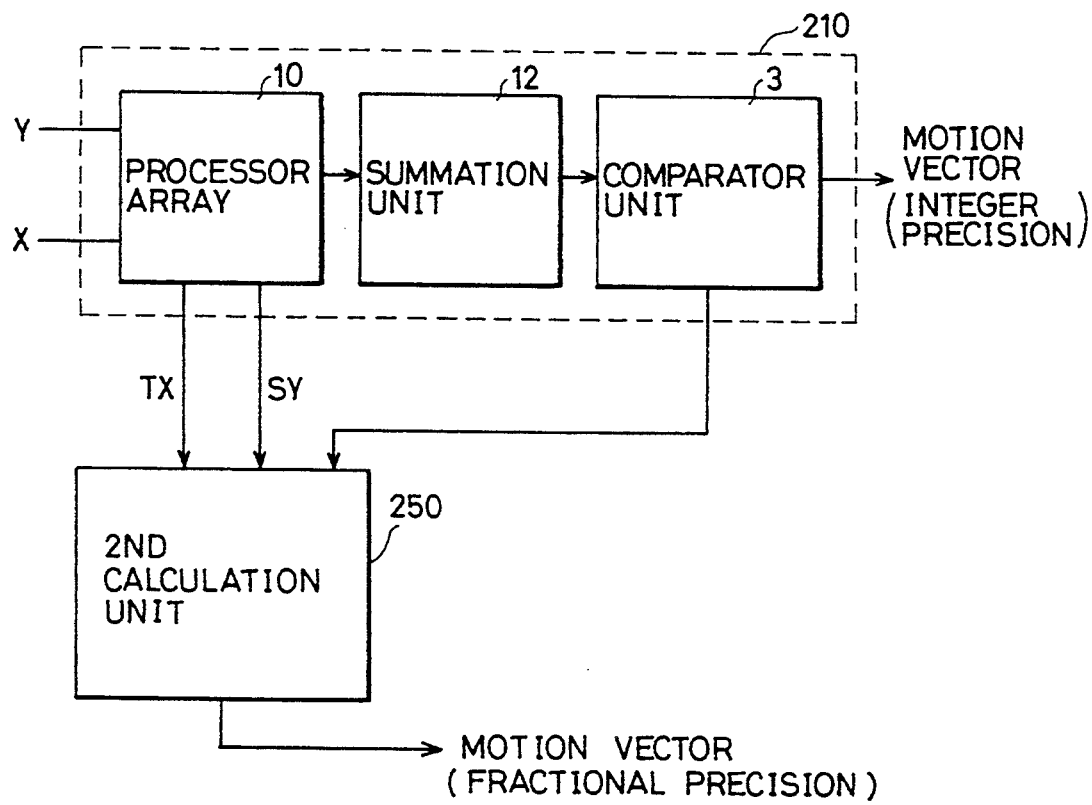
FIG. 51 specifically shows a structure of a motion vector detecting device according to a second embodiment of the present invention.

FIG. 51 schematically shows an overview of a structure of a motion vector detecting device according to a second embodiment of the present invention. Referring to FIG. 51, a motion vector detecting device includes a first computing device 210 to receive search window data Y and template block data X for determining a motion vector in integer precision, and a second computing device 250 to receive directly search window data SY and template block data TX from first computing device 210 for determining a motion vector in fractional precision. As shown in the first embodiment, first computing device 210 includes a processor array 10 including element processors arranged in a two-dimensional array, a summation unit 12 for summing the absolute difference from each element processor in processor array 10, and a comparator unit 3 for determining a motion vector according to the summation (evaluation value) from summation unit 12. Template block data TX and search window data XY stored in processor array 10 shifted out according to the operation thereof are directly applied to second computing device 250. Second computing device 250 has its operation controlled by a comparison result indication (latch instructing signal) from comparator unit 3.

According to the structure of the motion vector detecting device of FIG. 51, the search window data and the template block data are used for detection of a motion vector in integer precision in first computing device 210 after being read out from the frame memory, whereby the used search window data and template block data are transferred from the first computing device to the second computing device. Thus, access to the frame memory is not necessary in determining a motion vector of fractional precision, so that a motion vector of fractional precision can be determined at high speed.

Figure 52:
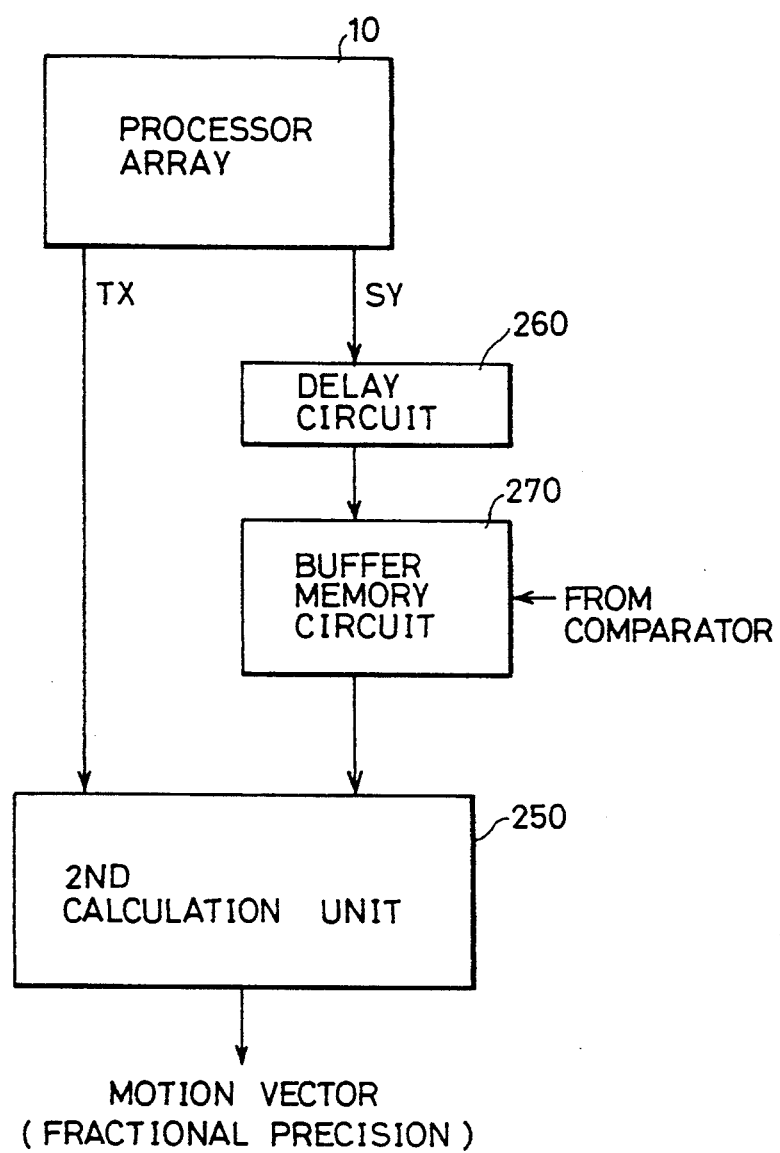
FIG. 52 shows a specific structure of the motion vector detecting device of FIG. 51.

FIG. 52 shows an example of a structure of the data transmission system between processor array 10 in first computing device 210 and second computing device 210 in the second embodiment. Referring to FIG. 52, template block data TX from processor array 10 is directly applied to second computing device 250, and search window data SY from processor array 10 is delayed by a predetermined time via a delay circuit 260 to be stored in a buffer memory circuit 270. Buffer memory circuit 270 stores search window data required for detection of a motion vector in fractional precision. For example, when the size of a macroblock (template block and search window block) is 16×16 pixels, a search window block including the periphery, i.e. 18×18 pixels for fractional precision is stored in buffer memory circuit 270.

A motion vector in fractional precision is determined using the search window data stored in buffer memory circuit 270 and the template block data TX from processor array 10. The delay time provided by delay circuit 260 is determined by the storage capacity of buffer memory circuit 270. If buffer memory circuit 270 has a capacity for storing all the pixels in the search area, a delay circuit 260 is not required. A case is considered where the storage capacity of buffer memory circuit 270 is the minimum capacity of 18×18 pixels. Delay circuit 260 applies a delay time equal, as an example to the time required for transferring 1 column of pixels in the search area.

Figure 53:
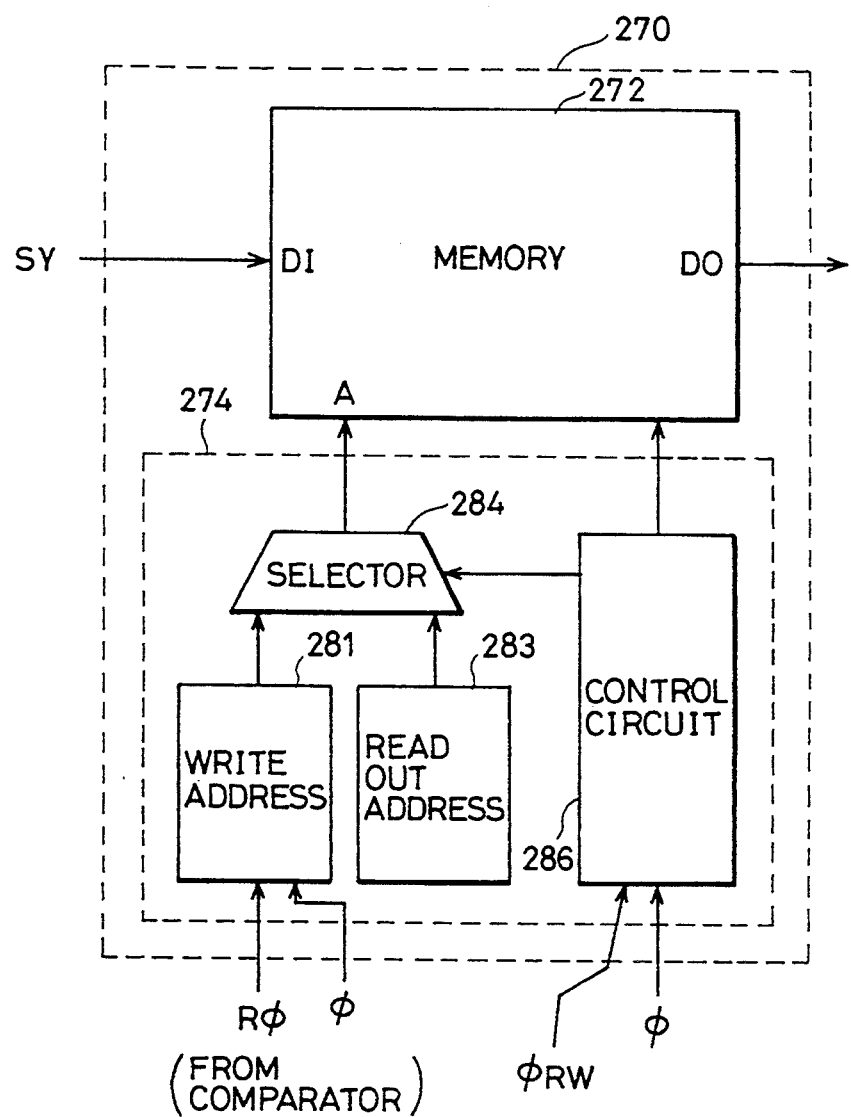
FIG. 53 shows a specific structure of the buffer memory circuit of FIG. 52.

FIG. 53 shows an example of a structure of the buffer memory circuit of FIG. 52. Referring to FIG. 53, buffer memory circuit 270 includes a memory 272 for storing search window data SY from processor array 10, and a write/read control circuit 274 for controlling data writing and reading of memory 272. Memory 272 has its output node Do connected to second computing device 250.

Write/read control circuit 274 includes a write address generating circuit 281 for generating a write address to memory 272, a read out address generating circuit 283 for generating a read out address of memory 272, a control circuit 286 for generating a signal to control the read out mode and write mode of memory 272, and a selector 284 for selecting either a write address or a read out address under the control of control circuit 286 to provide the same to the address input node A of memory 272.

Write address generating circuit 281 responds to a latch instructing signal R$\phi$ from comparator unit 3 of FIG. 51 to generate a write address. When this latch instructing signal R$\phi$ is generated, the write address is reset to the initial value. Write address generating circuit 281 sequentially generates a write address starting at address 0, for example, in response to a clock signal $\phi$. Similarly, read out address generating circuit 283 sequentially generates a read out address starting from address 0 under the control of control circuit 286. Selector 281 selects a write address from write address generating circuit 281 when control circuit 286 instructs data writing. When control circuit 286 instructs a read out mode, selector 284 selects a read out address from read out address generating circuit 283.

Control circuit 286 responds to a search window data transfer clock signal $\phi$ to generate a signal determining the data writing and reading timing with respect to memory 272. Control circuit 286 responds to an operation mode instructing signal $\phi$RW to generate a signal controlling the write and read of memory 272. When memory 272 is formed of a dynamic random access memory, control circuit 286 generates a row address strobe signal/RAS, a column address strobe signal/CAS, a write enable signal/WE, and an output enable signal/OE (when the output is a three-state).

The control signal $\phi$RW applied to control circuit 286 may be provided from an external controller. When the count value of counter 134 of comparator unit 3 shown in FIG. 43 reaches a predetermined count value, a count-up signal is generated. This count-up signal may be used as a control signal $\phi$RW. This is because provision of an evaluation value for one template block is carried out continuously until the count of counter (refer to FIG. 43) reaches a predetermined value. The operation thereof will be described hereinafter.

Figure 54:
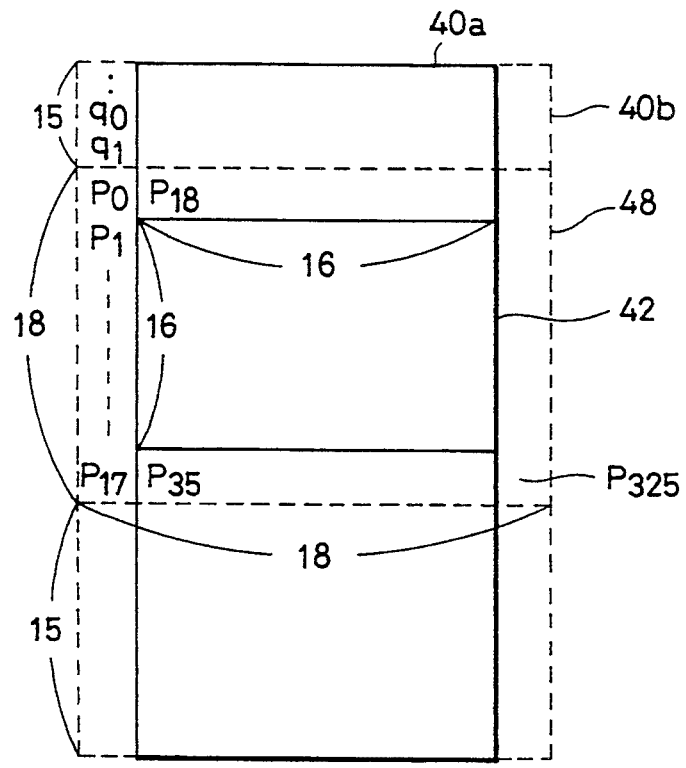
FIG. 54 shows the distribution of the stored data in the buffer memory of FIG. 53.

The case is considered where the search window of FIG. 54 has a size of 48×16 pixels, and a macroblock (template block and search window block) has a size of 16×16 pixels. It is assumed that evaluation value calculation is carried out for search window block 42. The region required for obtaining a motion vector in fractional precision for search window block 42 is a region 48 of 18×18 pixels including a region 42. Region 48 includes pixel data P0–P325 as shown in FIG. 54.

Figure 55:
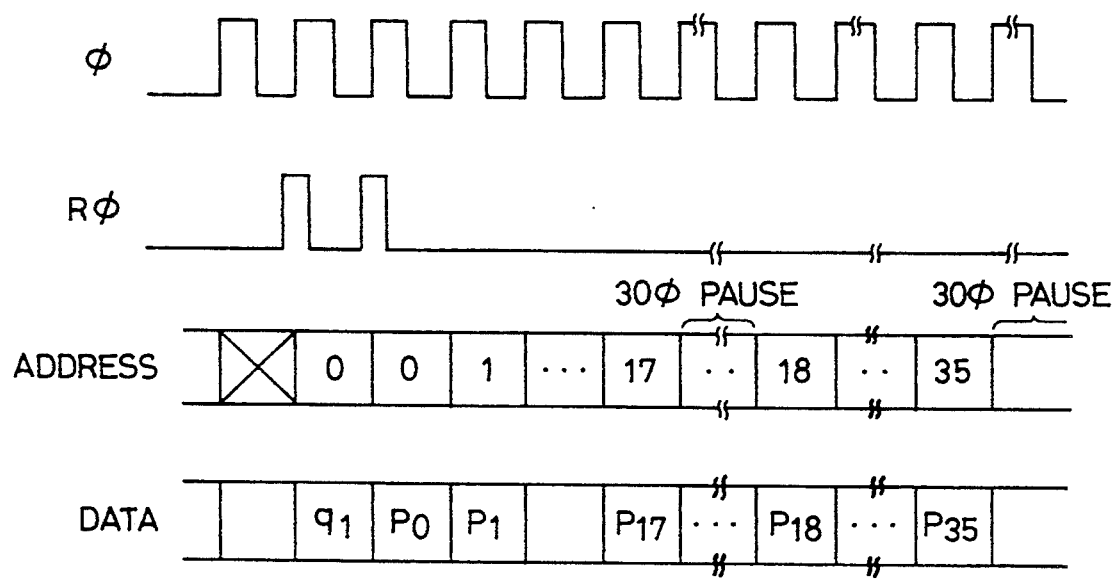
FIG. 55 shows a structure of the operation of the buffer memory circuit of FIG. 53.

Referring to FIG. 55, clock signal $\phi$ is generated at every transfer of search window pixel data. When one clock signal $\phi$ is generated, search window data is shifted out by 1 pixel. In calculating an evaluation value for search window block 42, the output of delay circuit 260 shown in FIG. 52 includes data corresponding to pixel P0. If the evaluation value of search window block 42 is the minimum value of the obtained evaluation values, a latch instructing signal R$\phi$ is generated from the comparator shown in FIG. 43. In response, the write address of write address generating circuit 281 is reset to the initial value of 0. Then, pixel data P0 is written into the position of address 0 in memory 272. Thereafter, 18 pixel data, i.e. P1 ... P17 are stored in the position of addresses 1–17 (when a signal R$\phi$ is not generated).

In order to inhibit writing of unrequired data, write address generating circuit 281 attains a pause state for 30 clock periods, i.e. 30$\phi$ periods, whereby writing data to memory 272 is inhibited. Determination of a pause term for inhibition of data writing is implemented by a structure where memory 272 is set to a pause state for 30$\phi$ periods when a count signal $\phi$ is counted 18 times since a latch instructing signal R$\phi$ is applied to control circuit 286.

When 30 clock periods (30$\phi$ cycle periods) elapses, write address generating circuit 281 generates a write address again. Here, the address is 18, so that pixel data P18 is stored into the location of address 18. The above-described operation is carried out repeatedly thereafter. In changing the template block, the search area is shifted in the horizontal direction by 1 macroblock. Therefore, all the data required for detecting a motion vector in fractional precision can be obtained even if the macroblock providing a motion vector is located at the boundary of the search area. Data external of the search area may be neglected in this case. Adjacent data within the area may be used.

According to the above-described operation, memory 272 has only the data of a search window block stored corresponding to a displacement vector which becomes a candidate of a motion vector. The storage capacity of memory 272 may be the minimum storage capacity of 18×18 words to reduce the device size.

In the case of a structure where buffer memory circuit 270 stores all the pixel data in the entire search area for one template block, a delay circuit 260 is not required. In this case, a read out address is generated according to the value of a motion vector from comparator unit 3.

Figure 56:
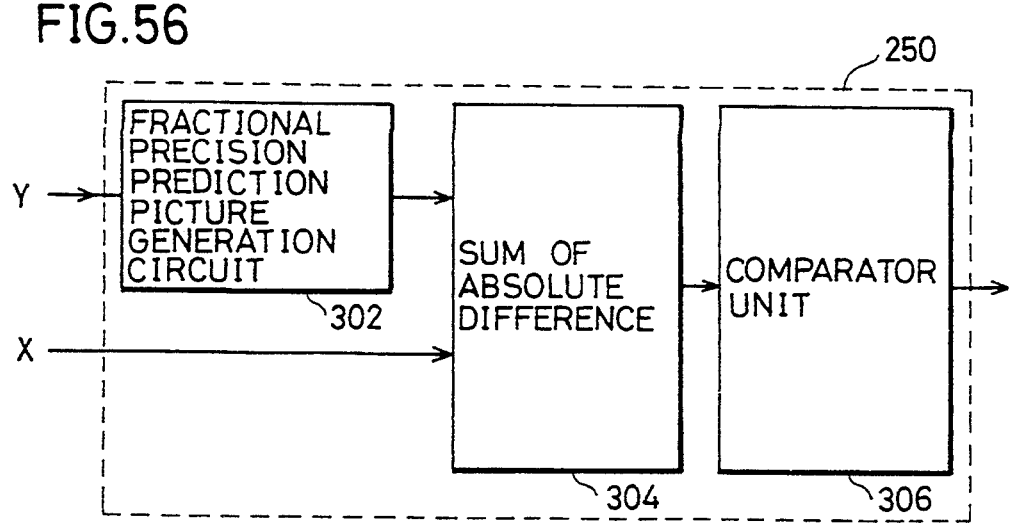
FIG. 56 specifically shows a structure of the second operational device of FIG. 51.

FIG. 56 specifically shows a structure of the second computing device shown in FIGS. 51 and 52. Referring to FIG. 56, a second computing device 250 includes a fractional precision predictive picture generating circuit 302 to receive search window data (to be more exact, the output of buffer memory) from the first computing device (processor array) for generating a predictive picture required for fractional precision, an absolute difference sum circuit 304 for obtaining the sum of the absolute differences of the pixel data of the predictive picture generated by fractional precision predictive picture generating circuit 302 and template block data X, and a comparator unit 306 for detecting a displacement vector providing, the minimum sum of absolute differences of the outputs of absolute difference sum circuit 304. Fractional precision predictive picture generating circuit 302 generates a plurality of predictive picture pixel data in parallel. Absolute difference sum circuit 304 also generates the evaluation value for a displacement vector which becomes the candidates of a motion vector in a parallel manner. Comparator unit 306 detects the minimum sum of the absolute differences out of the plurality of absolute difference sums provided from absolute difference sum circuit 304, whereby the displacement vector corresponding to that minimum absolute value sum is determined as the motion vector. Specific structure of each circuit component will be described hereinafter.

Figure 57:
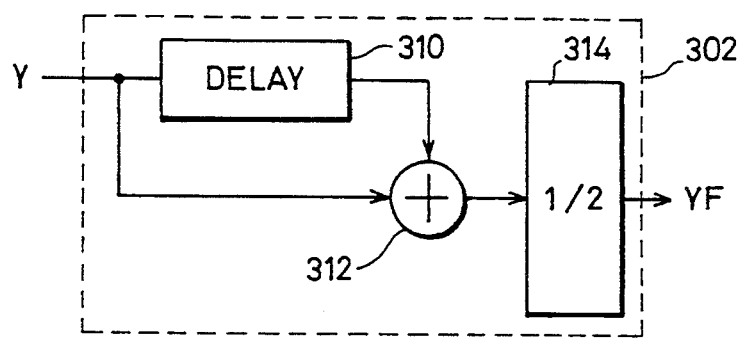
FIG. 57 shows a specific structure of the fractional precision prediction picture generating circuit of FIG. 56.

FIG. 57 shows a specific structure of the fractional precision predictive picture generating circuit shown in FIG. 56. Referring to FIG. 57, fractional precision prediction picture generating circuit 302 includes a delay circuit 310 for delaying an applied search window data for a predetermined time period, an adder 312 for adding the output of delay circuit 310 and search window data Y, and a multiplier 314 for multiplying a coefficient ($\frac{1}{2}$) with the output of adder 312. Multiplier 314 may be implemented by a shifter that shifts data applied in the direction of the next less significant bit. The delay time applied by delay circuit 310 is determined depending upon which displacement vector the factional precision prediction picture generating circuit 302 corresponds to. The delay time of delay circuit 310 will be described afterwards. Fractional precision predictive picture generating circuit 302 shown in FIG. 57 is used for the purpose of detecting a motion vector in $\frac{1}{2}$ pixel precision.

Figure 58:
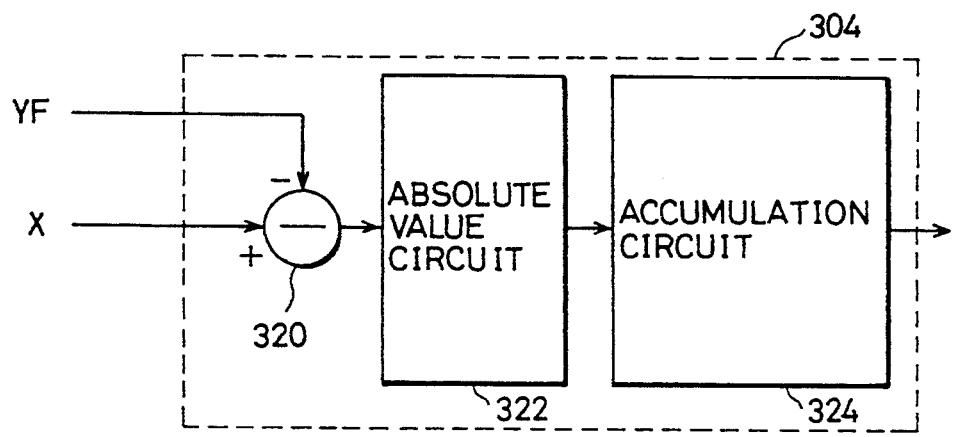
FIG. 58 shows a structure of the absolute difference value summation circuit of FIG. 56.

FIG. 58 shows a specific structure of the absolute difference sum circuit of FIG. 56. Referring to FIG. 58, an absolute difference sum circuit 304 includes a subtractor 320 for carrying out subtraction between an interpolation data YF provided from fractional precision predictive picture generating circuit 302 and template block data X, an absolute value circuit 322 for obtaining the absolute value of the output of subtractor 320, and an accumulation circuit 324 for accumulating the output of absolute value circuit 322. An example of a structure of the second computing device for obtaining a motion vector in fractional precision will be described hereinafter.

Figure 59:
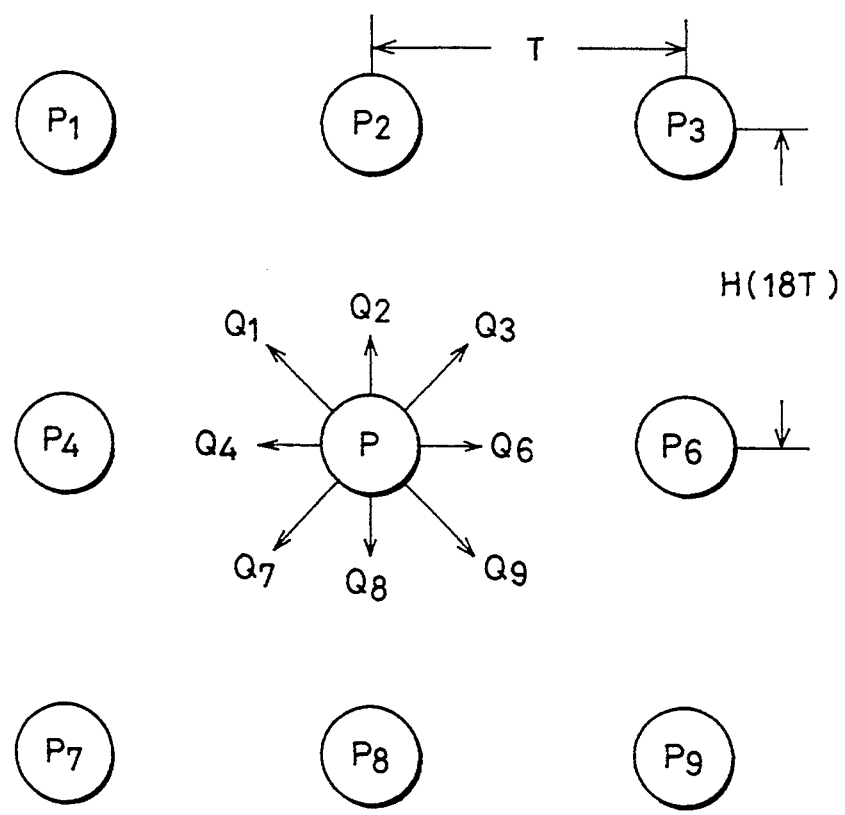
FIG. 59 is a diagram for describing the operation of the second operational device.

FIG. 59 is a diagram for describing the operation of obtaining a motion vector in fractional precision by a second computing device. Second computing device 250 detects a motion vector in $\frac{1}{2}$ pixel precision. A case is considered where there are 8 points as the candidates of a motion vector. In other words, pixel data of 8 proximates Q1–Q4 and Q6–Q9 for a target pixel P are obtained by interpolation. An evaluation value indicating a candidate of a motion vector is calculated by obtaining the absolute difference of pixel data Q1–Q4 and Q6–Q9 obtained by interpolation and template block data X, and an accumulation thereof.

Here, it is assumed that the search window data is P1–P9, the term between adjacent column pixels is T, and the delay time between adjacent rows is H (18T: when the size of a search window block in fractional precision is 18×18 pixels). In FIG. 59, the arrangement of the rows and columns is opposite of that shown in the prior embodiment. The search window block data from the processor array is shifted out sequentially along the column direction of the search window. Similarly, the template block data is shifted along the column direction (when the template block data transmission line and the search window data transmission line are arranged parallel to each other). In FIG. 59, only the reference number applied to each pixel data needs to be changed (replace the rows and columns), and no particular problem will be encountered. The structure for obtaining a motion vector in fractional precision using the interpolation search window data Q1–Q4 and Q6–Q9 shown in FIG. 59 will be described hereinafter.

Figure 60:
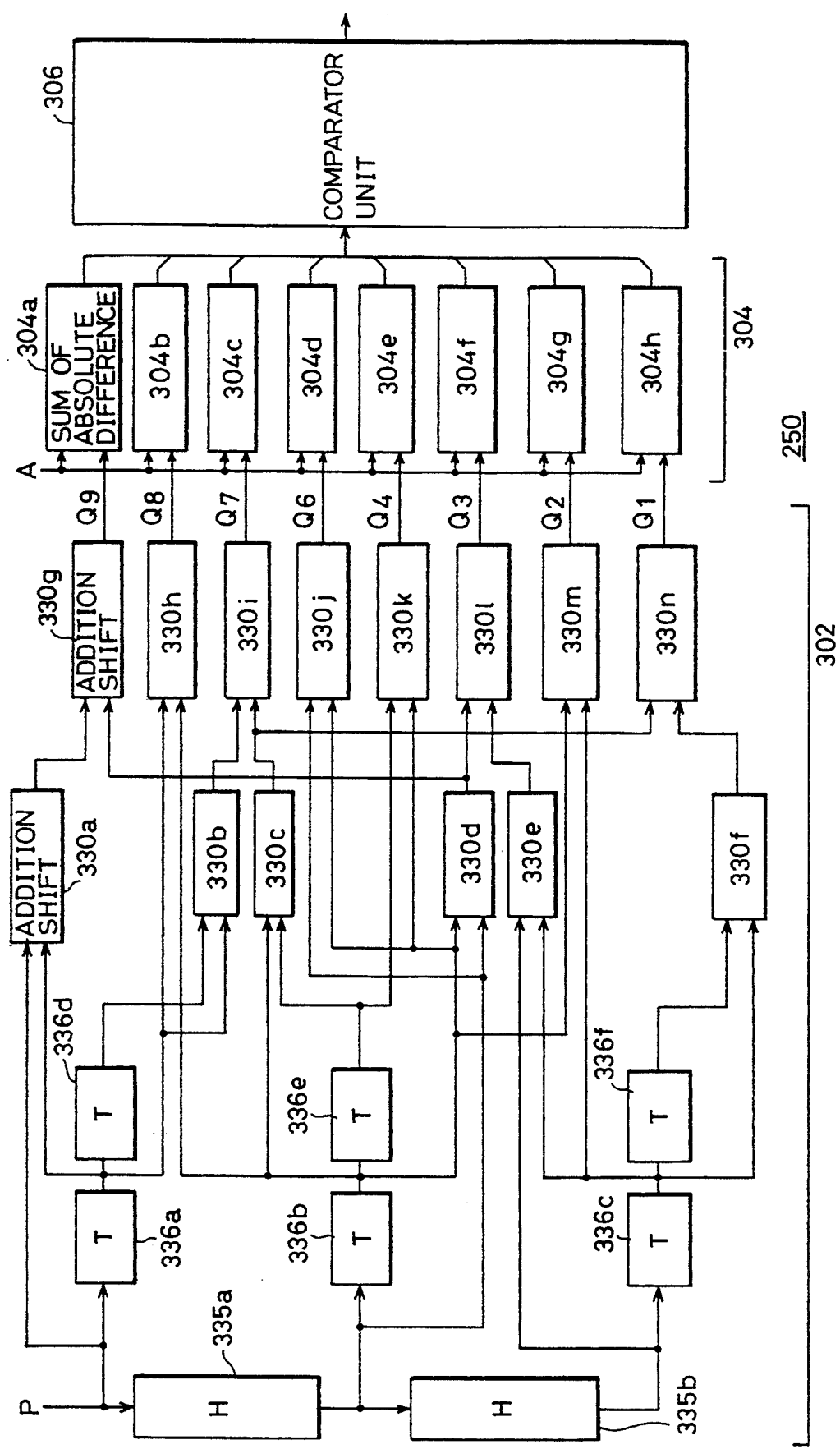
FIG. 60 specifically shows a structure of the second operational device of FIG. 52.

FIG. 60 specifically shows a structure of a second computing device. Referring to FIG. 60, a second computing device 250 includes a delay circuit 335a for delaying an applied search window data by 1H term, and a delay circuit 335b for further delaying the output of delay circuit 335a by 1H. A path that generates data corresponding to each row in FIG. 59 is formed by the cascade-connected two stages of delay circuits 335a and 335b.

The second computing device of FIG. 60 further includes a delay circuit 336a for delaying by 1T term an input search window data P, a delay circuit 336d for further delaying the output of delay circuit 336a by 1T term, a delay circuit 336b for delaying the output of 1H delay circuit 335a by 1T term, and a delay circuit 336e for delaying the output of delay circuit 336b by 1T term, and a delay circuit 336c for delaying the output of 1H delay circuit 335b by 1T term, and a delay circuit 336f for delaying the output of delay circuit 336c by 1T term. By 1T delay circuits 336a–336f, the search window data required for interpolation are generated.

Second computing device 250 further includes an addition shift circuit 330a for adding input search window data P and the output of 1T delay circuit 336a and multiplying the same by a coefficient of ($\frac{1}{2}$). Addition shift circuit 330a realizes multiplication of a coefficient ($\frac{1}{2}$) by a shift operation. Second computing device 250 further includes an addition shift circuit 330b for carrying out an addition shift operation for the output of 1T delay circuits 336a and the output of 1T delay circuit 336e, an addition shift circuit 330c for carrying out an addition shift operation for the outputs of 1T delay circuits 336b and 336e, an addition shift circuit 330d for carrying out an addition shift operation for the outputs of 1H delay circuit 335a and 1T delay circuit 336b, an addition shift circuit 330e for carrying out an addition shift operation for the outputs of 1H delay circuit 335b and 1T delay circuit 336c, and an addition shift circuit 330f for carrying out an addition shift operation for the outputs of 1T delay circuit 336c and 1T delay circuit 336F. By addition shift circuits 330a–330f, data for generating interpolation data between pixels are generated.

Second computing device 250 further includes an addition shift circuit 330g for carrying out an addition shift operation for the outputs of addition shift circuit 330a and addition shift circuit 330d, an addition shift circuit 330h for carrying out an addition shift operation for the outputs of 1T delay circuit 336a and 336b, an addition shift circuit 330i for carrying out an addition shift operation for the outputs of addition shift circuits 330b and 330c, an addition shift circuit 330j for carrying out an addition shift operation for the outputs of 1T delay circuit 336b and 1H delay circuit 335a, an addition shift circuit 330k for carrying out an addition shift operation for the outputs of 1T delay circuit 336e and 336b, an addition shift circuit 330l for carrying out an addition shift operation for the outputs of addition shift circuits 330d and 330e, an addition shift circuit 330m for carrying out an addition shift operation for the outputs of 1T delay circuits 336b and 336c, and an addition shift circuit 330n for carrying out an addition shift operation for the outputs of addition shift circuits 330c and 330f. From addition shift circuits 330g–330n, pixel data located at positions of interpolation pixel data Q9–Q6 and Q4–Q1 are generated.

Absolute difference sum circuit 304 includes absolute value sum circuits 304a–304h to receive outputs Q9–Q6 and Q4–Q1 of addition shift circuits 330g–330n and template block data A for obtaining the sum of absolute difference of the applied signals. Search window block data P and template block A have a relationship of a true backside manner (within the block).

The outputs of absolute difference sum circuits 304a–304h are applied to comparator unit 306 in parallel, whereby a displacement vector providing the minimum sum of the absolute differences is detected as a motion vector. Comparator unit 306 compares the outputs of absolute difference sum circuits 304a–304h to output the code applied to the absolute difference sum circuit providing the minimum value as a motion vector. Absolute difference sum circuits 304a–304h respectively correspond to a displacement vector providing 8 evaluation points. Therefore, a motion vector in fractional precision can be determined.

In the structure shown in FIG. 60, only 1 or 4 absolute difference sum circuits may be provided, whereby the outputs of time-divisionally activated addition shift circuits 330g–330n are sequentially added and accumulated. In the case of a shared structure, the accumulation result in the absolute difference sum circuit is stored in the register file, whereby accumulation is carried out using the values in the register file. In this case, comparator unit 306 may employ a structure similar to the comparator unit shown in FIG. 43. This is because comparison operation is carried out sequentially.

In the above described structure, a motion vector is detected in ½ pixel precision. A structure for detecting a motion vector of a more fine fraction precision, such as ¼ pixel precision may be used. Although the evaluation points are 8, a structure where more evaluation points are used can be employed.

Figure 61:
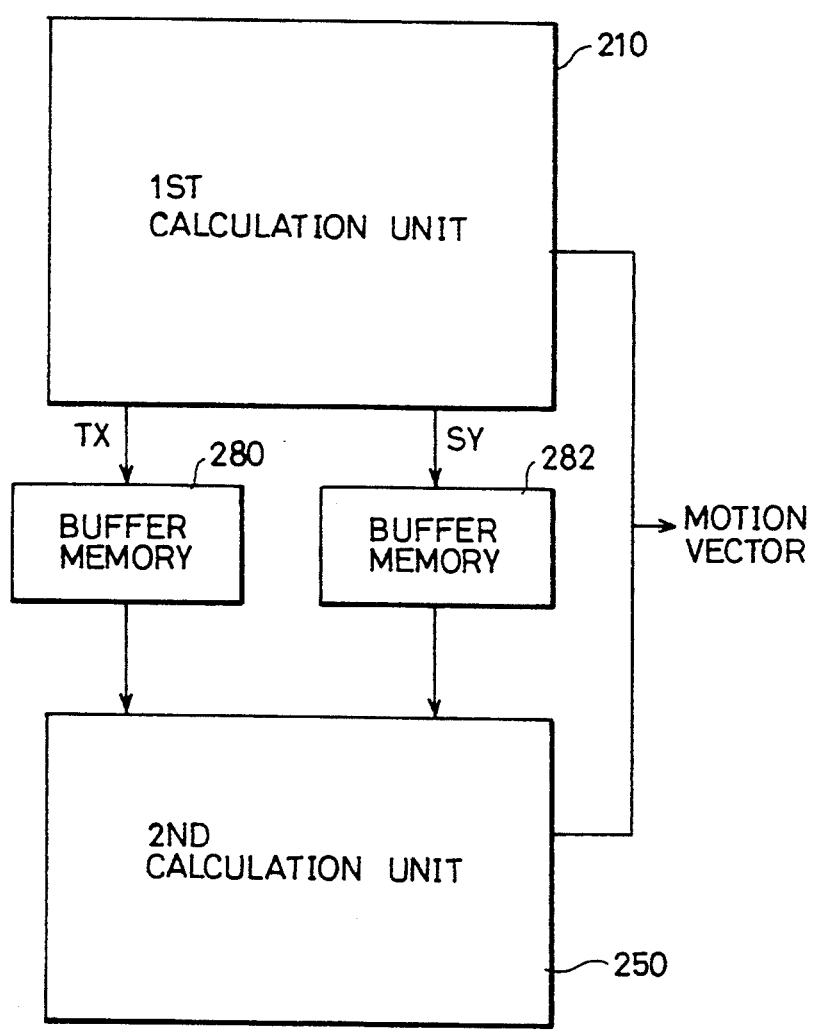
FIG. 61 shows a modification of the motion vector detecting device of FIG. 52.

FIG. 61 is a modification of the second embodiment of the present invention. The motion vector detecting device of FIG. 61 is provided with buffer memories 280 and 282 between first computing device 210 for detecting a motion vector in integer precision and a second computing device 250 for detecting a motion vector in fractional precision. Buffer memories 280 and 282 store template block data TX and search window data SY provided from first computing device 210. The structures of buffer memories 280 and 282 are similar to those shown in FIG. 53. Buffer 280 may have a capacity for storing all the pixel data in the template block, and buffer memory 282 may have a capacity for storing all the pixel data in the search area with respect to this template block. Buffer memory 282 may have a capacity for storing only pixel data of a region required for detection of a motion vector in fraction precision as in the prior embodiment.

In the structure shown in FIG. 52, the template block data TX from first computing device 210 is directly applied to second computing device 250. In the case of such a structure, the detection operation period of a motion vector in fractional precision is the loading period of template block data to the processor array in first computing device 210. This is because template block data is sequentially shifted out from the processor array during this period. In this case, second computing device 250 must carry out calculation at an operation rate substantially equal to the transfer rate of template block data.

However, second computing device 250 can carry out calculation with sufficient margin by providing buffer memories 280 and 282 for both template block data TX and search window data SY as shown in FIG. 61. This facilitates provision of template block data TX and search window data SY in commensurating timing.

Figure 62:
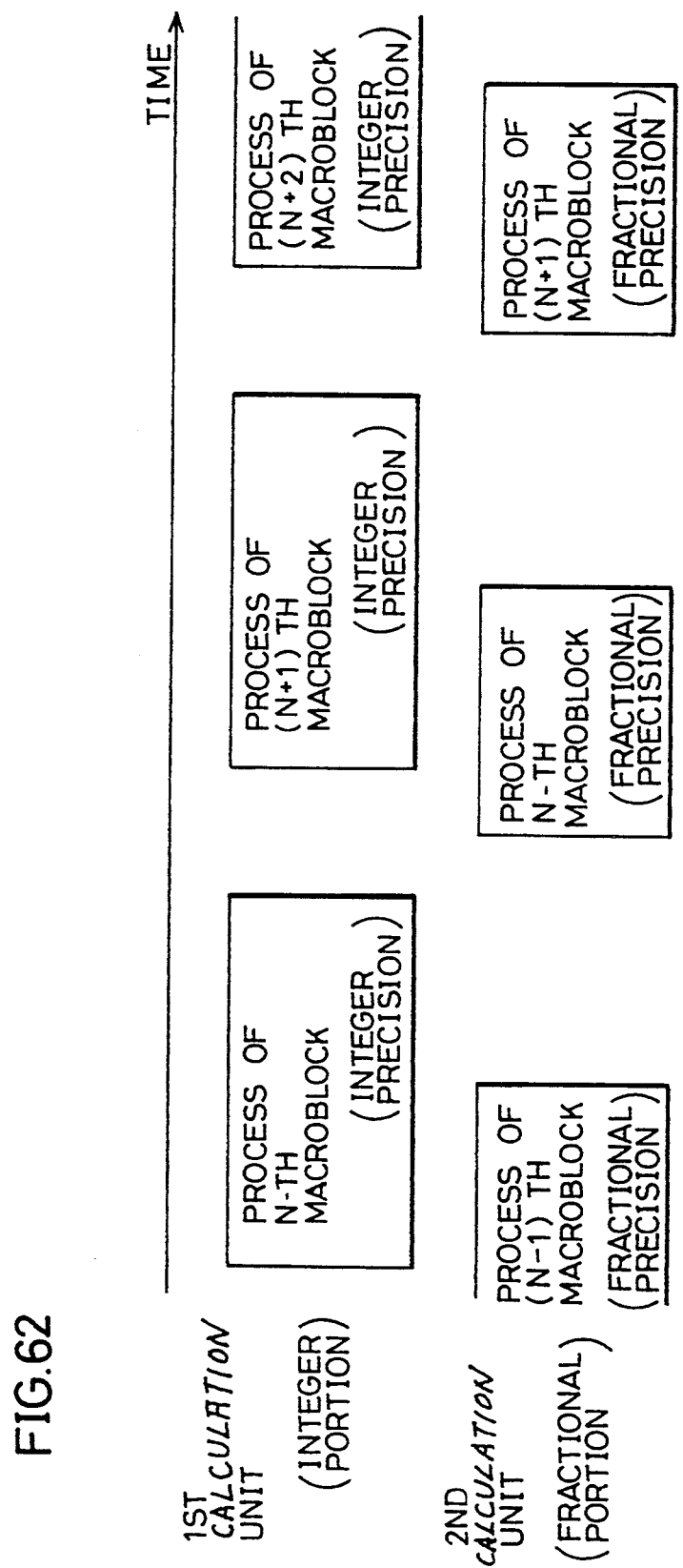
FIG. 62 shows a structure of the operation of the motion vector detecting device of FIG. 61.

In the case of the structure shown in FIG. 61, the calculation operation of first and second computing devices 210 and 250 may be carried out in a pipeline manner as shown in FIG. 62. FIG. 62 is a diagram for describing the operation manner of the motion vector detecting device of FIG. 61. In FIG. 61, time is plotted along the abscissa. In first computing device 210, the process for the Nth macroblock (template block) is carried out, whereby determination of a motion vector for the Nth macroblock (template block) is completed. Then, using the search window data and template block data used in the process of the Nth macroblock, detection of a motion vector in fractional precision for the Nth macroblock is carried out in second computing device 250.

In parallel to the determination operation of a motion vector in fractional precision for the Nth macroblock, detection of a motion vector in integer precision is carried out for the (N+1)th macroblock (template block) in the first computing device. By establishing a pipe line for the operations of the first and second computing devices 210 and 250 as described above, operation of the first computing device 210 and operation of second computing device 250 can be independently carried out in a time sense, so that detection of a motion vector in fractional precision can be carried out with a sufficient margin to the timing requirement for the calculation. The first and second computing devices 210 and 250 are operated parallel to each other also in this case, so that detection of a motion vector in fractional precision can be carried out at high speed.

Although buffer memory 280 is used for storing template block data TX in the structure shown in FIG. 61, it may be an element including a delay function (a delay line or a line memory).

Figure 63:
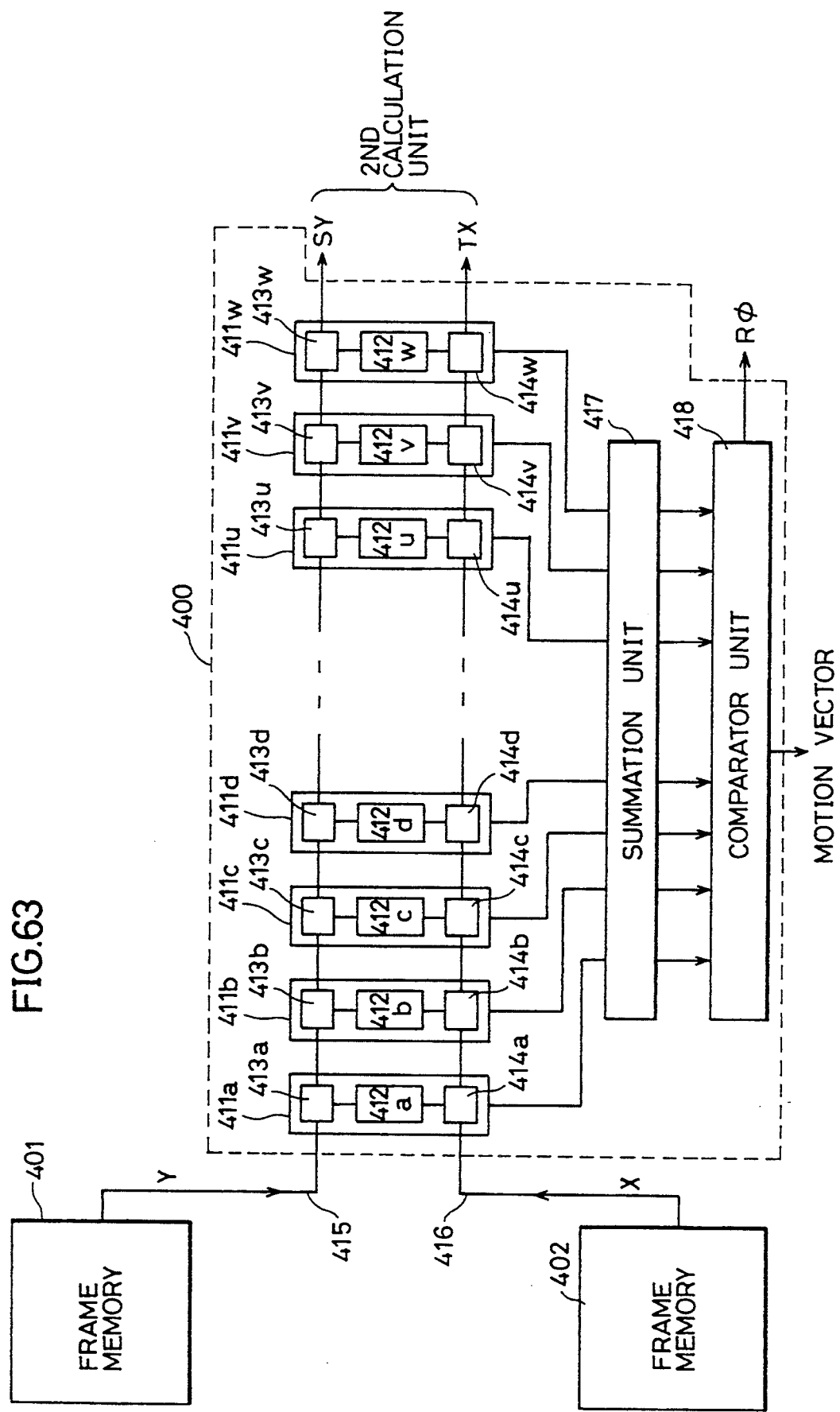
FIG. 63 shows another structure of the motion vector detecting device of FIG. 52.

FIG. 63 shows a further modification of the second embodiment of the present invention. FIG. 63 shows the portion of a first computing device for detecting a motion vector in integer precision. Referring to FIG. 63, a first computing device 400 includes element operational units 411a–411w cascade-connected to each other. Each of element operational units 411a–411w of the same structure includes registers 413a–413w for latching search window data, registers 414a–414w for latching template block data, and absolute difference circuits 412a–412w for obtaining the absolute difference of data stored in a corresponding search window register 413a–413w and a corresponding template block data storage register 414a–414w.

Registers 413a–413w can transfer data along a one-way direction. Registers 414a–414w can also transfer storage data to an adjacent element operational unit along a one-way direction. To search window register 413a in the first stage of element operational unit 411a, search window data from frame memory 401 is transmitted via a signal line 415. To template block data register 414a of element operational unit 411a, template block data from frame memory 402 is transmitted via a signal line 416. Frame memory 401 stores all the pixel data in the reference frame picture (preceding frame picture). Frame memory 402 stores all the pixel data of the current frame picture. Element operational units 411a–411w are provided in a number corresponding to the size of one macroblock. More specifically, when the size of a template block is 16 rows×16 columns, a total of 256 element operational units 411a–411w are provided. First computing device 410 further includes a summation unit 417 for adding the outputs of absolute difference circuits 412a–412w of element operational units 411a–411w, and an comparator unit 418 to detect the minimum evaluation value in response to an output of summation unit 417 for determining the displacement vector of a corresponding search window block as a motion vector.

In the structure shown in FIG. 63, first computing device 400 has the template block data stored in registers 414a–414w, and data of 1 search window block stored in registers 413a–413w. When 1 calculation cycle (evaluation value determination cycle) is completed, 1 row or 1 column of data of the search window block is shifted out. The shifted out search window data SY is applied to the second computing device. Similarly, template block data TX is shifted out in the subsequent detection cycle of a motion vector to be applied to the second computing device. The search window data required for detection of a motion vector in fractional precision out of the shifted out search window data SY is derived using the structure shown in FIG. 53.

In the structure shown in FIG. 63, a similar effect can be obtained by setting all registers 414a–414w to a through state to provide the same template block data to element operational units 411a–411w, whereby the search window data is shifted in or shifted out by 1 pixel towards registers 413a–413w. In this case, search window data is applied so that the applied template block TX and the applied search window data have the same displacement vector. In this case, an absolute difference sum circuit is used instead of an absolute difference circuit. Other structures may be used, and any circuit structure is allowed as long as a function for detecting a motion vector in integer precision is included.

In the case of the structure where element operational units are cascade-connected as shown in FIG. 63, search window data required for calculation in fractional precision can be obtained easily. More specifically, a shift register is provided at the output stage of the search window data, and a latch circuit for latching search window data at an appropriate interval in the element operational unit is provided. The position where the latch circuit is provided corresponds to the position external by 1 pixel of 1 search window block. More specifically, in first computing device 400, all the search window data required for fractional precision are latched, and an element operational unit is provided only for the pixel data required for motion vector detection in integer precision to carry out detection of a motion vector in integer precision. In this case, because the search window data required for fractional precision is sequentially shifted out parallel to the provision of template block data TX, window data required for a reference frame can easily be obtained in detecting a motion vector in fractional precision. Thus, the structure of the device is simplified.

When each size of the template block and search window block is 16×16 pixels, for example, the block size of the search window required for detection of a motion vector in fractional precision is 18×18 pixels. Here, a shift register latching the first 18 pixels is provided at the output stage, and a latch circuit for latching respective data of every upper and lower 1 bit outside each column of the search window block (16×16 pixels) is provided at a predetermined position among element operational units. In this case, the search window data required for fractional precision is read out from the frame memory to the first computing device. This state is shown in FIG. 64.

Figure 64:
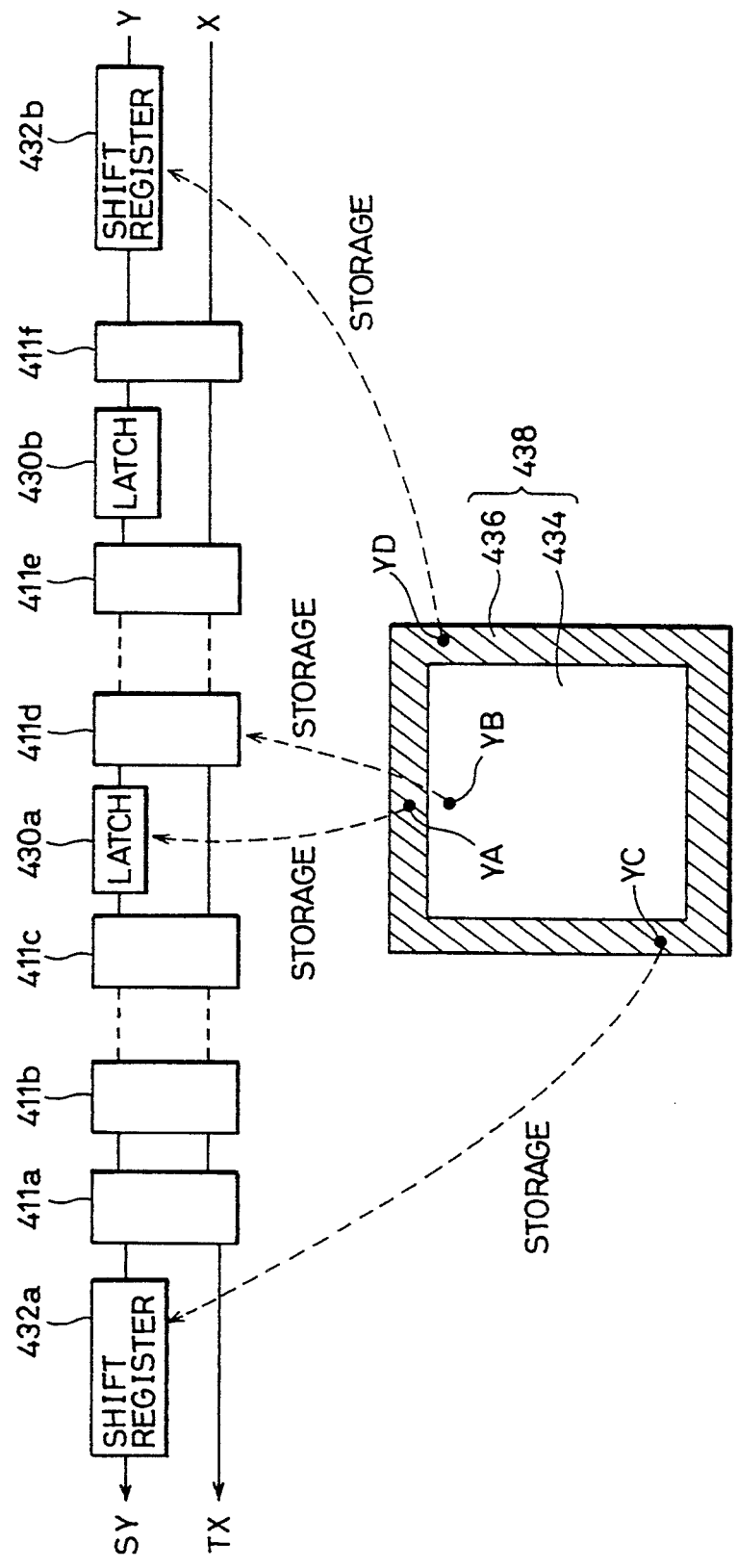
FIG. 64 shows a modification of the motion vector detecting device of FIG. 63.

Referring to FIG. 64, the data of search window block 434 is stored in element operational units 441a–441f. FIG. 64 shows the state where search window block data YB is stored in element operational unit 411d. In detecting a motion vector of fraction precision, the pixel data of region 438 including the peripheral pixel 436 of search window block 434 is used. The data of peripheral pixel region 436 is stored in each latch and shift register.

In FIG. 64, the state of data of peripheral pixel YA latched in latch 430a is shown. The peripheral pixel column (represented as pixel YC) is stored in the output stage of shift register 432a, and the other pixel column (represented as pixel YD) is stored in the input portion of shift register 432b. All the data of region 438 is read out from frame memory 401. It is to be noted that 1 column or 1 row of search window data of region 438 is shifted in and shifted out for every evaluation value generation cycle. In accordance with this structure, pixel data required for detection of a motion vector in fractional precision can be easily generated to be provided to a second computing device for carrying out detection of a motion vector in fractional precision. Element operational units 411a–411f may be arranged in a matrix (the data transfer direction may be one-way).

EMBODIMENT 3

Embodiment 1 and embodiment 2 are described where a motion vector for 1 template block is detected. Detection of motion vectors to 2 template blocks can also be carried out in parallel. The structure thereof will be described in the following.

Figure 65:
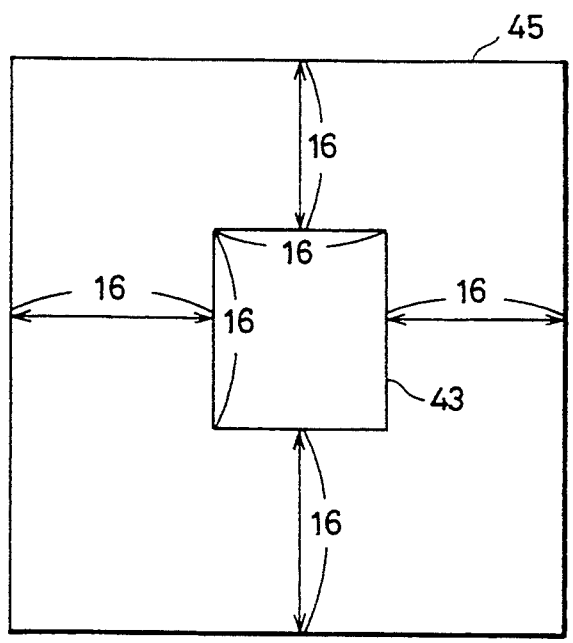
FIG. 65 shows the search area and the template block used in the third embodiment, and the search range.

FIG. 65 shows the sizes of the search area and the template block. Referring to FIG. 65, search area 45 has a size of 48×48 pixels, and template block 43 has a size of 16×16 pixels. The search range is +16 to −16 in the horizontal direction, and +16 to −16 in the vertical direction.

Figure 66:
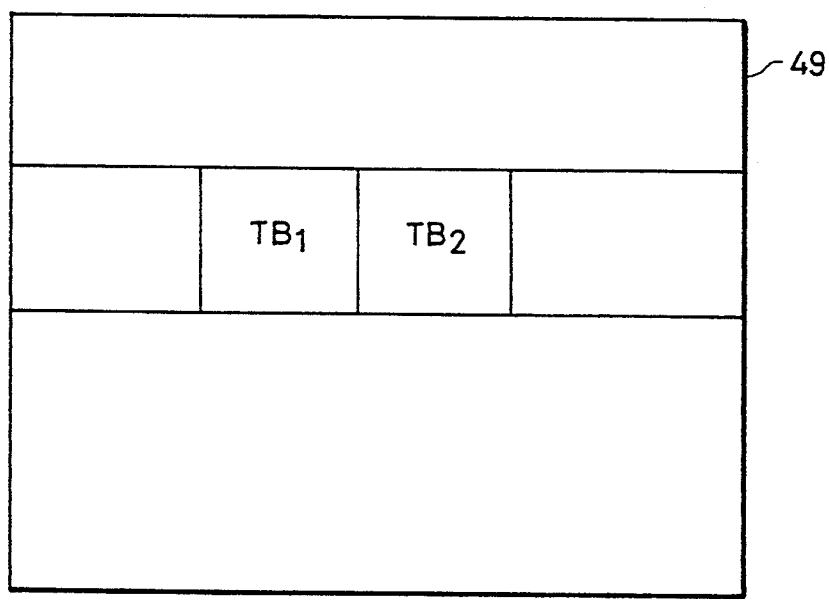
FIG. 66 shows arrangement of the template block used in the third embodiment.

As shown in FIG. 66, the case is considered of an operation of detecting each motion vector with two adjacent macroblocks TB1 and TB2 as the template block in the current frame picture 49. In the present embodiment, the processor array of the structure shown in FIGS. 1 and 4 is used. In the processor array, pixel data of search window 40 shown in FIG. 67 is stored.

Figure 67:
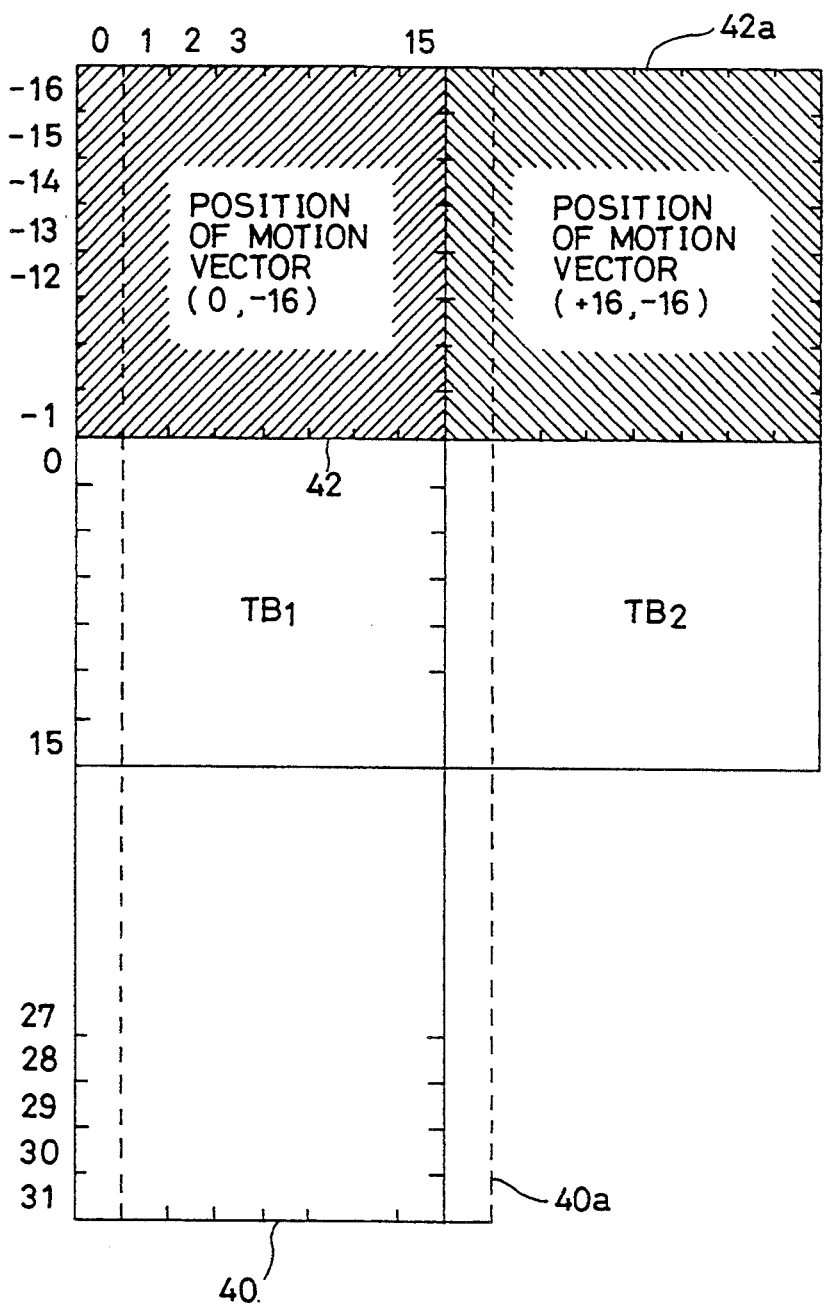
FIG. 67 is a diagram for describing the operation of a third embodiment according to the present invention.

A case considered where search window block 42 is stored in each element processor in the processor array as shown in FIG. 67. Here, the displacement vector for template block TB1 (0, −16), and the displacement vector (candidate of a motion vector) for template block TB2 is (−16, −16). For search window block 42a, the displacement vector of template block TB1 is (+16, −16), and the displacement vector of template block TB2 is (0, −16). Calculation of evaluation values for the two template blocks TB1 and TB2 are carried out in parallel.

Element processor PE in the processor array has search window block 42 shown in FIG. 67 stored. Similarly, pixel data of template blocks TB1 and TB2 are stored maintaining the arranged sequence on the picture in each element processor of the processor array. The structure of this element processor will be described afterwards.

The operation of the element processor is basically similar to that described with reference to embodiments 1 and 2.

Figure 68:
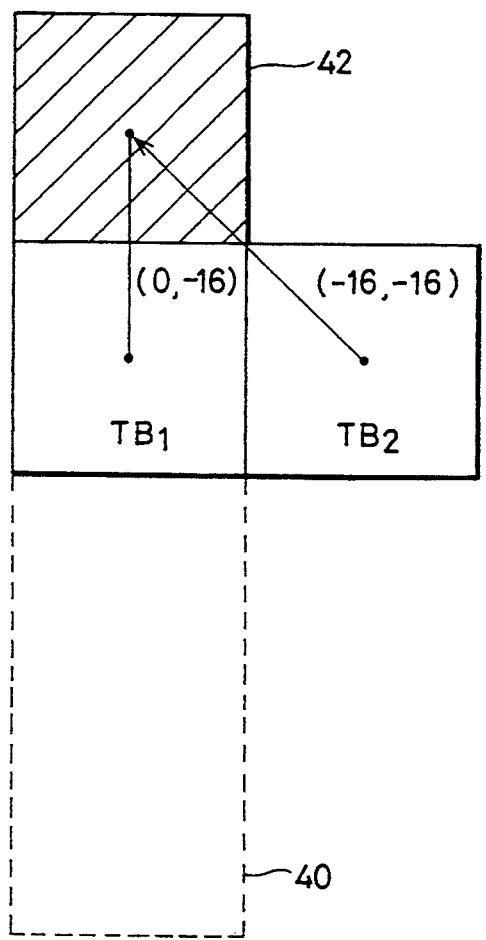
FIG. 68 is a diagram for describing the operation of a motion vector detecting apparatus according to the third embodiment of the present invention.

As shown in FIG. 68, evaluation values for displacement vectors (0, −16) and (−16, <16) for template blocks TB1 and TB2 is carried out using search window block 42.

When calculation of the evaluation values for displacement vectors (0, −16) and (−16, −16) is completed, the shift operation of 1 pixel is carried out in the processor array.

Figure 69:
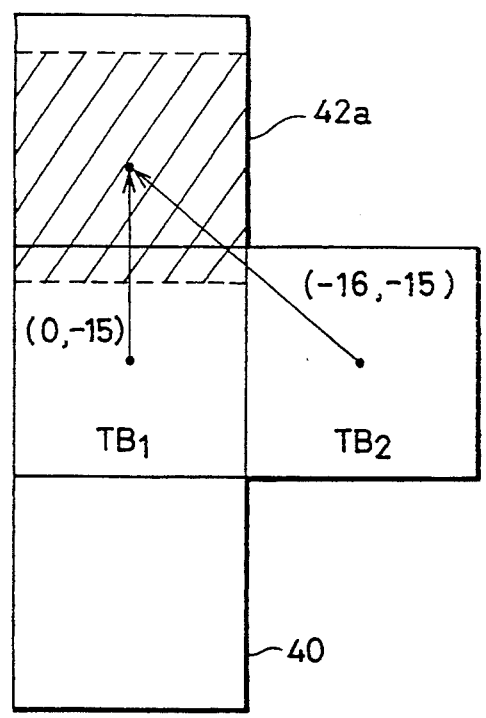
FIG. 69-71 are diagrams for describing the operation of the motion vector detecting device according to the third embodiment of the present invention.
Figure 70:
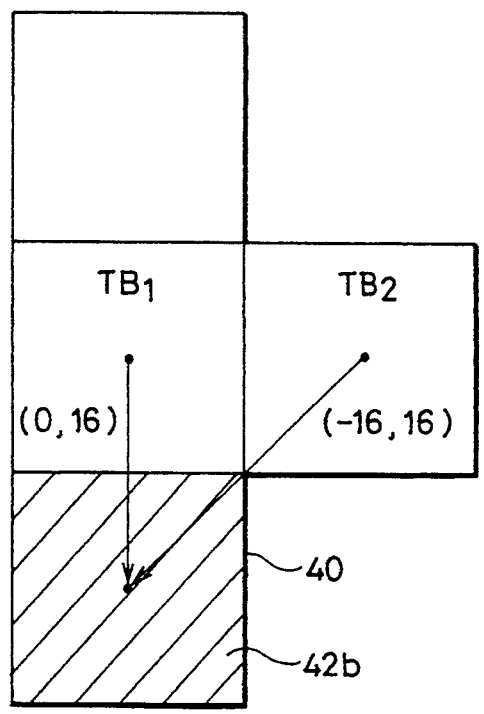

In this state, search window block 42 in search window 40 is shifted downwards by 1 row as shown in FIG. 69 (indicated by block 42a). The displacement vector for search window block 42a of template block TB1 is (0, −15) and the displacement vector of template block TB2 is (−16, −15). The evaluation value for each displacement vector is calculated.

The above-described operation is repeated. When 33 cycles are completed, search window block 42b is stored in the element processors in the processor array. In this state, the displacement vector of template block TB1 is (0, 16), and the displacement vector of template block TB2 is (−16, 16). Further carrying out the shifting operation of the search window data, search window 40 is shifted rightwards by 1 column, and evaluation of a motion vector is carried out using a new search window 40a.

Figure 71:
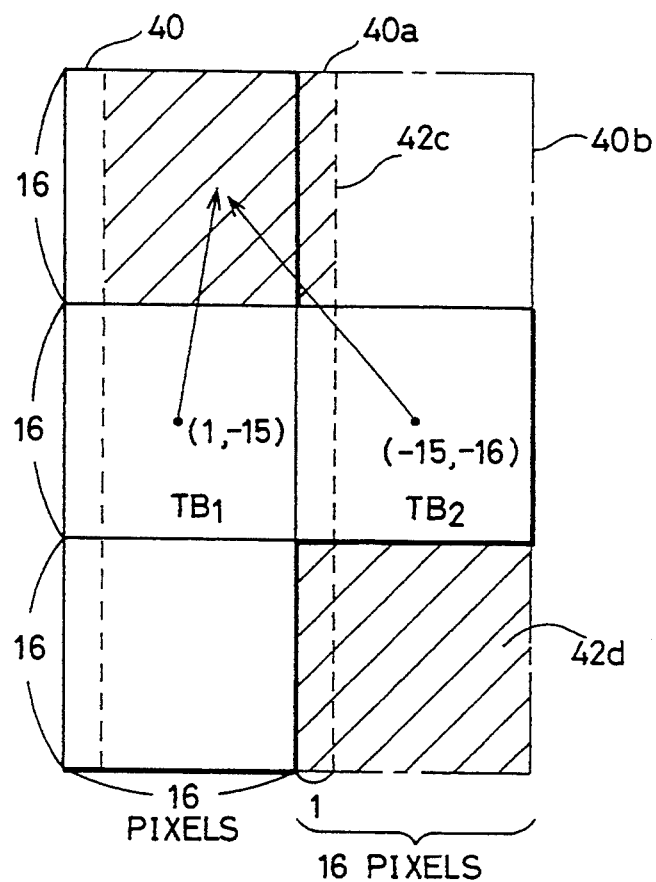

More specifically, as shown in FIG. 71, evaluation of a motion vector is carried out using the upmost search window block 42c in the new search window 40a. For search window block 42c, the displacement vector of template block TB1 is (1, −15), and the displacement vector of template block TB2 is (−15, −16).

By repeating this operation to complete evaluation of a motion vector for the bottom search window block 42d in search window 40b, the cycle for determining a motion vector of template block TB1 is completed. It is considered that the process for the 16 columns of −16 to 1 in the horizontal component is already completed before search window 40 is applied. In this state, an evaluation value for the 1089 points (=33×33) of evaluation indicating the candidates of a motion vector for template block TB1 can be calculated to obtain a motion vector. The motion vector of template block TB2 can be detected by carrying out this operation for template block TB2.

Figure 72:
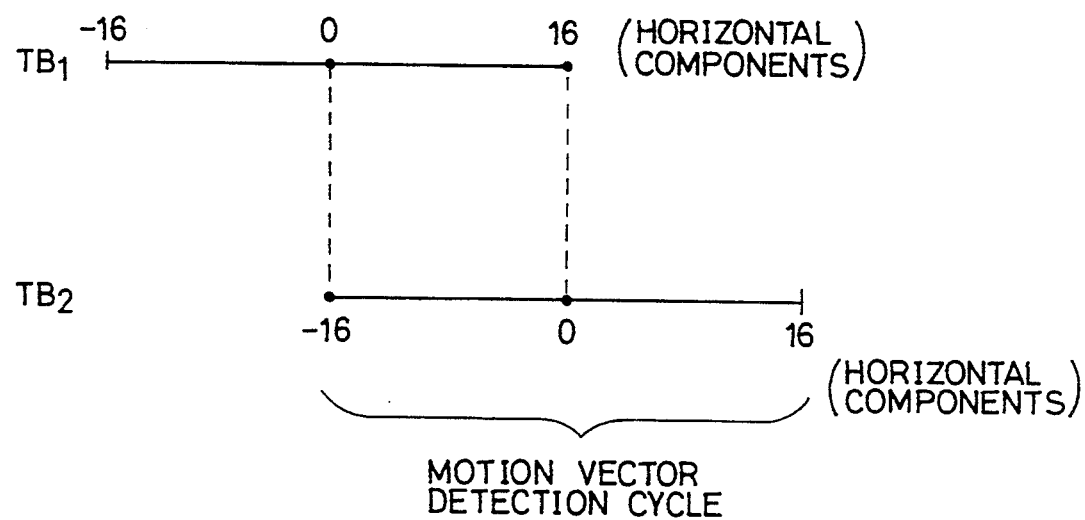
FIG. 72 is a timing chart showing a motion vector generation in the motion vector detecting device according to the third embodiment of the present invention.

More specifically, as shown in FIG. 72, the operation of evaluation of a motion vector for template blocks TB1 and TB2 can be carried out in a parallel manner where the motion vector detection cycles are overlapped by a half cycle. This allows execution of motion compensation of a picture at high speed. The structure for carrying out such parallel evaluation of motion vectors for the two template blocks will be described hereinafter.

Figure 73:
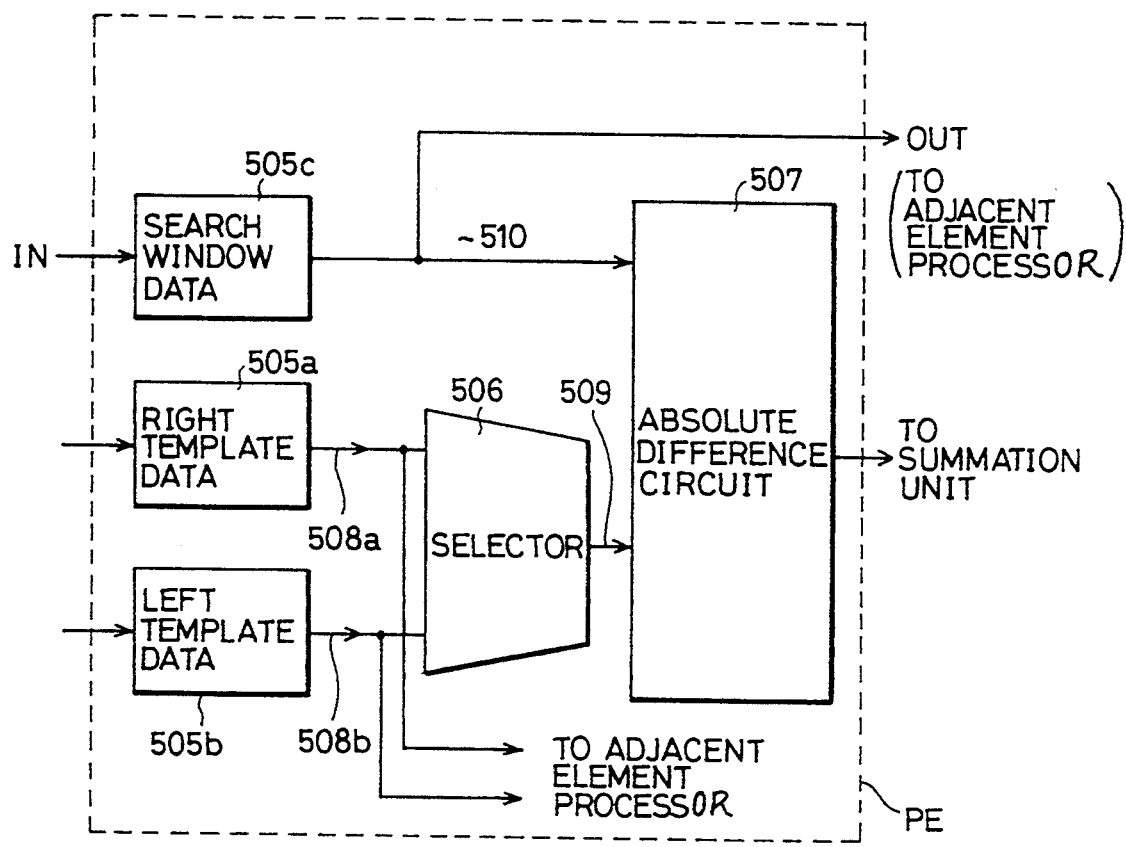
FIG. 73 shows a structure of the element processor used in the third embodiment of the present invention.

FIG. 73 shows a structure of an element processor used in the third embodiment of the present invention. Referring to FIG. 73, an element processor PE includes a search window data register 505c for storing search window data provided from an adjacent element processor, a right template data register 505a for storing pixel data of the right side template block provided from an adjacent element processor, a left template data register 505b for storing pixel data of a template block provided from an adjacent element processor, a selector 506 for selecting the output of either one of template data registers 505a and 505b, and an absolute difference circuit 507 for receiving the outputs of registers 505c and selector 506 via signal lines 510 and 509, respectively, to carry out calculation of an absolute difference.

The output of absolute difference circuit 507 is supplied to the summation unit via signal line 511. The element processor PE shown in FIG. 73 is arranged in a two dimensional array as shown in FIG. 4. The template block data is updated after evaluation of a motion vector for 16 columns (the 16 columns in the search area) of the horizontal components is carried out. Here, the right side template block and the left side template block may not be updated simultaneously, and only the stored data in one template block data register may be updated. In response, the select timing of selector 506 is switched. Only the selecting sequence of one template block needs to be identical in every operation cycle.

The structures of absolute difference circuit 507 and the summation unit are similar to those described in the first and second embodiments. Because the operation of the element processor PE is similar, the details will not be repeated. Template data registers 505a and 505b are sequentially selected by selector 506, and the absolute difference of the search window block data stored in search window data register 505c is obtained. Therefore, the absolute difference of the right side template block data and the absoluted difference of the left side template block data are provided from absolute difference circuit 507 in a time-divisional manner to be applied to the summation unit.

Figure 74:
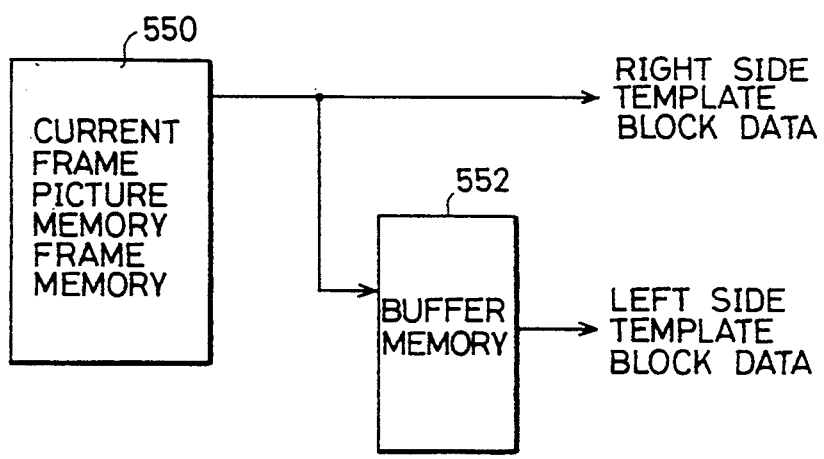
FIGS. 74 and 75 show the structure for generating data of two template blocks to the element processor shown in FIG. 73.
Figure 75:
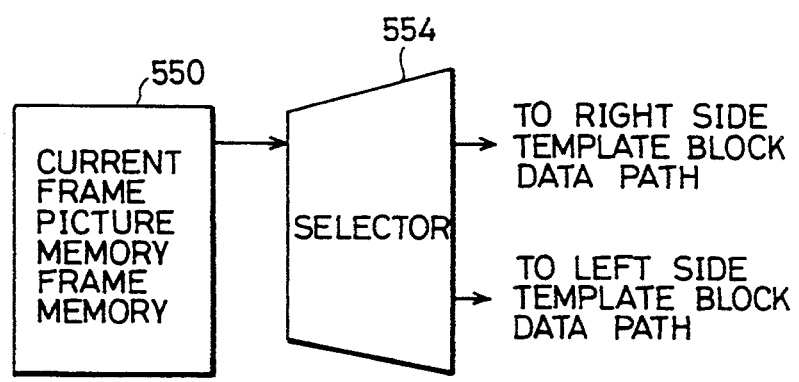

FIGS. 74 and 75 show the structures for generating the right side template block data and the left side template block data. In FIG. 74, the right side template block data is directly read out from the frame memory 550 of the current frame picture, and the left side template block data is read out from buffer memory 552. Buffer memory 552 sequentially stores the right side template block data read out from frame memory 550 for the current frame picture. For buffer memory 552, a multiport memory can be used having the separate writing path and reading path as described with reference to FIG. 54. Alternatively, a FIFO type memory may be used. Buffer memory 552 requires a storage capacity for storing all the pixel data of the template block. The current frame picture frame memory 550 stores all the pixel data of the current frame picture. In the structure shown in FIG. 74, the right side template block and the left side template block are updated together when the evaluation operation of a motion vector for the 16 columns in the horizontal direction of the processor array is completed.

FIG. 75 shows a structure for updating only one template block data in the processor array. Referring to FIG. 75, the template block data read out from frame memory 550 of the current frame picture is output by selector 554 as the right side template block data or the left side block data. Selector 554 transmits the template block data read out from frame memory 550 of the current frame picture to the right side template block data path or the left side template block data path. In the element processor PE shown in FIG. 73, only the data stored in either the right template data register 505a or the left template data register 505b is updated. In response to the switching of the selection manner of selector 554, the select sequence of selector 506 shown in FIG. 73 is switched.

Figure 76:
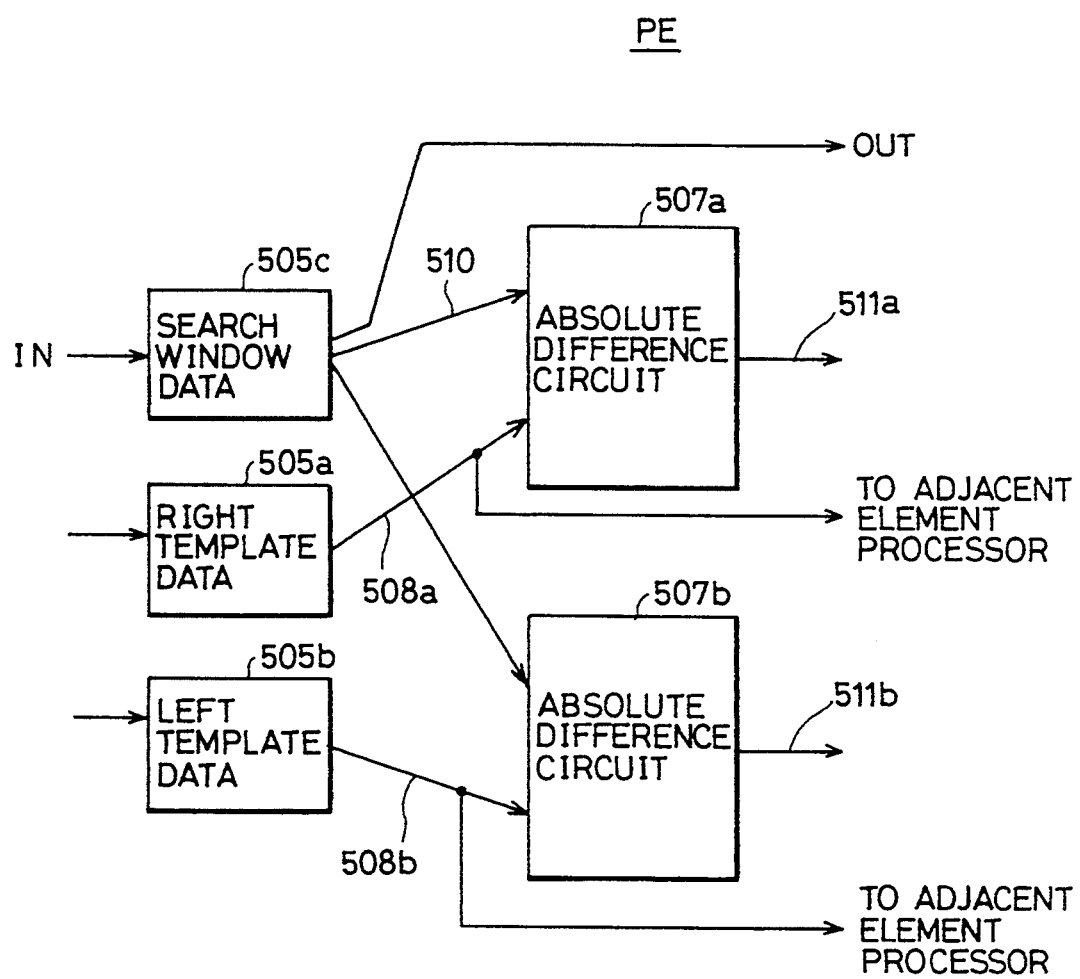
FIG. 76 shows another structure of the element processor shown in FIG. 73.

FIG. 76 shows another structure of an element processor. Referring to FIG. 76, the element processor PE includes two absolute difference circuits 507a and 507b. Absolute difference circuit 507a obtains the absolute difference of the data stored in search window data register 505c and the data stored in right template data register 505a. Absolute difference circuit 507b obtains the absolute difference of the data stored in search window data register 505c and left template data register 505b. The outputs of absolute difference circuits 507a and 507b are transmitted to the summation unit via signal lines 511a and 511b, respectively. Two summation circuits corresponding to absolute value circuits 507a and 507b may be provided in the summation unit. A structure where one summation circuit is driven in a time-divisional manner via a selector may be used.

In the above description structure of the element processor structure, it is described that the template data is transferred between adjacent element processors. When this template block data is not directly transmitted to the motion vector detection unit of fractional precision, a structure may be used where template data is directly applied to each element processor without shifting the template block data between adjacent element processors. This is because the template block data resides in the processor array during the motion vector evaluation operation term (shift operation is not required).

Figure 77A:
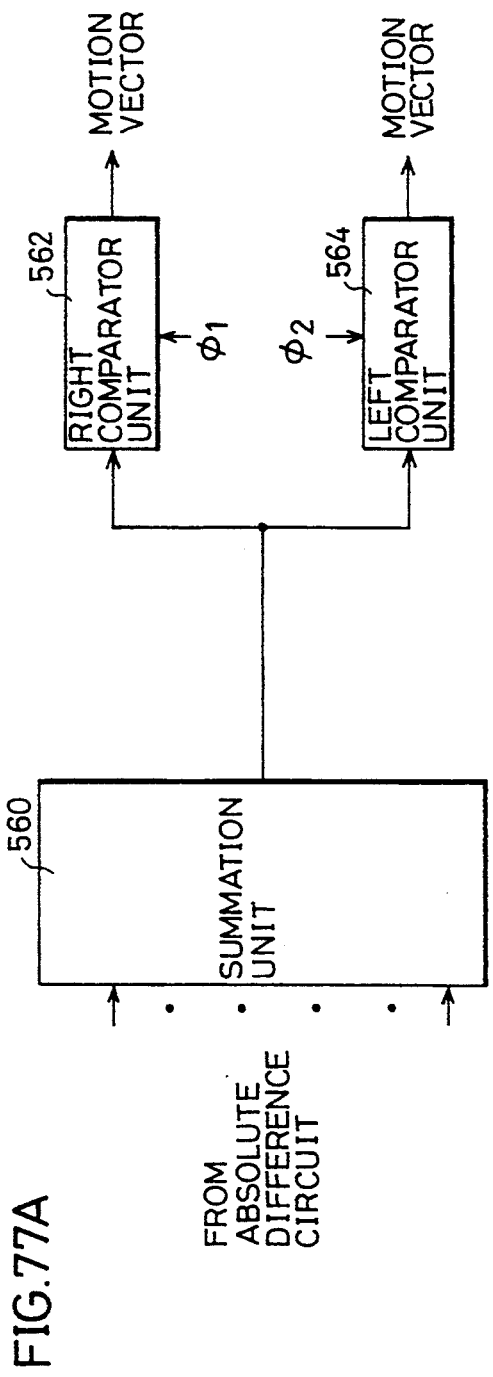
FIGS. 77A and 77B specifically show a structure of the comparator unit of the motion vector detecting device according to the third embodiment of the present invention.

FIG. 77 shows the structure of the summation unit and the comparison unit. Referring to FIG. 77A, summation unit 560 receives in parallel the absolute difference from the absolute difference circuit included in the element processor PE to carry out total summation calculation. The output of summation unit 560 is applied to a right comparator unit 562 and a left comparator unit 564. Right and left comparator units 562 and 564 are activated in response to activation signals $\phi 1$ and $\phi 2$, respectively. Right comparator unit 562 determines a motion vector for the right side template block, and left comparator unit 564 detects a motion vector for the left side template block. The structures of summation unit 560, and comparator units 562 and 564 may use those shown in the preceding embodiments. More specifically, the structures shown in FIGS. 40-42 can be used as summation unit 560, and the structure shown in FIG. 43 can be used for comparator units 562 and 564. Activation control signals $\phi 1$ and $\phi 2$ are provided for the activation of comparators included in the comparator unit and for control of the latch operation of a register latch.

Figure 77B:
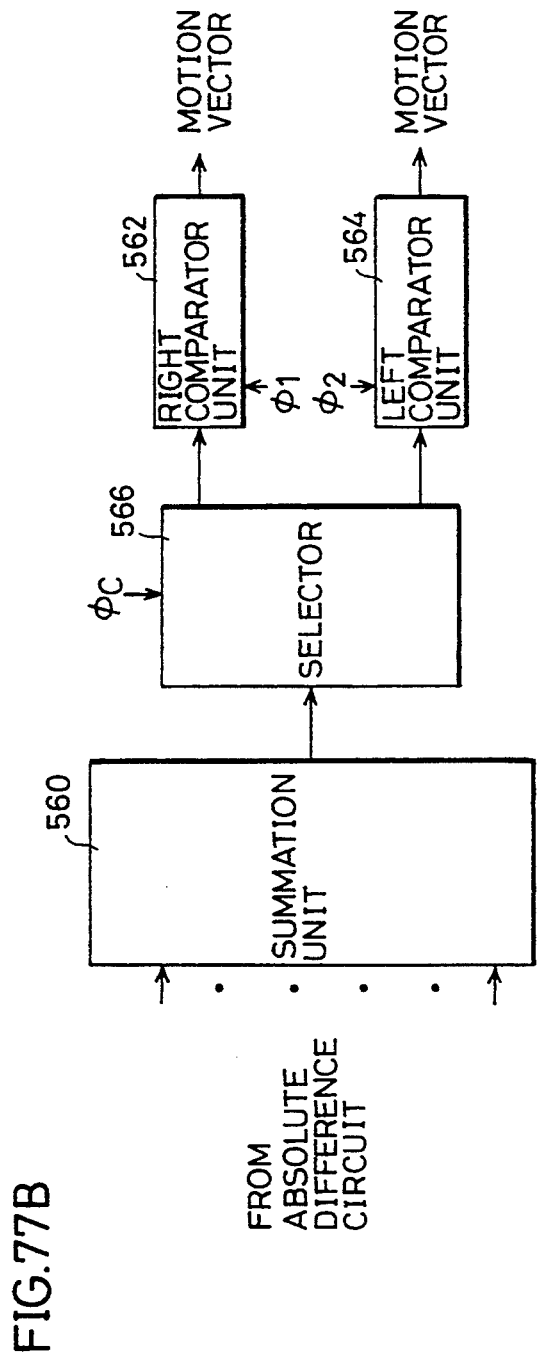

In the structure shown in FIG. 77A, an evaluation value for the right side and left side template blocks are output in a time-divisional manner from summation unit 560. In this case, a selector 566 may be provided between summation unit 560 and comparator units 562 and 564 responsive to a control signal $\phi C$ for switching the signal transmission path as shown in FIG. 77B to ensure the comparison operation. Selector 566 switches the signal transmission path under the control of control signal $\phi C$ according to the evaluation values of the right side and left side template blocks for transmitting the evaluation value provided from summation unit 560 to the corresponding right or left comparator units 562 or 564.

When the element processor includes two absolute difference circuits as shown in FIG. 76, summation unit 560 may include two summation circuits. In this case, evaluation values for the right side and left side template blocks are provided in parallel from summation unit 560. A multiplexer for selecting an absolute difference circuit group (left/right) may be provided in the input portion of summation unit 560.

Figure 78:
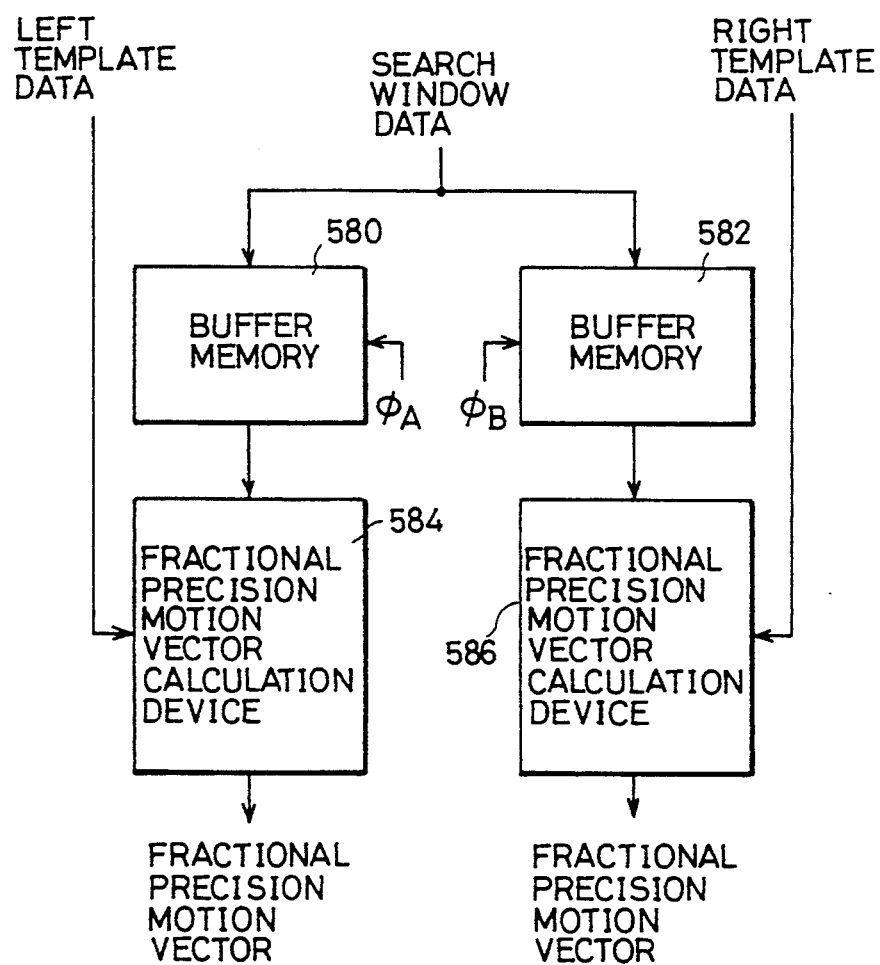
FIG. 78 shows the structure of a device in combining the third embodiment of the present invention to the fractional precision motion vector detecting device.

FIG. 78 shows the structure for carrying in parallel detection of a motion vector in fractional precision for two template blocks.

Referring to FIG. 78, the device for detecting a motion vector in fractional precision includes buffer memories 580 and 582 for storing the search window data required for detection of a motion vector in fractional precision out of the search window data provided from the processor array for detecting a motion vector in integer precision, a fractional precision motion vector calculating device 584 for receiving from buffer memory 580 the search window data and the left side template block data for detecting a motion vector in fractional precision, and a fractional precision motion vector calculating device 586 for receiving the search window data from the buffer memory 582 and the right side template block data for detecting a motion vector in fractional precision.

Buffer memories 580 and 582 carry out the writing operation of search window data in response to write control signals $\phi A$ and $\phi B$. Control signals $\phi A$ and $\phi B$ are generated from comparator units 564 and 562, respectively, shown in FIG. 63. A structure similar to that described in the second embodiment is used for buffer memories 580 and 582. Buffer memory 580 has the stored data read out sequentially in determining a motion vector in integer precision for the left side template block, and buffer memory 582 has the stored contents read out in determining a motion vector for the right side template block. The structure similar to those described in the second embodiment is used for fractional precision motion vector computing devices 584 and 586. The operation of fractional precision motion vector computing devices 584 and 586 is similar to that described in the second embodiment, and details thereof will not be repeated.

The right side template block data and the left side template block data have deviation in the output timing of the cycle term corresponding to 16 horizontal components. In the case where the right and left side template block data are both updated for every 16 horizontal component cycles, buffer means are provided for respective right and left template block data to adjust the timing thereof. In this case, there is deviation in time during the motion vector determining period of right and left side template blocks. Similarly there is deviation in the timing for the fractional precision motion vector calculation. In this case, the fractional precision motion vector computing device may be used in common to the right and left side template blocks.

Figure 79:
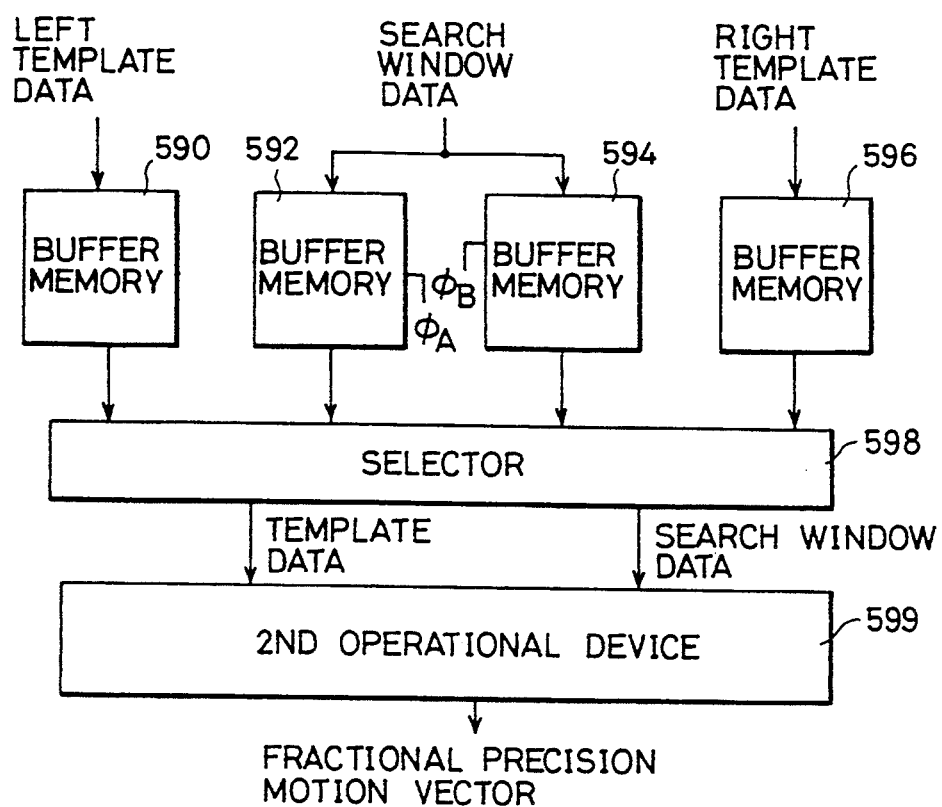
FIGS. 79 and 80 shows another structure and operation thereof when the motion vector detecting device of the third embodiment is combined with the fractional precision motion vector detecting device.

FIG. 79 shows a modification of the structure of the fractional precision motion vector detection shown in FIG. 78. Referring to FIG. 79, the structure for detecting a motion vector in fractional precision includes a buffer memory 590 for storing left side template block data, buffer memories 592 and 594 for storing search window data in response to control signals $\phi A$ and $\phi B$, respectively, a buffer memory 596 for storing right side template block data, a selector 598 for selecting a set of template data and search window data from the data read out from buffer memories 590, 592, 594 and 596, and a second computing device 599 for detecting a motion vector in fractional precision according to template data and search window data provided from selector 598.

Selector 598 selects the data stored in buffer memories 590 and 592 in determining a motion vector in fractional precision for the left side template block. In detecting a motion vector in fractional precision for the right side template block, selector 598 selects data read out from buffer memories 594 and 596. Second computing device 599 determines a motion vector in fractional precision according to the applied template data and search window data.

Figure 80:
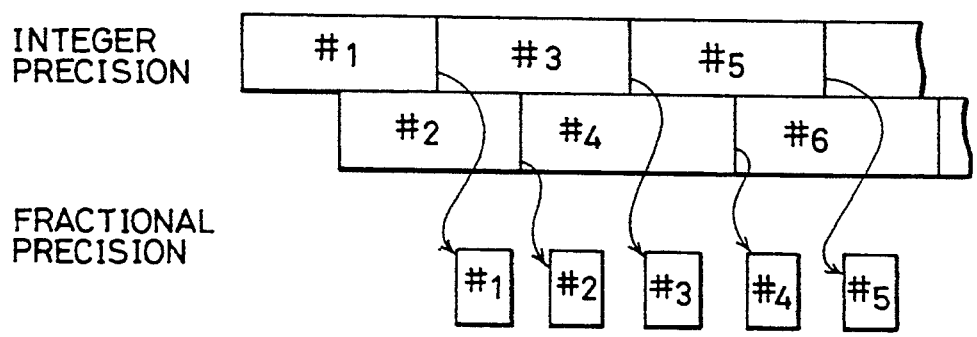

The usage of buffer memories 590, 592, 594 and 596 ensures detection of a motion vector in fractional precision for the left and right side template blocks. As shown in FIG. 80, detection of a motion vector in fractional precision for the right side and left side template blocks may be carried out in a pipeline manner in parallel to the determination operation of a motion vector in integer precision for the left side and right side template blocks. According to such a structure, a more efficient motion vector detecting apparatus can be obtained in a smaller circuit complexity.

In the structure shown in FIG. 79, the read out timing of data from the buffer memory is not described in the strictest sense. However, similar to the description of the second embodiment for carrying out detection of a motion vector in fractional precision, for template block data, a structure is to be used where writing of template block data is carried out according to a motion vector determination signal from the comparator unit of the integer precision computing device and reading out data after completion of writing all the data.

By applying a buffer process even to template block data by a buffer memory, the detection operation of a motion vector in fractional precision and the detection operation of a motion vector in integer precision may be pipelined to detect a motion vector at high speed as shown in FIG. 80. FIG. 80 shows an example of a sequence of detecting a motion vector in integer precision and detecting a motion vector in fractional precision for macroblocks #1–#6.

EMBODIMENT 4

In storage medium coding technique, a picture signal is not subjected to the restriction of time axis in picture processing. This is because a picture signal is stored in a storage media such as a CD-ROM. In the case of motion picture compensation for storage media, three motion compensations are possible: (i) forward direction motion compensation of predicting the present from the past, (ii) backward direction motion compensation of predicting the future from the present, and (iii) interpolation motion compensation of predicting the present from the past and the future. Forward and backward direction motion compensation may use the structures of embodiments 1-3 since 1 reference frame and the present frame are used in the one-way prediction (referred to as "one way prediction" hereinafter).

Interpolation motion compensation requires reference frames of the past and the future and the present frame. In interpolation motion compensation, the two reference frames (reference frame of the past and reference frame of the future) are merged taking into consideration the time distance between the two reference frames and the present frame. Using the merged reference frame (block), the motion compensation estimation value of the pixel of the present frame is obtained. In order to obtain a motion vector for the merged reference frame (block), an optimum motion vector must be obtained from the motion vector obtained from the macroblock of the reference frame of the past and the motion vector obtained by the macroblock of the reference frame of the future. Such a process is carried out for a B picture in Motion Picture Image Coding Standard for Storage Media of MPEG (Motion Picture Image Coding Experts Group), as an example.

Although the application is not limited to a B picture, a structure for detecting a motion vector by interpolation prediction is described as the fourth embodiment in the following.

Figure 81:
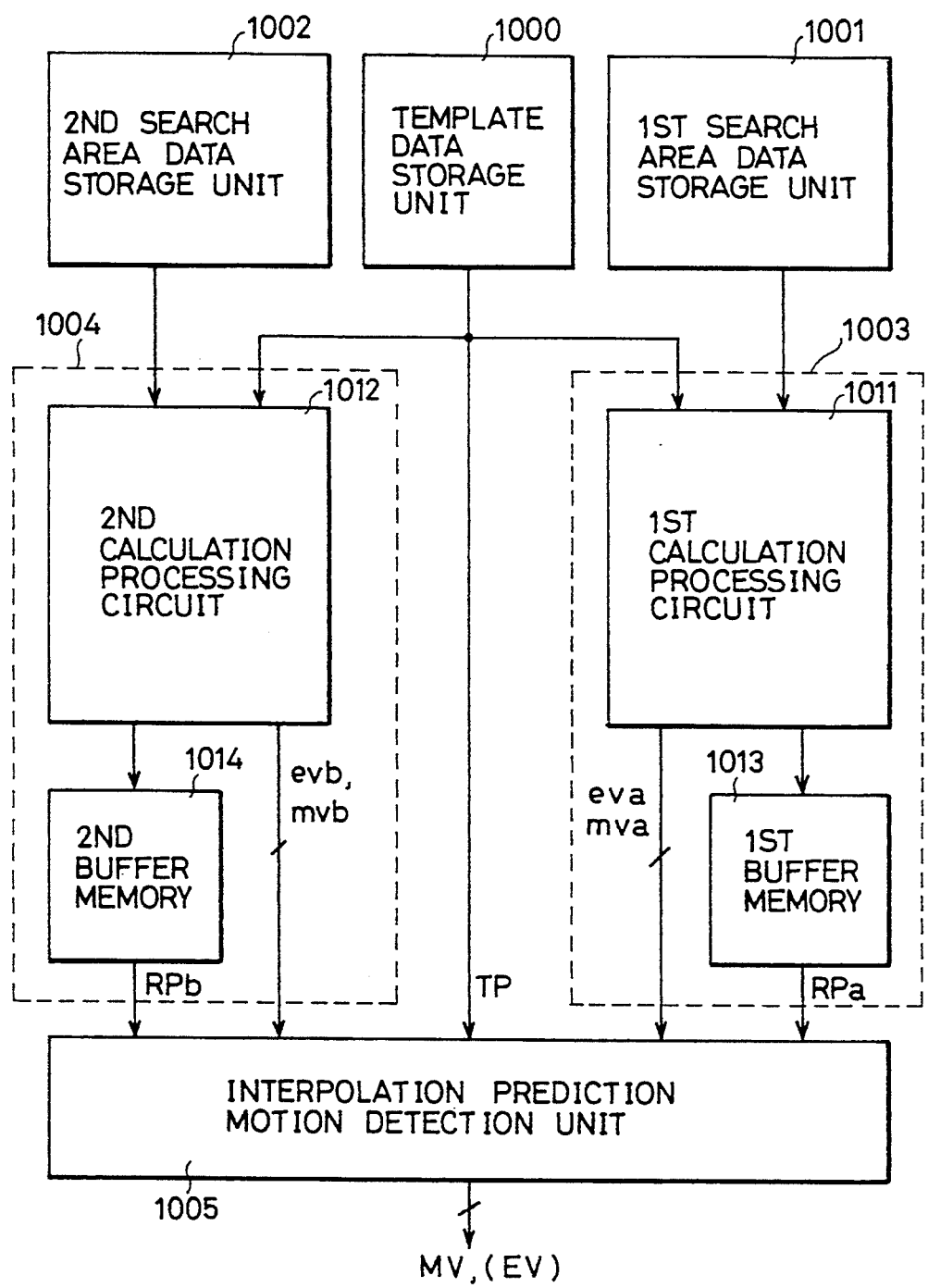
FIG. 81 shows the structure of a motion vector detecting device according to a fourth embodiment of the present invention.

Referring to FIG. 81, an interpolation prediction motion vector detection device includes a first search area data storage unit 1001 for storing pixel data of a first storage area, a template data storage unit 1000 for storing pixel data of the template of the present frame, and a second search area data storage unit 1002 for storing pixel data of a second search area for storing pixel data of the second search area. First and second search area data storage units 1001 and 1002 may be frame memories for storing the pixel data of the first and second reference frames. Template data storage unit 1000 may be a frame memory for storing the pixel data of the present frame. One of the first and second reference frames is the frame of the past, and the other is the frame of the future. In the case of a structure carrying out motion compensation by merging a plurality of frames in a one-way direction, the first and second reference frames may be arranged in the same direction on the time axis with respect to the present frame.

The interpolation prediction motion vector detecting device further includes a first one way prediction motion detecting unit 1003 for receiving the template block pixel data from data storage unit 1000 and the search area data (search window data) from first search area data storage unit 1001 for obtaining a first motion vector mva, and a second one way prediction motion detecting unit 1004 for detecting a second motion vector from the template block pixel data from storage unit 1000 and the search area data read out from second search area data storage unit 1002.

First one way prediction motion detecting unit 1003 includes an element processor used in the first-third embodiments. First one way prediction motion detecting unit 1003 includes a first computing processing circuit 1011 for carrying out a block matching process for the applied search area data and template block data to obtain a motion vector mva and an evaluation value eva, and a first buffer memory 1013 for storing search window block data corresponding to a motion vector obtained from first computing processing circuit 1011.

Buffer memory 1013 has a structure similar to that used for detection of a motion vector in fractional precision in the second embodiment. More specifically, first buffer memory 1013 stores search window pixel data shifted out sequentially from first computing processing circuit 1011. First buffer memory 1013 may have a storage capacity for storing all the pixel data of the search area, and may have a storage capacity for storing the pixel data of one search window block. Reading and writing of pixel data to buffer memory 1013 is carried out using the control system shown in FIG. 53, for example. It is to be noted that the peripheral pixel of the search window block is not required for detecting a motion vector in integer precision.

Second one way prediction motion detecting unit 1004 has a structure similar to that of first one way motion prediction detecting unit 1003, and includes a second computing processing circuit 1012, and a second buffer memory 1014. Second computing processing circuit 1012 obtains a motion vector mvb and an evaluation value evb by applying a block matching process to the applied search area pixel data and the template block data. The second buffer memory 1014 receives search window data from second computing processing circuit 1012 to store search window block pixel data corresponding to a motion vector mvb. Second buffer may be implemented so as to store all the pixel data in the search area and to output only the search window block data corresponding to a motion vector mvb.

Search window block data corresponding to motion vectors mva and mvb from first and second buffer memories 1013 and 1014 as partial reference picture data RPa and RPb are read out to be applied ti interpolation prediction motion detecting unit 1005 together with motion vectors mva and mvb and evaluation values eva and evb.

First and second computing processing circuits 1011 and 1012 include a processor array, a summation unit, and a comparator unit similar to the structure shown in the first-third embodiments, and carry out calculation of an evaluation value and detection of a motion vector in a parallel manner according to a similar method. First and second buffer memories 1013 and 1014 store search window pixel data shifted out from first and second computing processing circuits 1011 and 1012, respectively.

First and second buffer memories 1013 and 1014 respond to a control signal from the comparator unit included in each of first and second computing processing circuits 1011 and 1012 to store search window block pixel data for a displacement vector which becomes a candidate of a motion vector (when the storage capacity corresponds to the search window block). In the comparator unit, the signal generated at the time of determining the update of a displacement vector is used as a data write control signal. Because the data which is the first pixel of the search window block is shifted out from the processing device, pixel data of a search window block corresponding to a displacement vector which becomes a motion vector candidate can always be stored by resetting an address signal in response to a control signal from the comparator unit. In reading out data, data is read out from the starting address (reset address) after completion of a motion vector detection cycle. This control method is similar to that described with reference to FIG. 55. (Block 48 in FIG. 54 can be assumed as the search window block. Delay means for the peripheral pixel is not required).

When first and second buffer memories 1013 and 1014 store all the pixel data of the search area, the value of a motion vector can be used as the start address in reading out data (when the motion vector is expressed as a count value of the counter; refer to FIG. 43). By carrying out an address skip operation, read out of unnecessary search window pixel data can be prevented. The operation of first and second one way prediction motion detecting units 1003 and 1004 is similar to those of the first-third embodiments, and details thereof will not be repeated.

The structure and operation of an interpolation prediction motion detecting unit 1005 will be described hereinafter. In detecting an interpolation motion vector, the partial reference image data in the buffer memory is also output. This output partial reference picture data is used for prediction value generation.

Figure 82:
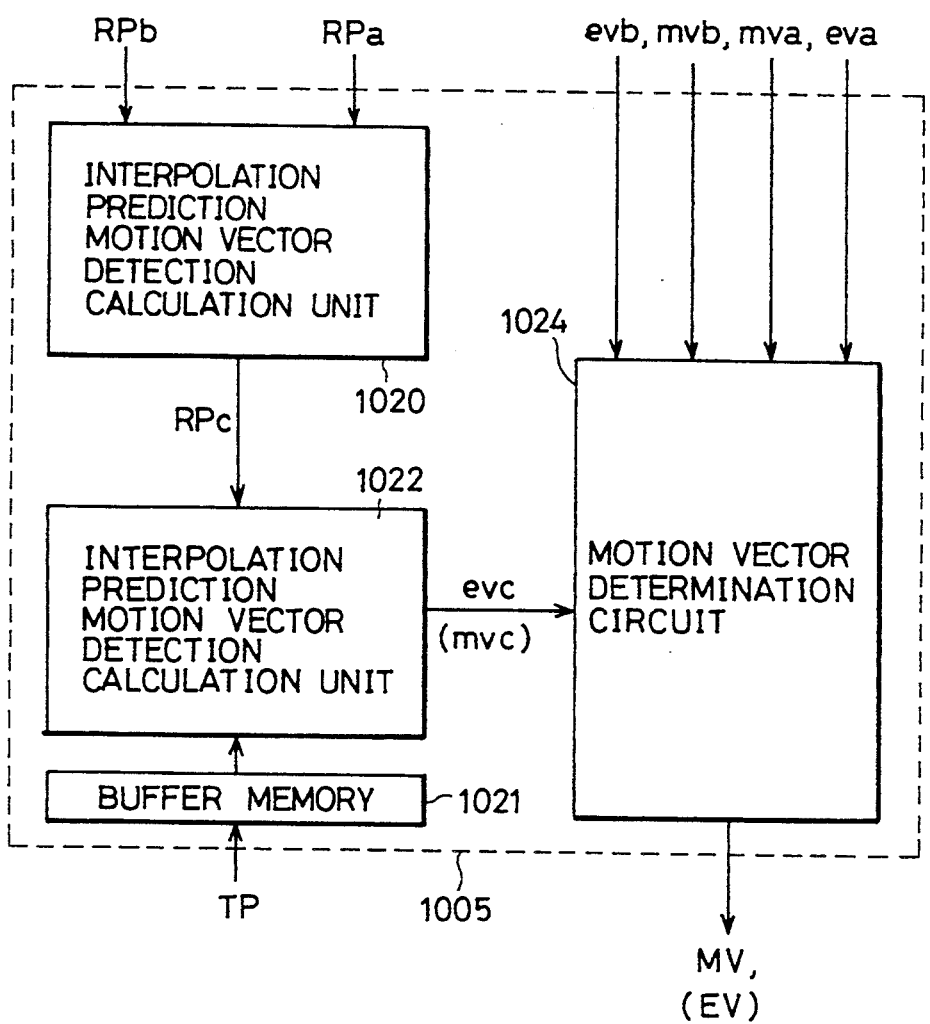
FIG. 82 shows the structure of the interpolation prediction motion vector detecting unit shown in FIG. 81.

Referring to FIG. 82, an interpolation prediction motion detection unit 1005 includes an interpolation prediction reference picture generating circuit 1020 receiving partial reference picture data (the search window block data of first and second search areas corresponding to motion vectors mva and mvb) from first and second buffer memories for generating a reference picture (referred to as a merged search window block hereinafter) required for interpolation prediction, a buffer memory 1021 for storing template block data TP, an interpolation prediction motion vector detecting operational unit 1022 for carrying out block matching between the merged search window block pixel data from interpolation prediction reference picture generating circuit 1020 and template block pixel data read out from buffer memory 1021 (in this case, calculation of an evaluation value indicating the correlation between the merged search window block and the template block) for generating an interpolation prediction evaluation value evc, and a motion vector determination circuit 1024 for detecting an optimum motion vector from an interpolation prediction evaluation value evc from interpolation prediction motion vector detecting operational unit 1022 and first and second evaluation values eva and evb provided from first and second computing processing circuits.

Buffer memory 1021 stores the template data from template data storage unit 1000 shown in FIG. 81 in parallel to loading to first and second computing processing circuits 1011 and 1012. Read out of data from buffer memory 1021 is carried out in synchronization with data read out from first and second buffer memories 1013 and 1014.

Interpolation prediction reference picture generating circuit 1020 carries out a predetermined operation with respect to supplied pixel data RPa and RPb. This operation may be an arithmetic mean of (RPa+RPb)/2. Alternatively, a weighted mean such as (m. RPa+n. RPb)/(m+n) may be carried out. The weights m and n are determined by the time distance between the current frame and respective first and second reference frames (including first and second search areas). The weight increases for a reference frame having a small time distance. This is because the change with the current frame decreases as the time distance is reduced.

Interpolation prediction motion vector detection operational unit 1022 obtains, for example, a sum of the absolute differences of merge search window pixel data RPc from circuit 1020 and template block pixel data TP to generate an evaluation value evc. As an alternative of calculating the sum of the absolute difference, calculation such as of sum of the squared difference may be obtained. Any calculation that yields an evaluation value indicating the correlationship of the blocks is acceptable. Merged pixel data RPc from circuit 1020 and template block data from buffer memory 1021 are applied to operational unit 1022 by 1 pixel, whereby a predetermined calculation is sequentially carried out. When this calculation is completed, an evaluation value evc is generated.

Motion vector determination circuit 1024 compares the magnitudes of evaluation value evc from operational unit 1022 and evaluation values eva and evb from first and second processing circuits to provide a motion vector corresponding to the minimum evaluation value as the optimum motion vector MV for interpolation prediction.

Determination circuit 1024 provides motion vectors mva and mvb sequentially in a predetermined order (or in parallel) when the evaluation value evc from operational unit 1022 is minimum. Determination circuit 1024 may be implemented so as to also provide an evaluation value EV corresponding to the optimum motion vector MV.

Because reading out a reference frame image and calculating an interpolation prediction motion vector are allowed by the above-described structure, access to the frame memory storing the reference picture is eliminated. Therefore, calculation of an interpolation prediction motion vector at high speed can be carried out. Partial reference pictures of buffer memories 1013 and 1014 are provided together with the detection of motion vector MV.

If only detection of an interpolation prediction motion vector is required, a structure may be employed where pixel data read out from first and second search areas are merged (interpolated) by interpolation prediction reference picture generation circuit 1020 to dispatch the merged pixel data and the template block pixel data to the processor array (having a structure similar to those of first and second computing processing circuits) for detecting a motion vector. By using first one way prediction motion detecting unit 1003 for detecting a motion vector of forward direction prediction and the second one way prediction motion detecting unit 1004 for detection of a motion vector for backward direction reproduction, detection of a motion vector for interpolation prediction (bi-directional prediction) can be realized without increasing the device complexity. The structure of each component will be described hereinafter.

Figure 83:
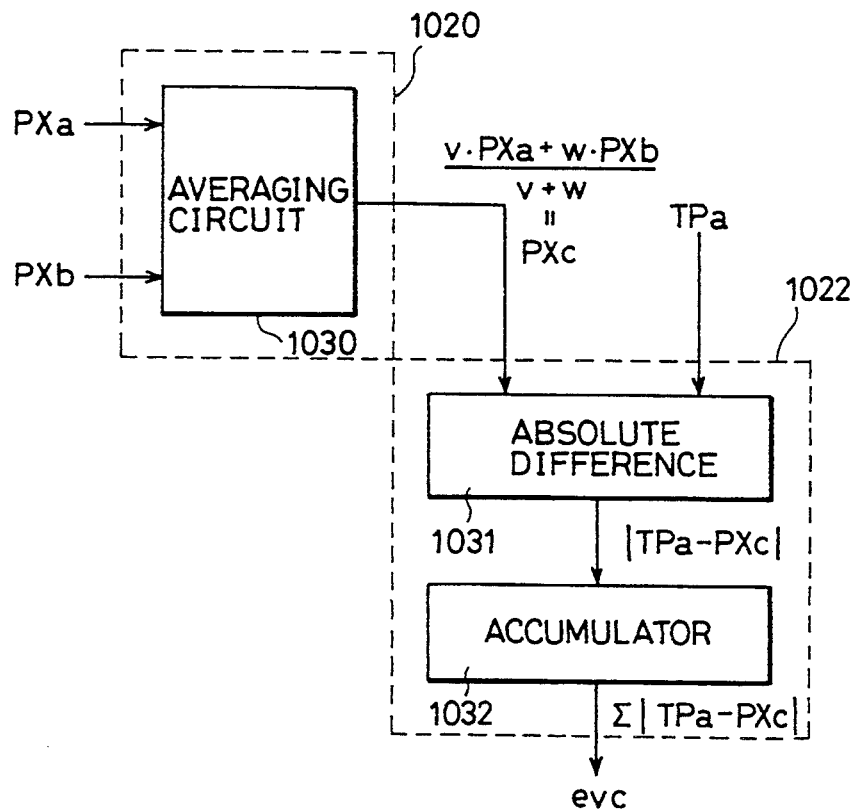
FIG. 83 shows the structures of the interpolation prediction reference picture generation circuit and interpolation prediction motion vector detection unit shown in FIG. 82.

FIG. 83 shows the structure of an interpolation prediction reference picture generating circuit and an interpolation prediction motion vector detecting operational unit of FIG. 82. Interpolation prediction reference picture generating circuit 1020 includes an averaging circuit 1030 for obtaining the average of pixel data PXa and PXb of partial reference pictures RPa and RPb. Averaging circuit 1030 executes the calculation of (v·PXa+w·PXb)/(v+w), where v=w is allowed, and v and w may be determined according to the time distance with respect to the current frame (template block). Averaging circuit 1030 may be formed of a multiplication circuit (multiplication of coefficients v and w), an adder circuit, and a divider circuit. Alternatively, it may be formed using a ROM (with data PXa and PXb as the address).

Operational unit 1022 includes an absolute difference circuit 1031 for obtaining the absolute difference |TPa-PXc| between merged pixel data PXc from averaging circuit 1030 and template block pixel data TPa, and an accumulator 1032 for accumulating the output of absolute difference circuit 1031 to generate an evaluation value evc. For component 1031 used in operational unit 1022, a structure similar to that described in embodiment 1 (refer to FIG. 26) can be used. A structure including a general register and an adder can be used for accumulator 1032.

Operational unit 1022 may be formed of a square difference sum circuit.

Figure 84:
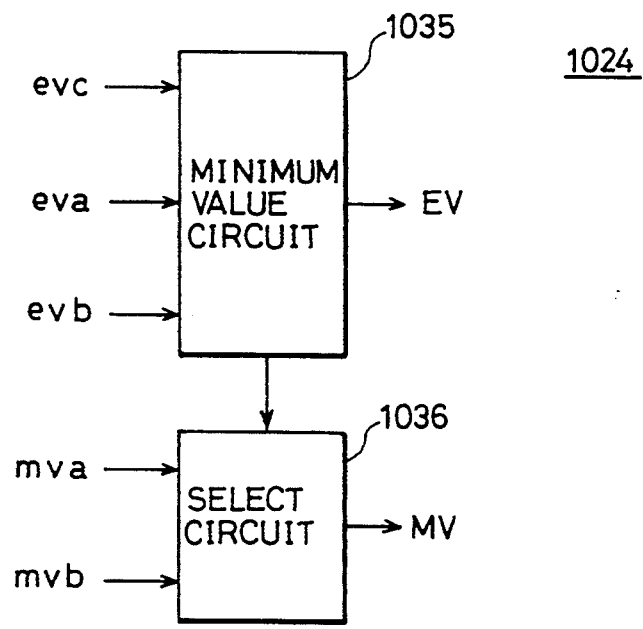
FIG. 84 specifically shows a structure of the motion vector detection circuit of FIG. 82.

FIG. 84 shows the structure of motion vector determination unit 1024 of FIG. 82. Referring to FIG. 84, motion vector determination unit 1024 includes a minimum value circuit 1035 for obtaining the minimum value MIN {eva, evb, evc} out of evaluation values eva, evb, and evc, and a select circuit 1036 responsive to the minimum value information from minimum value circuit 1035 for selecting one or both of motion vectors mva and mvb. Select circuit 1036 selects motion vector mva or mvb when minimum value circuit 1035 selects an evaluation value eva or evb, and selects both motion vectors mva and mvb when minimum value circuit 1035 selects an evaluation value eVC.

Figure 85:
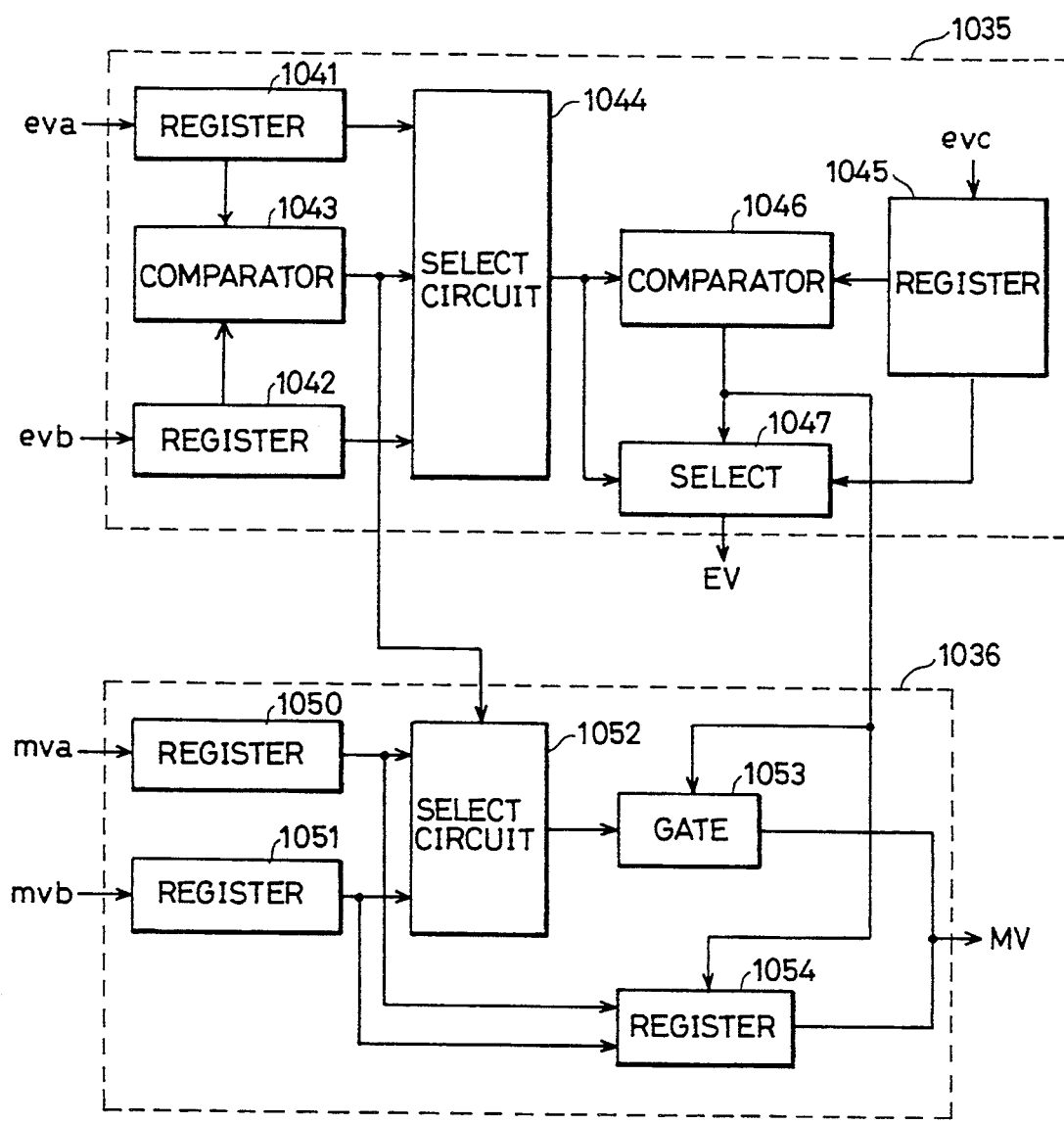
FIG. 85 shows the structure in details of the circuit shown in FIG. 84.

FIG. 85 shows in details the structures of the minimum value circuit and the select circuit of FIG. 84. Referring to FIG. 85, minimum value circuit 1035 includes registers 1041 and 1042 for temporary storing evaluation values eva and evb, respectively, a comparator 1043 for comparing the magnitude of evaluation values eva and evb stored in respective registers 1041 and 1042, and a select circuit 1044 responsive to the output of comparator 1043 to pass through one of evaluation values eva and evb stored in registers 1041 and 1042.

Comparator 1043 provides a signal of a first logic level (for example "H") when the evaluation value eva is greater, otherwise a signal of a second logic level (for example "L"). Select circuit 1044 selects the evaluation value evb from register 1042 in receiving a signal of the first logic level, and the evaluation value eva from register 1041 in receiving a signal of the second logic level. Therefore, the smaller evaluation value MIN {eva, evb} out of the evaluation values eva and evb is provided from select circuit 1044.

Minimum value circuit 1035 further includes a register 1045 for temporary storing an evaluation value evc (an evaluation value for interpolation prediction), a comparator 1046 for comparing the output of select circuit 1044 with the evaluation value evc from register 1045, and a select circuit 1047 responsive to the output of comparator 1046 to pass through either the output of select circuit 1044 or the evaluation value evc from register 1045.

Comparator circuit 1046 provides a signal of the first logic level when the output of select circuit 1044 is greater than the evaluation value evc, otherwise a signal of the second logic level. Select circuit 1047 selects the evaluation value evc from register 1045 when a signal of the first logic level is provided from comparator 1046, and the output of select circuit 1044 when a signal of the second logic level is provided. More specifically, a minimum value which is MIN {evc, MIN (eva, evb)}=MIN (eva, evb, evc) is provided from select circuit 1047 as the evaluation value EV.

When the values of both inputs are equal in each of comparators 1043 and 1046, one of the two may be selected according to a predetermined priority.

Select circuit 1036 includes registers 1050 and 1051 for temporary storing motion vectors mva and mvb, a select circuit 1052 responsive to the output of comparator 1043 in minimum value circuit 1035 for passing out one of the outputs of registers 1050 and 1051, a gate circuit 1053 responsive to the output of comparator 1046 to selectively pass out the output of select circuit 1052, and a register 1054 responsive to the output of comparator 1046 to provide motion vectors mva and mvb from registers 1050 and 1051 in sequence or in parallel.

Select circuit 1052 carries out an operation similar to that of select circuit 1044 to pass out a motion vector corresponding to the selected (smaller) evaluation value. Gate circuit 1053 attains an output high impedance state when comparator 1046 provides a signal of the first logic level selecting the evaluation value eva and passes out the output of select circuit 1052 when a signal of the second logic level is provided from comparator 1046.

Register 1054 operates complementarily to gate circuit 1053. Register 1054 provides motion vectors mva and mvb from registers 1050 and 1051 when a signal of the first logic level is applied, and attains an output high impedance state when a signal of the second logic level is applied.

Figure 86:
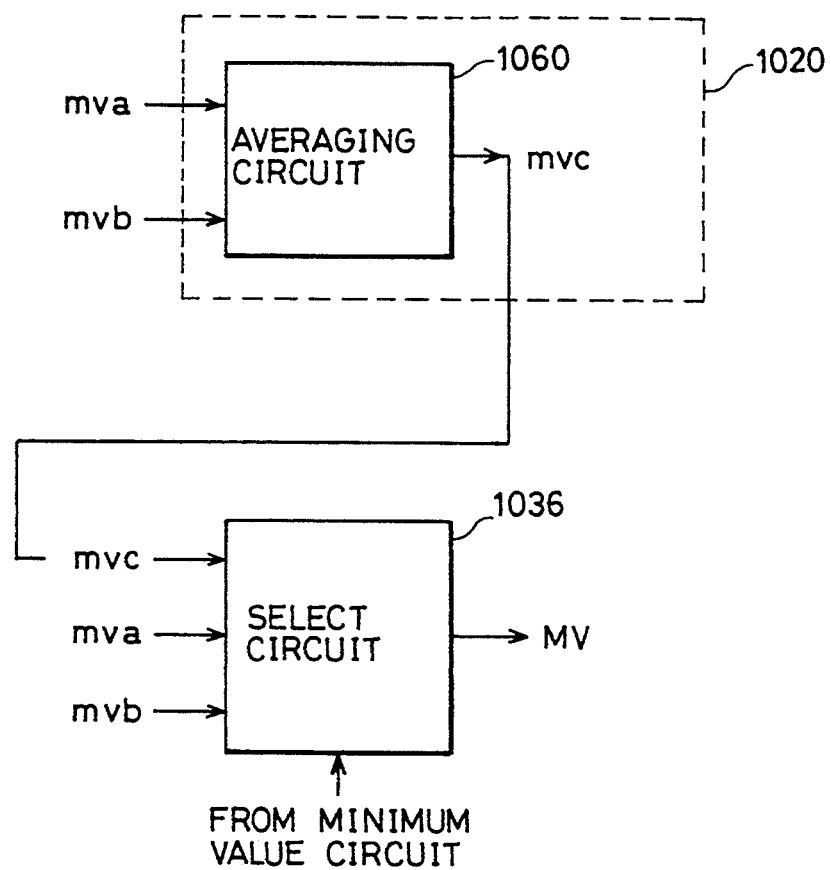
FIG. 86 shows a modification of the interpolation prediction reference picture generation circuit of FIG. 82.

FIG. 86 shows a modification of the interpolation prediction reference picture generating circuit. In addition to the structure shown in FIG. 83, this picture generating circuit 1022 includes an averaging circuit 1060 for obtaining the averages of motion vectors mva and mvb from first and second computing processing circuits. Average circuit 1060 has a structure similar to that of the averaging circuit shown in FIG. 83 obtaining the average value of pixel data. In response to an interpolation prediction reference picture, a motion vector is also interpolated.

Select circuit 1036 selects a motion vector corresponding to the minimum evaluation value obtained by the minimum value circuit out of motion vectors mva, mvb, and mvc. The structure of the select circuit shown in FIG. 86 is implemented by a gate circuit selectively passing out the content of register 1054 shown in FIG. 85 according to the output of comparator 1046.

Figure 87:
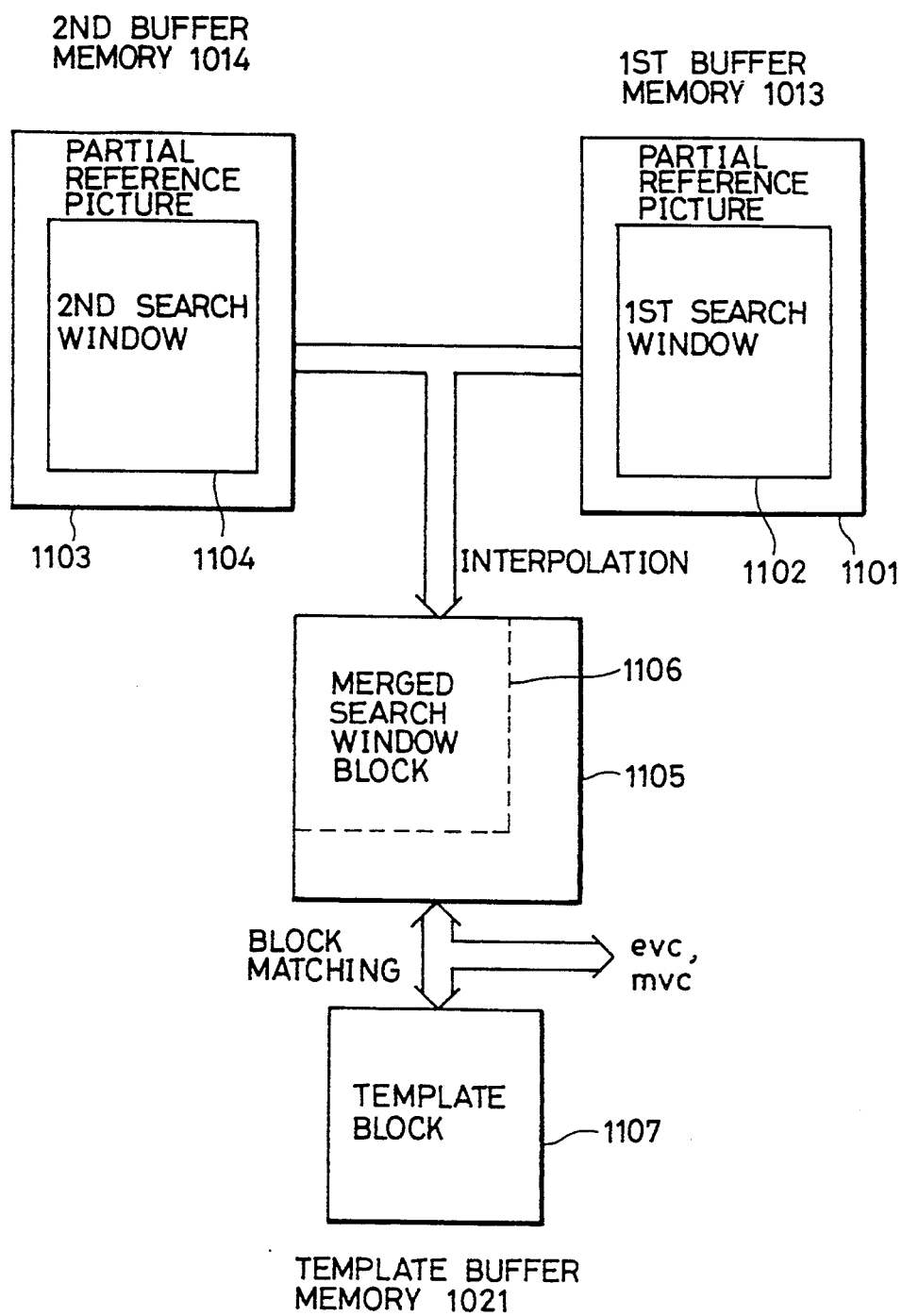
FIG. 87 shows another structure of the interpolation prediction motion detecting unit.

FIG. 87 schematically shows a modification of the fourth embodiment. Referring to FIG. 87, partial reference picture data including first and second search window blocks 1102 and 1104 corresponding to motion vectors mva and mvb are stored in first and second buffer memories 1013 and 1014 shown in FIG. 81. Partial reference picture blocks 1101 and 1103 include first and second search window blocks 1102 and 1104 and peripheral pixels thereof respectively. The structure of storing such partial reference picture blocks 1102 and 1104 in first and second buffer memories 1013 and 1014 can be implemented by using the structure for calculating a motion vector of fractional precision in the third embodiment.

In the interpolation prediction reference picture generating circuit, an averaging process of partial reference pictures 1103 and 1101 are carried out to generate an interpolation prediction reference picture 1105, whereby a motion vector of template block 1107 is obtained with this reference picture 1105 as the search area. In other words, calculation of an evaluation value for each merged search window block 1106 in merged reference picture 1105 is carried out to obtain a motion vector on the basis of the calculated evaluation values.

The method may be carried out wherein data is read out by 1 pixel from each of buffer memories 1013, 1014 and 1021 to be merged for generating a merged search window, and to carry out calculation of an evaluation value. Because access to a frame memory is not required for interpolation prediction, calculation of a motion vector can be carried out in parallel to the calculation of a prediction signal by interpolation prediction. Therefore, interpolation motion compensation can be carried out at high speed. Alternatively, calculation of an evaluation value may be carried out by a processing device including the processor array shown in embodiments 1–3. Template block pixel data are stored in a processor array, and merged (interpolated) pixel data obtained by averaging of the pixel data from first and second buffer memories 1013 and 1014 are dispatched to the processor array. A motion vector and an evaluation value are obtained, whereby an evaluation value evc is compared with the evaluation values eva and evb from first and second processing devices 1003 and 1004 in the determination unit. In response to the calculation result, selection of a motion vector is carried out.

Figure 88:
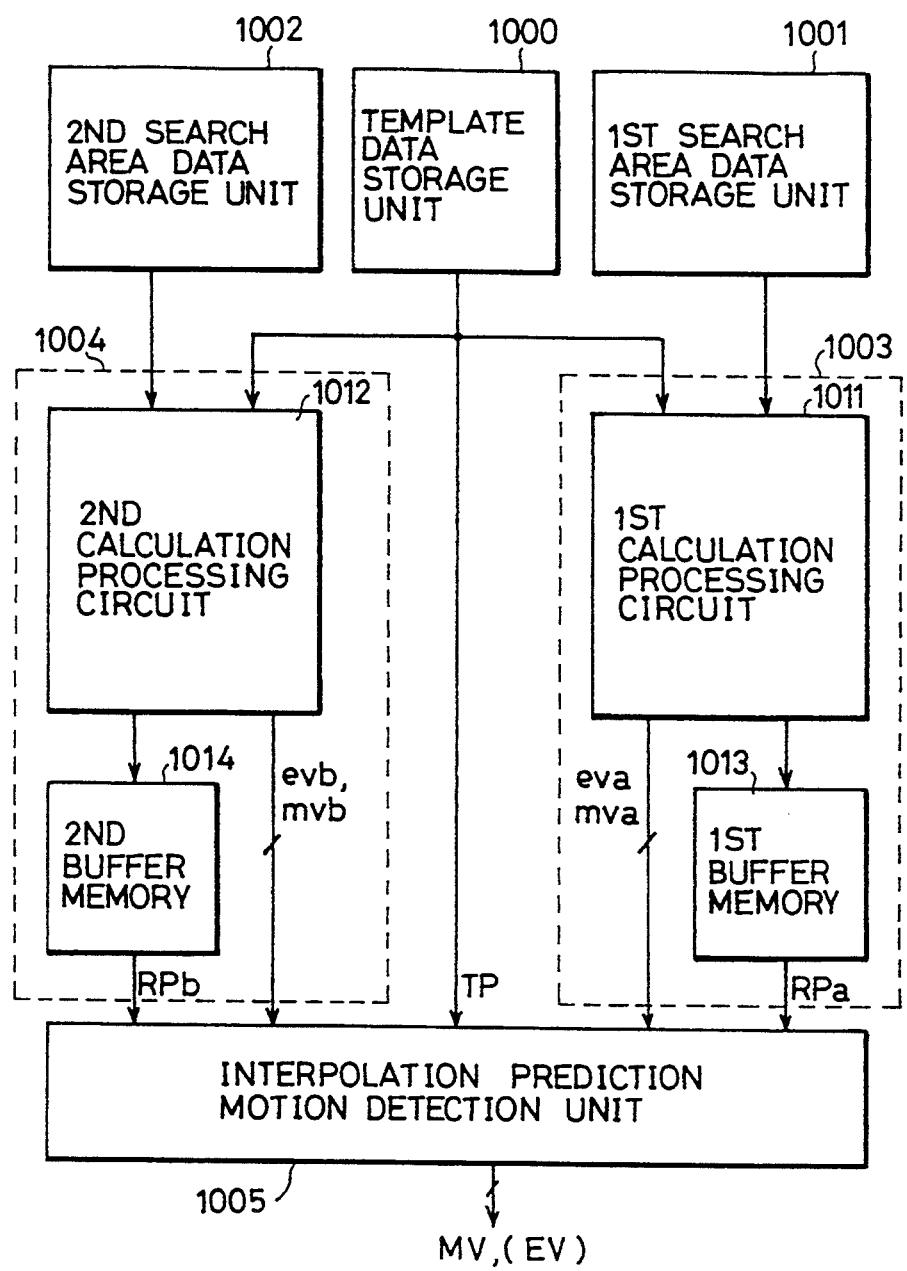
FIG. 88 shows a modification of the motion vector detecting device of the fourth embodiment.

Furthermore, the template block data shown in FIG. 88 which is shifted out from computing processing circuit 1011 or 1012 (computing processing circuit 1011 in FIG. 88) of one way prediction motion detecting unit 1003 or 1004 may be applied to interpolation prediction motion detecting unit 1005. In this case, one way prediction motion detection and interpolation prediction motion detection can be carried out in a pipeline manner as shown in FIG. 89.

Figure 89:
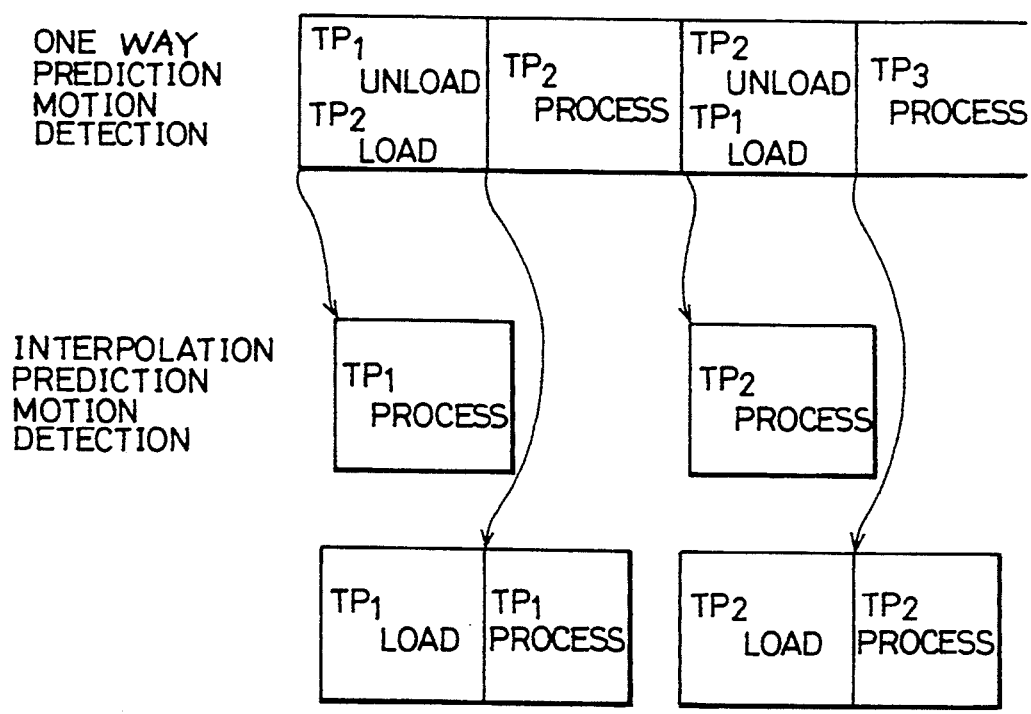
FIG. 89 shows the data processing manner in the motion vector detecting device of the fourth embodiment.

In FIG. 89, interpolation prediction motion detection (i) is carried out parallel to the unload (shift out) of template block TP (TP1, TP2) used in one way prediction motion detection. First and second buffer memories 1013 and 1014 have the required search window block data stored. By reading out data in synchronization with the shift out of the template block pixel data from buffer memories 1013 and 1014, this pipeline operation can be realized. In this operation, buffer memories 1013 and 1014 have search window block data stored therein, and correspond to a state where the peripheral pixel data are not stored. In this structure, the buffer memory provided in interpolation prediction motion detection unit 1005 is substituted with a buffer for adjusting the timing.

In the interpolation prediction motion detection (ii) of FIG. 89, interpolation prediction motion detection is carried out in parallel to the process of the template block in one way prediction motion detection. The template block data are stored in the buffer memory to be subjected to the processing. In unloading template block TP, the template block pixel data unloaded (shifted out) from one way prediction motion detecting unit 1003 is loaded to the buffer memory of the interpolation prediction motion detecting unit. The process can be carried out at high speed even when the partial reference picture for interpolation prediction includes the peripheral pixels of the search window block.

Figure 90:
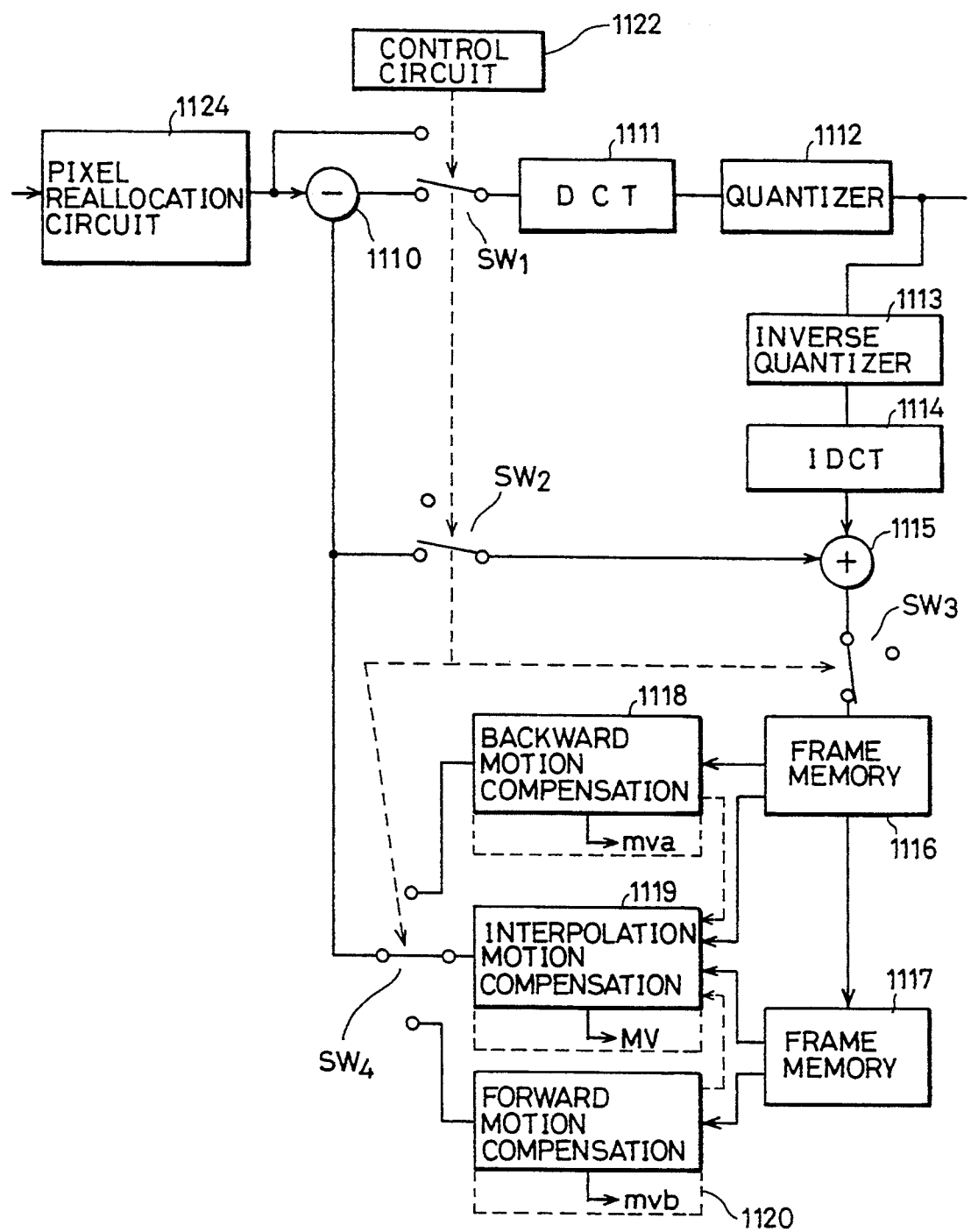
FIG. 90 shows an example of an application of the motion vector detecting device of the fourth embodiment.
Figure 93:
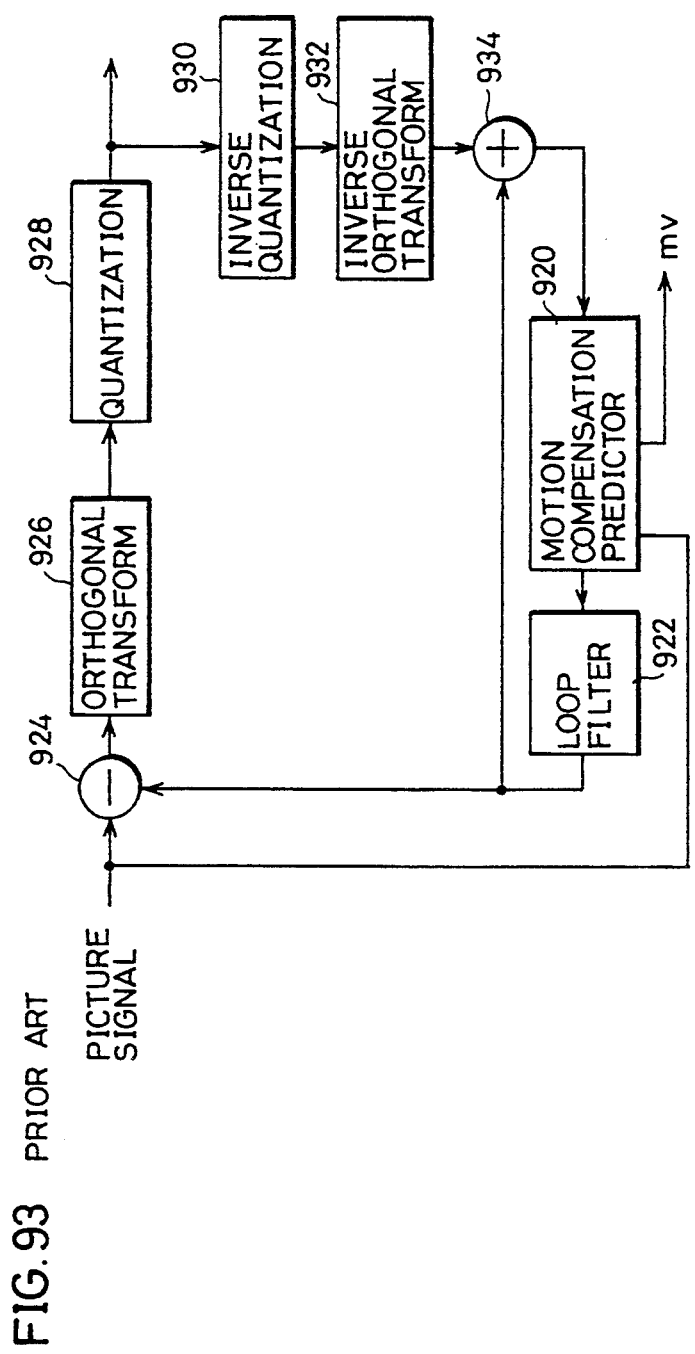
FIG. 93 shows a structure of a source coding circuit shown in FIG. 92.
Figure 94A:
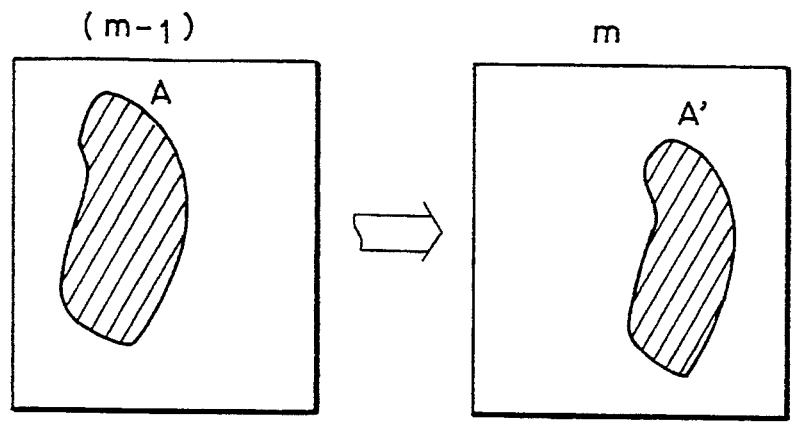
FIGS. 94A and 94B are diagrams for describing operation of the motion compensation of a picture.
Figure 94B:
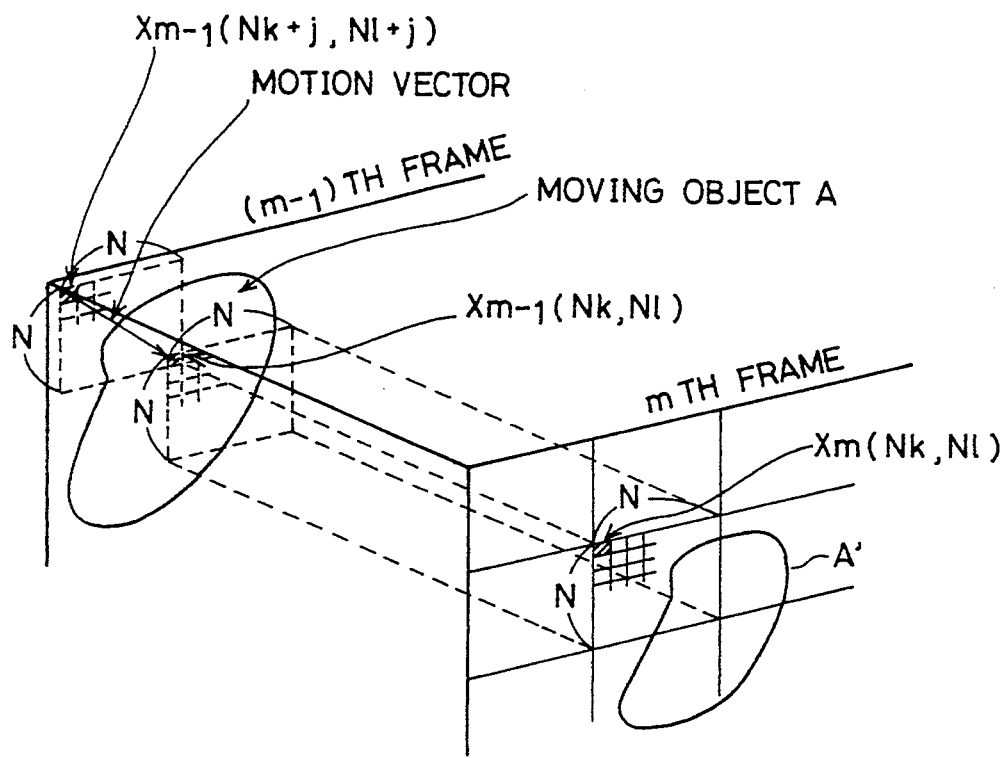
Figure 95:
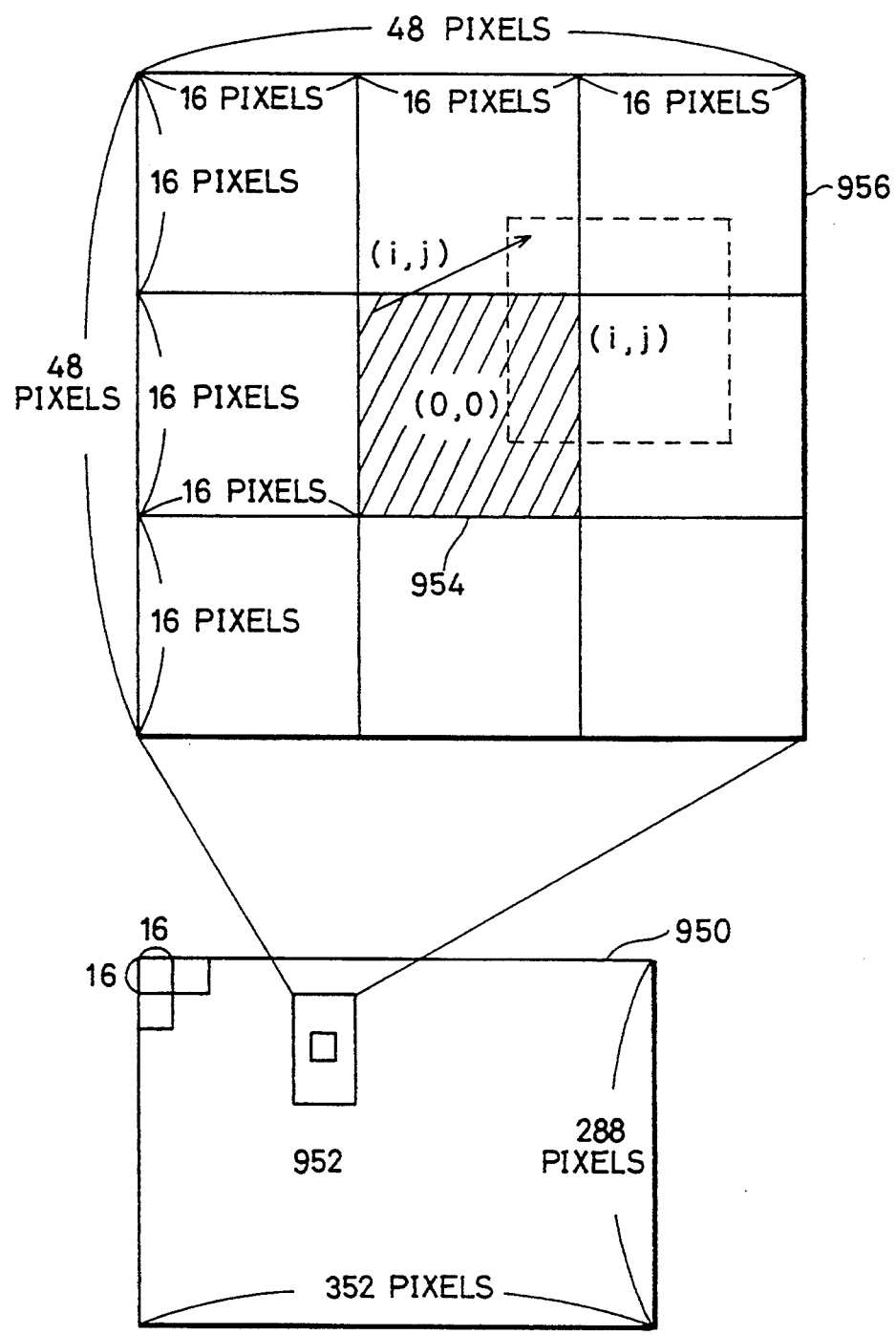
FIG. 95 shows the search area and template block arrangement in motion compensation according to the block matching method and the relation of a motion vector.
Figure 96:
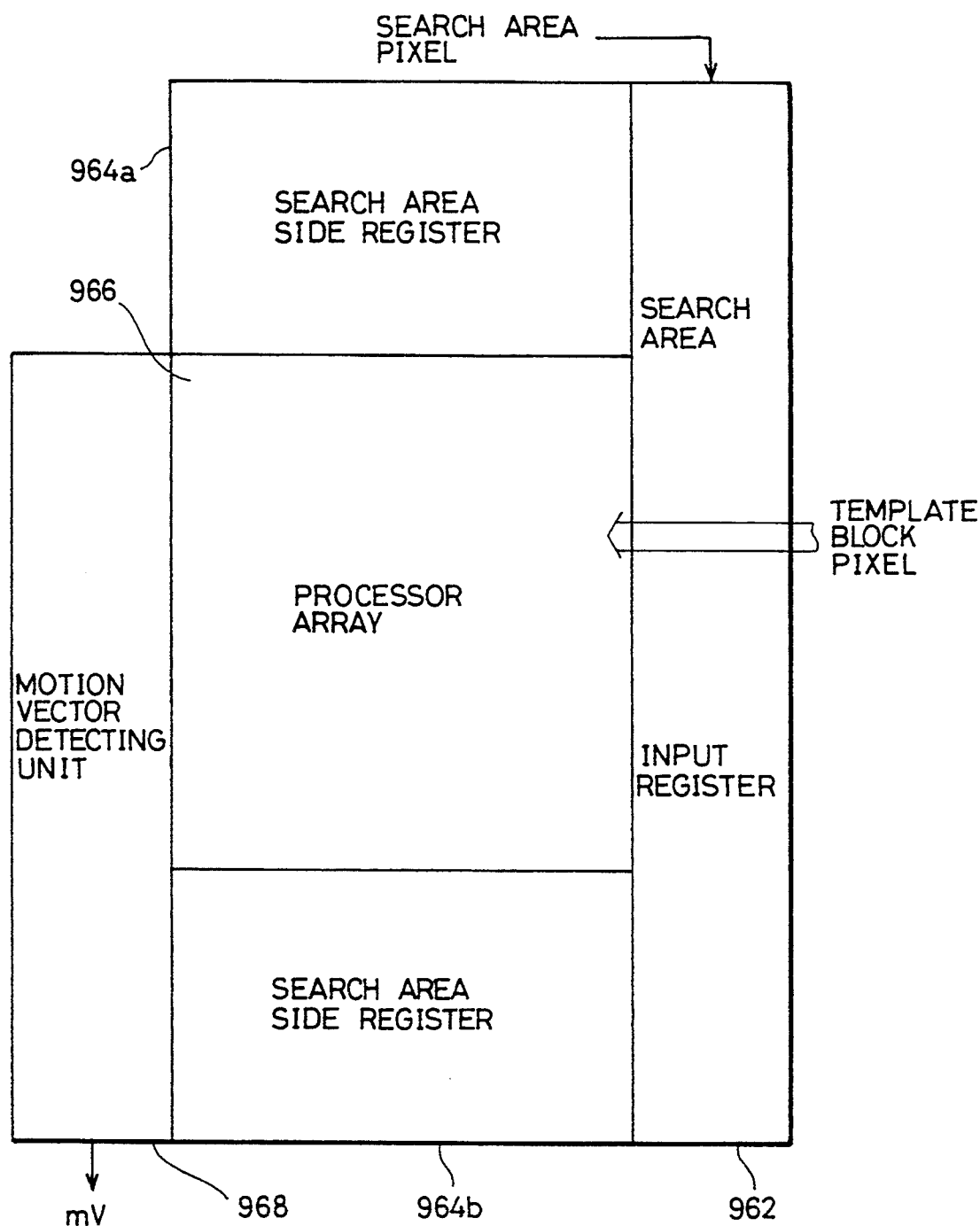
FIG. 96 shows a structure of a conventional motion vector detecting device.
Figure 97:
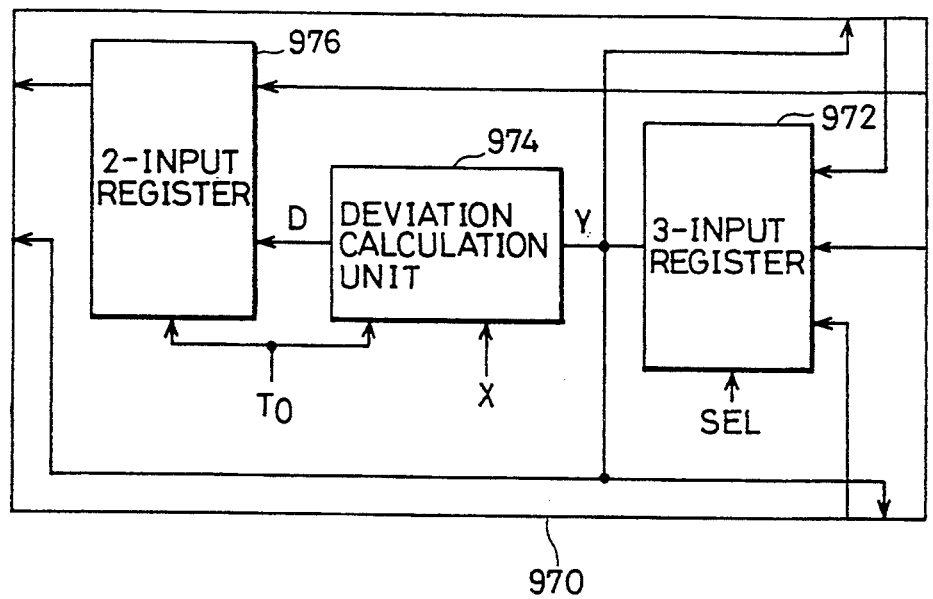
FIG. 97 shows a structure of the element processor included in the processor array of FIG. 96.
Figure 98:
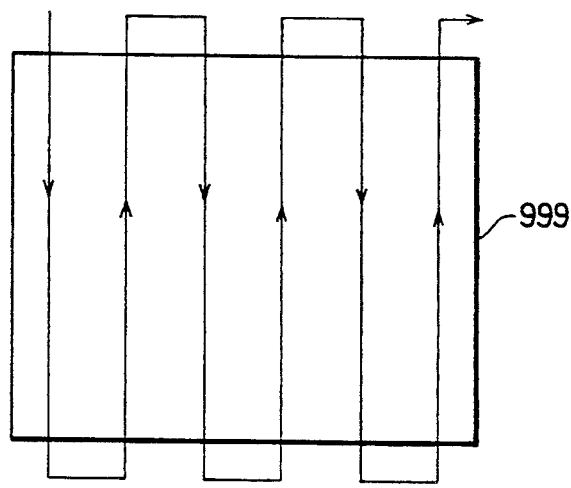
FIG. 98 shows the scanning of the template block in the motion vector detecting device shown in FIG. 96 and the scanning method of the search window.
Figure 99:
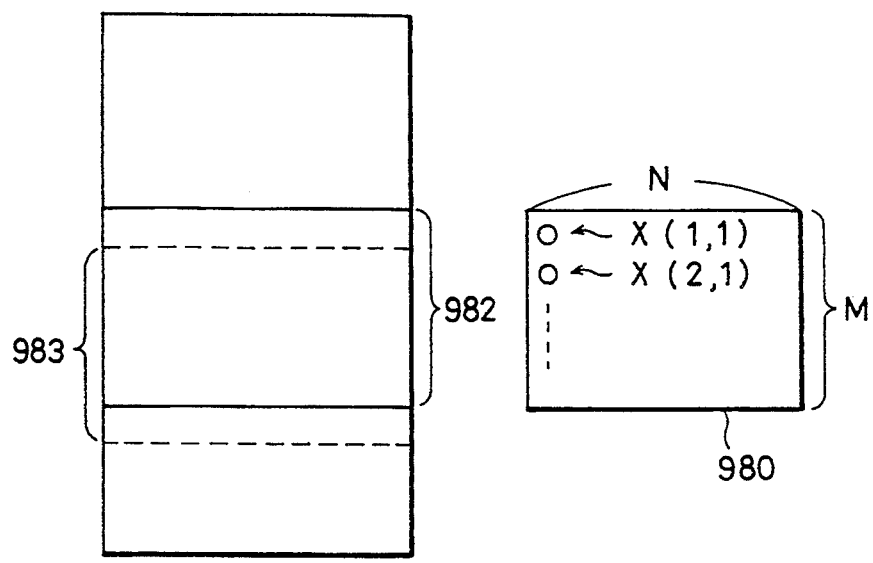
FIG. 99 shows operation of the motion vector detecting device of FIG. 96.
Figure 100:
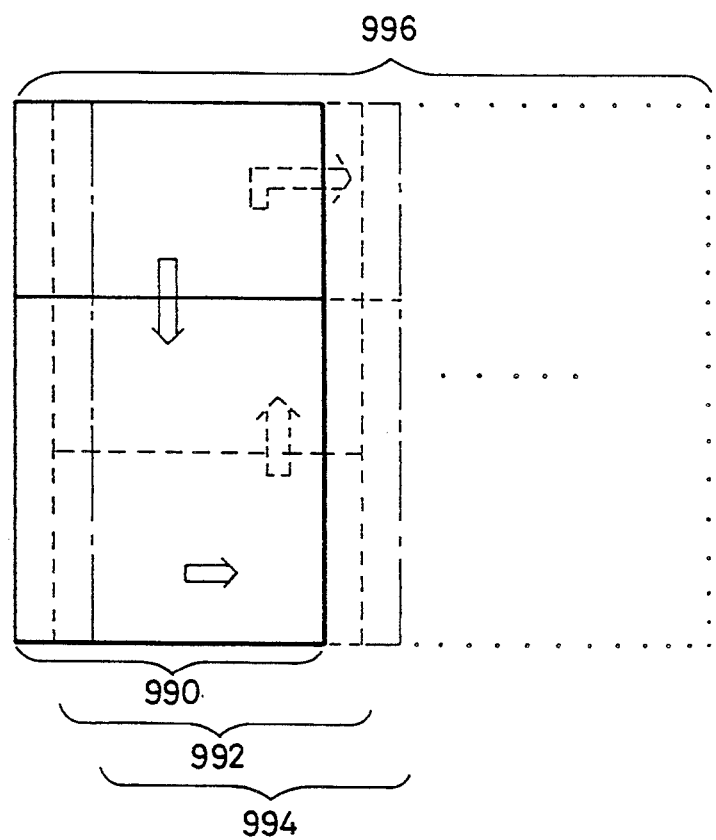
FIG. 100 is a diagram for describing the operation of a conventional motion vector detecting device.
Figure 101:
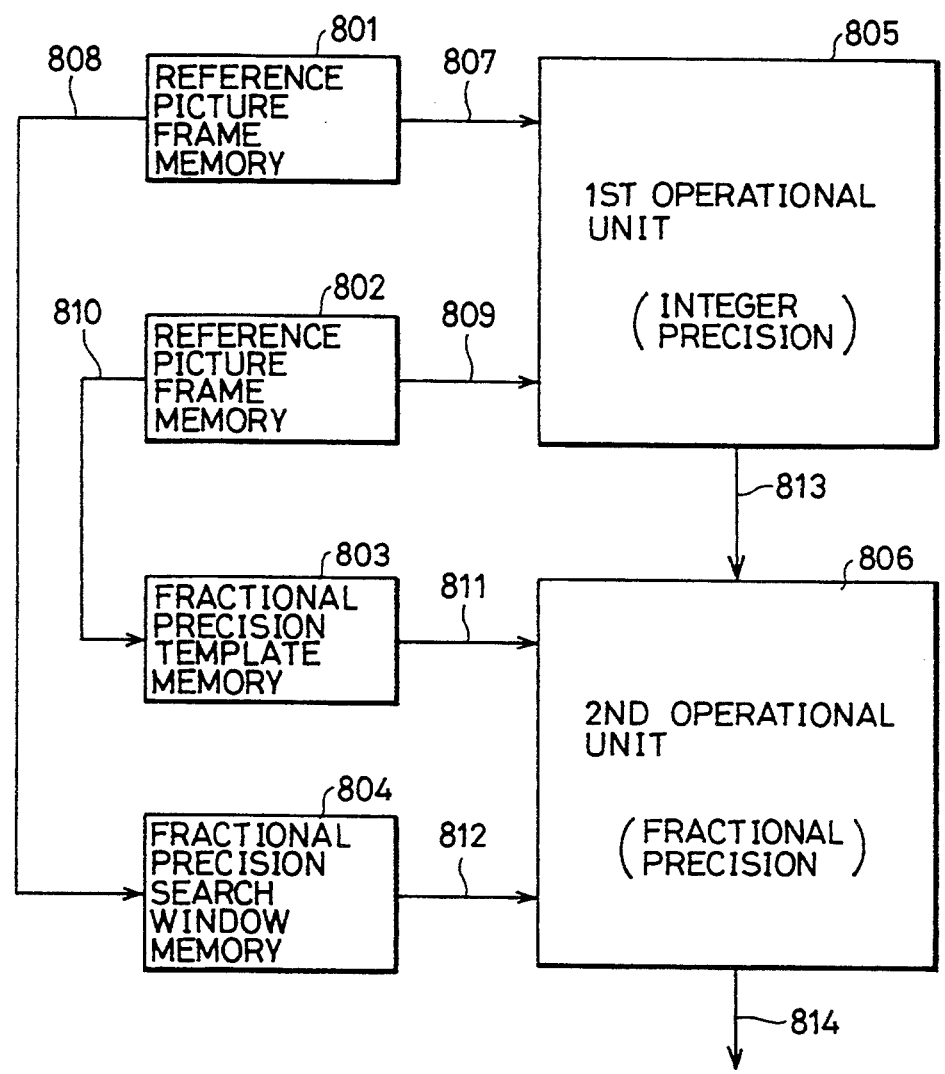
FIG. 101 shows another structure of a conventional motion vector detecting device.
Figure 102:
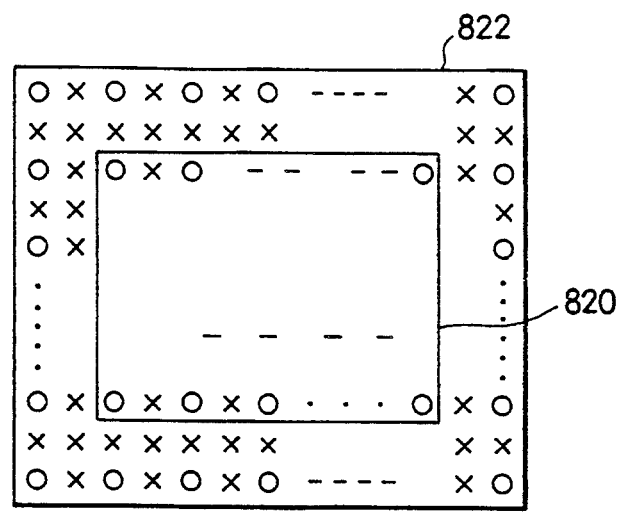
FIG. 102 is a diagram for describing the method of generating a motion vector in fractional precision.
Figure 103:
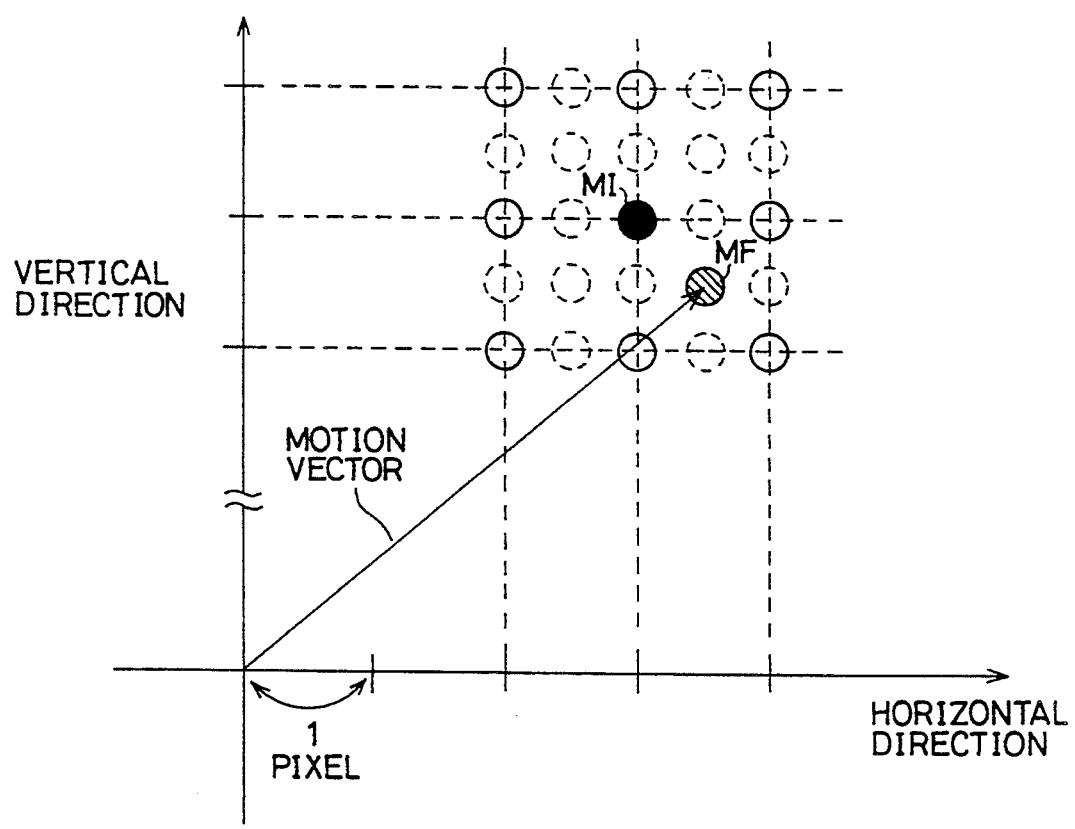
FIG. 103 is a diagram for describing motion vector in fractional precision.

FIG. 90 shows a structure of a device using the motion vector obtained in the fourth embodiment. More specifically, FIG. 90 shows the structure of a source coding circuit used in the coding of a motion picture. Referring to FIG. 90, a source coding circuit has a structure similar to that shown in FIG. 93, and includes a subtractor 1110, an orthogonal transformer (DCT) 1111, a quantization device 1112, an inverse quantization device 1113, an inverse orthogonal transformer (IDCT) 1114, and an adder 1115. The functions of these components are similar to those of FIG. 93.

The source coding circuit further includes a frame memory 1116 for receiving and storing the output of adder 1115 via a switch SW3, a frame memory 1117 for receiving and storing the stored data in frame memory 1116, an inverse direction motion compensation circuit 1118 for carrying out backward motion compensation using the data stored in frame memory 1116, a forward direction motion compensation circuit 1120 for carrying out a forward motion compensation using the data stored in frame memory 1117, and an interpolation motion compensation circuit 1119 for carrying out interpolation motion compensation using the data stored in frame memories 1116 and 1117.

Backward motion compensation circuit 1118 takes the future frame stored in frame memory 1116 as the reference picture to generate an estimation signal according to a motion vector, for example, mva.

Forward motion compensation circuit 1120 takes the past frame stored in frame memory 1117 as the reference frame to generate an estimation signal according to a motion vector, for example, mvb.

Interpolation motion compensation circuit 1119 merges the picture data read out from frame memories 1116 and 1117 or supplied from the compensation circuits 1118 and 1120 to generate a reference frame picture for generating an estimation signal according to a motion vector MV.

The outputs of motion compensation circuits 1118–1120 are provided to subtractor 1110 via a switch SW4. Subtractor 1110 also receives the output of pixel reallocation circuit 1124. Either the output of subtractor 1110 or reallocation circuit 1124 is selected by a switch SW1 to be provided to orthogonal transformer 1111. The output of switch SW4 is provided to adder 1115 a via switch SW2. The selection of the terminals of switches SW1-SW4 is carried out by a control circuit 1122.

Pixel reallocation circuit 1124 is provided because it is necessary to differentiate the order of the frames processed for bidirectional prediction, i.e. interpolation prediction from the frame order of the original picture.

In the device shown in the drawing, a picture generally includes an I picture by which only inter-frame coding is carried out, a P picture by which one-way prediction (interframe prediction) coding is carried out, and a B picture by which interpolation prediction is carried out. In coding, the I picture and then the P picture are processed prior to the B picture in the picture frame sequence, followed by the process of the B picture using the past and future pictures of I and P. This sequence procedure is realized by pixel reallocation circuit 1124, and switches SW1–SW4 select the signal path according to the picture to be processed. Switch SW1 selects the output of pixel reallocation circuit 1124 at the time of the process of the I picture. Here, switches SW2 and SW3 are open. The compensation circuits 1118 and 1120 may be shared by the interpolation compensation circuit 1119 as shown by dotted lines, where the circuit 1119 includes the detector 1105 and buffers 1013 and 1014. This arrangement reduces the device size due to sharing of processor array.

In comparison with the source coding circuit of FIG. 90, the structure of the fourth embodiment allows generation of motion vectors mva, mvb and MV with a common processor array. High speed picture processing is allowed because the number of times of access to frame memories 1116 and 1117 for motion vector detection is reduced. This is because the search window block (partial reference picture) is generated together with the detected motion vector. Pixel data of this partial reference picture can be used as the estimation signal.

Figure 91:
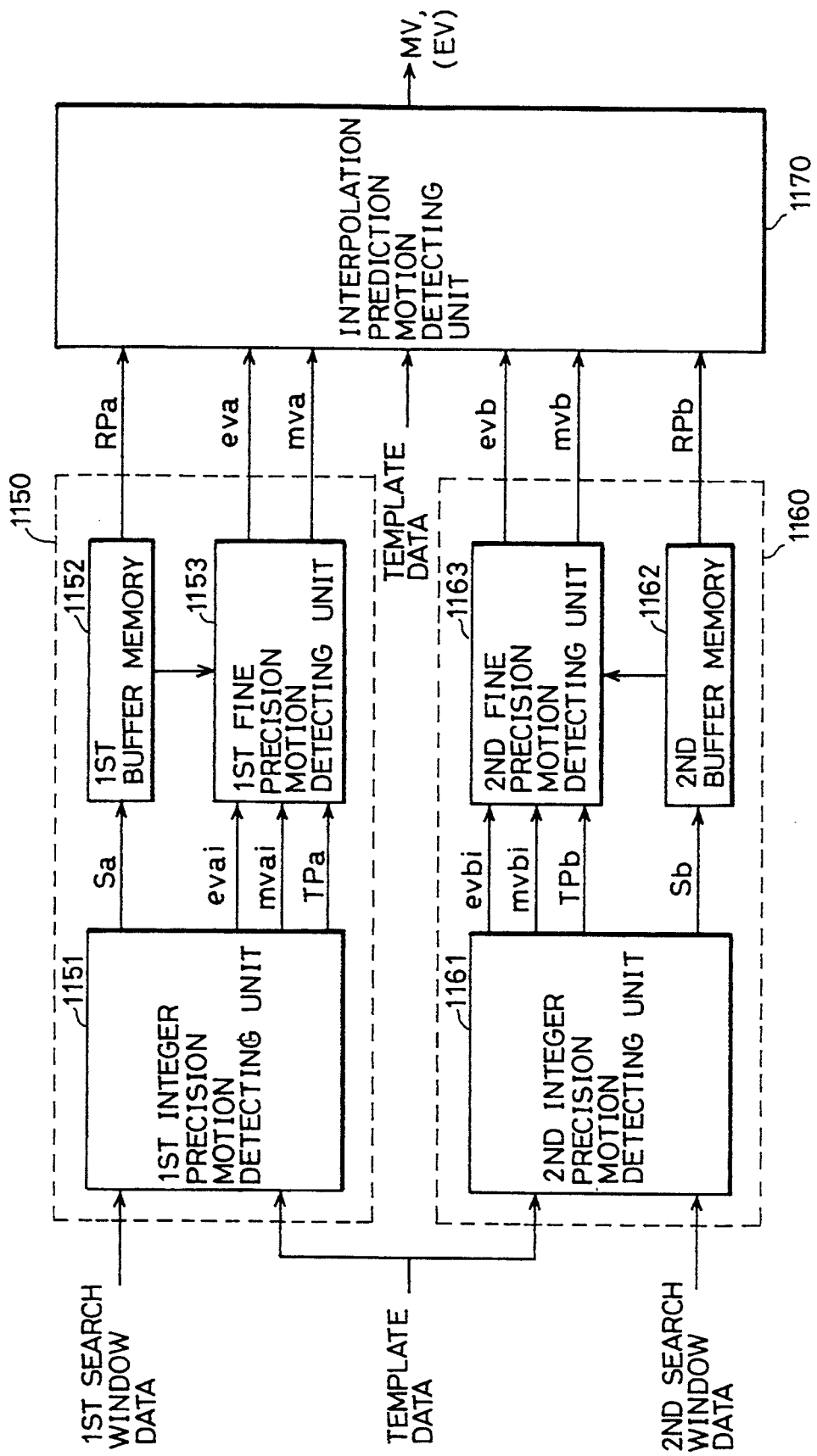
FIG. 91 shows another structure of the motion vector detecting device of the fourth embodiment.
Figure 92:
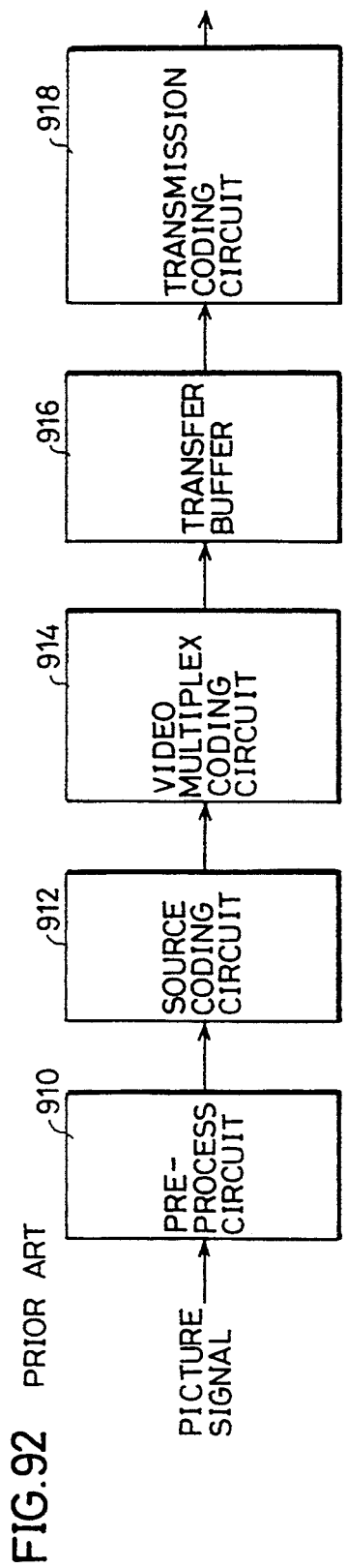
FIG. 92 shows a structure of a conventional image signal coding circuit.

FIG. 91 shows another structure of the fourth embodiment. Referring to FIG. 91, the motion vector detecting device includes a first one way prediction motion detecting unit 1150, a second one way prediction motion detecting unit 1160, and an interpolation prediction motion detecting unit 1170.

First one way motion detecting unit 1150 includes a first integer precision motion detecting unit 1151 to receive first search window data and template data for obtaining a motion vector in integer precision by a block matching process and a corresponding evaluation value, a first buffer memory 1152 for storing search window data Sa from first integer precision motion detecting unit 1151, and a first fine precision motion detecting unit 1153 to receive a motion vector mvai, evaluation value evai, and template block data TPa provided from motion detection unit 1151 to obtain a motion vector mva in fractional precision (fine precision) and an evaluation value.

First buffer memory 1152 stores search window block corresponding to a motion vector of integer precision mvai and pixel data of an area including the peripheral pixel. First fine precision motion detecting unit 1153 generates a motion vector in fine precision mva and a corresponding evaluation value eva using template block data TPa and the pixel data of first buffer memory 1152. The structure and operation of first one way prediction motion detecting unit 1150 are similar to those of embodiment 2 shown in FIGS. 51–64.

Second one way prediction motion detecting unit 1160 has a structure similar to that of first one way prediction motion detecting unit 1150, and includes a second integer precision motion detecting unit 1161 for receiving second search window data and template data, second buffer memory 1162 for storing search window data Sb from detection unit 1161, and a second fine precision motion detecting unit 1163 for receiving template block data TPb from detecting unit 1161 and search window data from second buffer memory 1162 for obtaining a motion vector in fine precision mvb and a corresponding evaluation value evb. The operation of second one way prediction motion detecting unit 1160 is similar to that of the second embodiment.

Interpolation prediction motion detecting unit 1170 receives motion vectors of fine precision mva and mvb, evaluation values eva and evb, and partial reference pictures RPa and RPb from first and second one way motion detecting units 1150 and 1160, respectively for detecting an optimum motion vector MV for the template block. A corresponding evaluation value EV may be provided to motion vector MV. The structure of interpolation prediction motion detecting unit 1170 in block level is similar to that shown in FIG. 82. The operation for detecting a motion vector in fine precision differs. The operation will be briefly described hereinafter with reference to FIG. 82.

In interpolation prediction reference picture generation circuit 1020, an interpolation reference picture RPc is generated from partial reference picture data RPa and RPb. This operation is equal to that in integer precision. Interpolation prediction motion vector detection operational unit 1022 obtains a motion vector in fine precision mvc and a corresponding evaluation value evc from template block pixel data from buffer memory 1021 and interpolation reference picture from circuit 1020. In order to carry out detection in fine precision, detection operational unit 1022 has, for example the structure shown in FIG. 60, for example.

Motion vector determination circuit 1024 obtains the minimum value of evaluation values eva, evb, and evc to select and output a motion vector corresponding to the minimum evaluation value. The minimum evaluation value EV may be provided together. Simultaneously to the detection of motion vector MV, partial reference pictures stored in buffer memories 1152 and 1162 are read out to generate a reference picture of an area according to motion vector MV to generate an estimation value.

Buffer memories 1152 and 1162 used for detecting a one way prediction motion vector in fine precision can be used for detecting an interpolation prediction motion vector. Therefore, detection of an interpolation prediction motion in fine precision can be carried out at high speed without increasing the number of access to the frame memory and the device complexity.

Similar to the interpolation motion detection in integer precision, the template block data may be provided from one way prediction motion detection 1150 or 1160 to detecting unit 1170. In this case, detection of a motion vector in integer precision, a motion vector in fine precision., and a motion vector in interpolation prediction can be carried out in a pipeline manner.

For the structure of interpolation prediction motion detection in fine precision, the modification described for interpolation prediction motion vector detection in integer precision is applicable.

According to the present invention, element processors are arranged in a two-dimensional array, and template block data resides in the processor array to calculate an evaluation value required for detecting a motion vector. It is therefore possible to detect a motion vector with a small circuit complexity and low power consumption.

Because the element processors are arranged in an array, and search window data and template block data are shifted in a one-way direction in this array, data required for detecting a motion vector in fractional precision can be processed using the data used for detecting a motion vector in integer precision to allow detection of a motion vector in fraction precision at high speed.

Other characterizing effects of the present invention are summarized as follows.

(1) Element processors that can store search window data and template data are arranged in a two-dimensional array, wherein data is transferred only in a one-way direction in the two dimensional array. Therefore, the circuit complexity required for data transfer is reduced, and a motion vector detecting device of small occupying area and that operates in low power consumption can be obtained.

(2) The search window data and template block data used for detection of a motion vector in integer precision are directly used for detection of a motion vector in fractional precision without the means of a frame memory. Therefore, the number of access to a frame memory is reduced, and a motion vector in fractional precision can be detected at high speed.

(3) The element processors can store a plurality of search window data and/or a plurality of template block data to reduce the occupying area of the processor array. Therefore a motion vector detecting device of a small occupying area is obtained. Because the number of element processors is reduced, the component elements of the calculation circuit system required for calculation of an evaluation value such as an absolute difference can accordingly be reduced to obtain a motion vector detecting device of low power consumption.

(4) Because the computing means for calculating an evaluation value of a motion vector is provided in the combination of a sign bit and magnitude bits, an incrementer for representing a negative number in 2's complement is not required. Therefore, an element processor of small occupying area can be obtained. Accordingly, the power consumption that was required for the incrementer can be reduced.

(5) The summation circuit for generating an evaluation value can be formed by full adder circuits arranged in a tree manner. Because a sign bit is applied to the least significant bit in the full adder circuit stage, a summation circuit that operates at a high speed and with small occupying area can be obtained. Therefore, a motion vector can be detected at high speed.

(6) The pixel data of a search window is stored in the processor array, and the template block data resides in the processor array. Therefore, a motion vector detecting device that operates at low power consumption and with small occupying area can be obtained.

(7) Because the search window data is transferred along a one-way direction in the processor array, data not required in generating an evaluation value is shifted out from the processor array and the next required search window data is shifted into the processor array. Therefore, search window data can be stored effectively into the processor array, and a motion vector detecting device of small occupying area and that operates at high speed and in low power consumption can be obtained.

(8) The transfer direction of the template block data is orthogonal to the transfer direction of the search window data in the processor array. Because the template block data is arranged in the frame memory according to raster scan, data can be stored in the processor array commensurating with the storage manner of the template block data. Therefore, template data can be loaded at high speed into the processor array.

(9) In the processor array, the transfer direction of the search window data is parallel to the transfer direction of the template block data. As a result, the wiring occupying area required for transmission of both data can be reduced to realize a processor array in a small occupying area.

(10) Because calculation is carried out at N times the transfer speed of search window data, a motion vector evaluation value can be generated effectively.

(11) The template block data required for generating an evaluation value can be subsampled to allow detection of a motion vector in precision with respect to picture data of a high speed frame rate. In this case, the number of required element processors is accordingly reduced to reduce the occupying area of the processor array.

(12) Data of two template blocks are stored in each element processor, whereby generation of an evaluation value for the two template blocks can be carried out using the same search window block data.. Therefore, access to a frame memory can be carried out effectively for reading out search window data, allowing detection of a motion vector at high speed.

(13) Evaluation of a motion vector is carried out simultaneously for two template blocks, and the number of access to the frame memory for reading out a search window data can be reduced significantly. Therefore, a motion vector can be detected effectively and at high speed.

(14) When there are a plurality of motion vectors giving the minimum value of an evaluation function, priority is given to one having a smaller sum of the absolute values of the motion vector components. Therefore, a motion vector detecting device can be formed that realizes an image compression process effectively. Furthermore, because generation of the priority order can be realized just from the increment or decrement process of a unit amount, a motion vector detecting device can be realized in a smaller circuit complexity suitable for an integrated circuit.

(15) The number of access to the frame memory for detection of an interpolation prediction motion vector is reduced, and interpolation prediction motion vector detection can be carried out at high speed.

(16) Because the buffer memory for detecting a fine precision one way prediction motion vector is used for detection of an interpolation prediction motion vector in fine precision, the complexity of the device is hardly increased.

(17) Because all the required data from the one way prediction motion vector detecting unit is transferred to the interpolation prediction motion detecting unit, the process can be carried out in a pipeline manner to allow high speed processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for detecting a motion vector according to a block matching processing on a current frame picture and a reference frame picture, comprising:

a plurality of processing elements each including first storage means for storing pixel data of a block of the current frame picture, second storage means for storing pixel data of a block in a search area related to the block in the reference frame picture, and calculation means for performing a predetermined calculation on data stored in the first and second storage means, said second storage elements being coupled in series to transfer data in a one way direction;

estimation value producing means responsive to outputs of the calculation means in the processing elements, for producing an estimation value data indicating a correlationship between the current frame picture and reference frame picture blocks; and determination means responsive to the estimation value data from the estimation value producing means, for determining a motion vector for current frame picture block.

2. A device according to claim 1, further including:

additional processing means coupled to receive at least one of the reference frame picture data and the current frame picture data from the processing elements, for calculating another motion vector on the block of the current frame picture, said determination means providing a motion vector in an integer precision, and said another motion vector providing a fractional precision motion vector.

3. A device according to claim 1, wherein each of said first storage element stores different pixel data of the current frame picture block, and each of said second storage means stores different pixel data of the reference frame picture block, and wherein each said processor element further includes shift means for transferring one pixel data of the second storage means while maintaining pixel data in said first storage means for each producing of the estimation value.

4. A device according to claim 1, wherein said first storage means includes a first storage element for storing a first template block in the current frame picture and a second storage element for storing a second template block data in the current frame picture, and each said processing element includes selection means for selecting alternatingly the first template block data and the second template block data for transfer to the calculation means, so that the calculation means performs the predetermined calculation both on data of the first template block and the reference frame picture block and on data of the second template block and the reference frame picture block.

5. A device according to claim 1, wherein said calculation means includes:

subtracting means for performing a subtraction of a stored pixel data of the block of the current frame picture and a stored pixel data of the search area block to produce a sign bit indicating a sign of the subtraction result and magnitude bits indicating a magnitude of the subtraction result, and gate means for performing a module 2 addition of the sign bit and each said magnitude bit to produce an absolute difference of the subtraction.

6. A device according to claim 5, wherein said estimation value producing means includes summation means for obtaining a sum of the outputs of the calculation means, and said summation means includes a plurality of stages of full adders connected in a tree-like arrangement such that an output of a full adder in a stage is supplied to an input of a full adder in a subsequent stage, and the sign bit from the subtraction means is supplied to a carry input of a full adder of the least significant bit in each said stage.

7. A device according to claim 1, wherein said determination means includes first register means for storing a minimum estimation value data, comparison means for comparing a current estimation value data received from the estimation value producing means with the minimum estimation value data, generation means for generating a displacement vector indicating a displacement between the first block and the second block in a vector notation having a horizontal component and a vertical component, second register means for storing a displacement vector as a candidate for the motion vector, priority means responsive to the comparison means detecting that a current estimation value data is equal in value to the minimum estimation value data, for determining which of the two estimation value data is high in priority, said priority means including means for determining that an estimation value data having an associated displacement vector of which a sum of the absolute values of the horizontal and vertical components is smaller is high in priority, and update means responsive to the comparison means for updating the minimum estimation value data with the current estimation value data and for updating a content of the second register means with an output of the generation means.

8. A device according to claim 7, wherein said priority means includes third register means for holding a priority data for the current estimation value data, priority updating means for updating the priority data in the third register means by a predetermined value for each generation of the displacement vector, fourth register means for storing a priority data associated with the minimum estimation value data in the first register means, and compare means for comparing the priority data in the third register means and the priority data in the fourth register means, and said update means updates the data in the fourth register means with the data in the third register means in response to the compare means.

9. A device according to claim 1, wherein said processor elements are arranged in an array, and said array shift outs a reference frame picture block data at each producing of the estimation value, and also shifts out the current frame picture block data, and wherein said device further includes:

buffer storage means responsive to said determination means for storing data of a block of the reference frame picture related to the determined motion vector; and additional processing means receiving the current frame picture block data from said array and the data from the buffer storage means for performing a block matching processing to determine another motion vector of another precision.

10. A device according to claim 9, further including another buffer storage provided between said array and said additional processing means for storing data of the current frame picture block.

11. A device according to claim 9, wherein said buffer storage stores a search block including a reference frame picture block related to the motion vector and peripheral pixel data thereof, and said additional processing element obtains a motion vector of a fractional precision and said determination means obtains a motion vector of an integer precision.

12. A device according to claim 1, wherein said plurality of processor elements, said estimation value producing means and determination means constitute a first processing structure for receiving data of a first reference frame picture, and wherein said device further includes:

a second processing structure having the same structure as the first processing structure for receiving data of a second reference frame picture, said first and second processing structure receiving the same current frame picture block data with each other;

first storage receiving and storing data of a block of the first reference frame picture related to the first motion vector determined by the first processing structure;

second storage receiving and storing data of a block of the second reference frame picture from said second processing structure;

interpolating means for receiving data from said first and second storage for producing data of a third reference frame picture block through interpolation of received data;

motion vector detecting means responsive to said current frame picture block data and said third reference frame block data for producing an evaluation value indicating correlationship between said current frame picture block and said third reference frame block; and decision means responsive to estimation values associated with motion vectors received from said first and second structures and the evaluation value from said motion vector detecting means, for producing a final motion vector.

13. A device according to claim 12, wherein said decision means includes means for finding out a minimum value among the estimation values and the evaluation value and selecting a motion vector corresponding to the minimum value as the final motion vector.

14. A device according to claim 12, wherein said motion vector detecting means includes means for detecting a motion vector of the current frame picture block for the third reference frame block through the block matching processing.

15. A device according to claim 12, wherein said motion vector detecting means receives said current frame picture block data through one of said first and second processing structure.

16. A device according to claim 12, further including third processing means receiving the current frame picture block data from said first processing structure and a first reference frame picture data from said first storage for obtaining a motion vector and an estimation value of the current frame picture block for the first reference frame picture to supply the obtained motion vector data and estimation value data to said decision means; and fourth processing means receiving the current frame picture data from said second processing structure and the second reference frame picture data from said second storage for obtaining a motion vector and estimation value of the current frame picture block for the second reference frame picture to supply the obtained motion vector data and estimation value data to said decision means.

17. A device according to claim 1, wherein said first storage means includes means for storing M pixel data corresponding to M different pixels in the block of the current frame picture, and said second storage means includes means for storing N pixel data corresponding to N different pixels in the block of the reference frame picture where M and N each are an integer and N is greater than or equal to M.

18. A device according to claim 17, wherein said processing element further includes means for subsampling the outputs of the calculation means.

19. A device according to claim 17, wherein said M is 1 and said N is 2, and said calculation means operates to calculate at the same rate as a rate at which a pixel data of the reframe picture is transferred through the processing elements.

20. A device according to claim 17, wherein said calculation means is operable to perform the calculation at a first rate the N time higher than a rate at which the reference frame picture block data is transferred.

21. A device according to claim 20, wherein each said processing element includes selection means for selecting sequentially a set of a data in the first storage means and a data in the second storage means at the first rate.

22. A device according to claim 17, wherein said calculation means is operable to perform the calculation at a first rate the M times higher than a rate at which the reference frame picture block data is transferred.

23. A device according to claim 22, wherein each said processing element includes selector means for selecting sequentially a set of a data in the first storage means and a data in the second storage means at the first rate.

24. A device according to claim 17, wherein said block of the current frame picture includes pixels arranged in Q rows and P columns with P and Q each being an integer, and said processing elements arranged in P linear arrays corresponding to the P columns, and each said linear array includes Q/M cascaded processing elements and third storage means for storing R different data in the search area including the block of the reference frame picture, and the sum of said R and Q is equal to the number of pixels arranged on a column of said search area.

25. A device according to claim 24, wherein
each said third storage means includes means for receiving a search area data through a processing element in a preceding column and for transferring data of the search area to a processing element in a corresponding column.

26. A device according to claim 24, wherein said processor element is operable to transfer data of the block of the current frame picture and data of the block of the reference frame picture in directions orthogonal to each other.

27. A device according to claim 24, wherein said processor element is operable to transfer data of the block of the current frame picture and data of the block of the reference frame picture in the same direction with each other and to transfer the current frame picture block data to a processing element in an adjacent column through none of the third storage means.

28. A device according to claim 17, wherein each said processing element further includes selection means for selecting a pixel data from said first storage means and a corresponding pixel data from said second storage means to supply the selected pixel data to said calculation means.

29. A device according to claim 28, wherein said N is greater than said M, and said selection means selects all the pixel data in said first storage means, and said calculation means performs said predetermined calculation in synchronization with said selection means.

30. A device according to claim 28, wherein said M is equal to said N, and said selection means selects all the pixel data in said first storage means at a first rate M times faster than a rate at which a pixel data of the reference frame picture is transferred through the processing elements.

31. A device according to claim 30, wherein said calculation means operates at said first rate.

32. A device according to claim 30, wherein said calculation means operates at a second rate slower than said first rate, where the first rate is an integer multiple of said second rate.

33. A device for obtaining a motion vector for a template block having pixels of Q rows and P columns in a current frame picture through a block matching processing on a search area of a predetermined size in a reference frame picture, said search area including a search window having the same width as that of the template block, and said p and Q each being an integer, comprising:
linear arrays arranged in P columns, each said linear array including;
Q/M cascaded processing elements each including a first data storage for storing M different pixel data of the template block, a second data storage for storing N different pixel data of the search window and calculation means for performing a predetermined calculation on the data stored in the first and second storage, where said N and M each are an integer and said N is an integer multiple of said M; and
third data storage for storing R different data of the search area, a sum of said R and Q being equal to the number of pixels arranged on a column of said search area.

34. A device according to claim 33, wherein said linear arrays are coupled in series to transfer data of the template block through the first storage and to transfer data of the search area through the second storage and the third storage.

35. A device for obtaining a motion vector used in a motion compensated predictive coding through a block matching processing on a current frame picture and a reference frame picture, comprising:
first storage for storing pixel data of a first template block in said current frame picture;
second storage for storing pixel data of a second template block in the current frame picture;
third storage for storing pixel data of a search window block in the reference frame picture associated with the first and second template blocks;
estimation value producing means for performing a predetermined calculation both on the pixel data of the first storage and the pixel data of the third storage and on the pixel data of the second storage and the pixel data of the third storage, to produce estimation values indicating correlationships between the first template block and the search window block and between the second template block and the search window block, and
means responsive to the estimation value producing means, for carrying out a detecting operation for detecting motion vectors for the first and second template blocks in parallel.

36. A device according to claim 35, wherein said first and second template blocks are adjacent with each other in said current frame picture.

37. A device for obtaining a motion vector used in a motion compensated predictive coding through a block matching processing on data of a template block in a current frame picture and a search area in a reference frame picture, said search area including a search window, comprising:
a processor array including a plurality of processor elements each storing pixel data of the template block and pixel data of the search window and performing a predetermined calculation on the template block pixel data and the search window pixel data, each said processor element being operable to shift data in a one-way direction,
first means responsive to outputs of the processing elements for detection a motion vector in an integer precision for the template block, and
a processor unit receiving at least one of the template block data and the search window from said processor array for detecting a motion vector in a fractional precision for the template block.

38. A device for detecting a motion vector used in a motion compensated predictive coding through a block matching processing on a current frame picture and a reference frame picture, comprising;
search means for searching a minimum value of an estimation function for a displacement vector used as an indication for searching the motion vector in the block matching processing;
detection means responsive to said search means detecting that plural estimation functions provide the same minimum value with each other for detecting an estimation function associated with a displacement vector of which a sum of absolute values of horizontal and vertical components is the smallest has a highest priority, and means responsive to the search means and the detection means, for detecting the-motion vector among the displacement vectors, the motion vector being related to an estimation function providing a minimum value or providing the minimum value and the highest priority.

39. A device for detecting a motion vector through a block matching processing on a current frame picture and a reference frame picture, comprising:

first storage provided for each pixel of a template block of the current frame picture, for storing corresponding pixel data;

second storage provided for each pixel of a search window block of a search area of the reference frame picture, for storing corresponding pixel data;

estimation means for performing a predetermined calculation on data of said first storage and data of said second storage to produce an estimation value data indicating correlationship between the template block and the search window block; and detecting means responsive to said estimation means for detecting a motion vector for the template block;

said estimation means being operable to perform said calculation for each shifting of data by one pixel through said second storage while maintaining data in said first storage.

40. A device according to claim 39, wherein said estimation means includes calculation means provided for a first plurality of pixels of the template block and for a second plurality of pixels of the search window block, for performing said predetermined calculation, and selection means provided corresponding to said calculation means for selecting data of said first and second storage for supply to the corresponding calculation means.

41. A device for detecting a motion vector through block matching processing on a current frame picture and a reference frame picture, comprising:

a plurality of one way predictional motion detecting means each for detecting a motion vector of a template block in the current frame picture according to an estimation value obtained through the block matching processing on data of the template block and a search area in the reference frame picture, each said one-way predictional motion vector detecting means receiving data of different reference frame picture from others;

a plurality of buffer storage provided corresponding to each said one way predictional motion vector detecting means, each for storing data of a partial reference picture related to the motion vector detected by a corresponding one-way predictional motion vector detecting means in the reference frame picture;

interpolation means for receiving and combining the partial reference picture data from said plurality of buffer storage to produce data of interpolated reference picture;

interpolated motion vector detecting means for performing the block matching processing on data of said template block and the interpolated reference picture to produce an estimation value indicating the result of the block matching processing; and determination means responsive to the estimation value of the interpolated motion vector detecting means and to estimation values related to the motion vectors from the plurality of one-way predictional motion detecting means, for producing a final motion vector from the motion vectors.

42. A device according to claim 41, further comprising a plurality of processing means provided corresponding to said plurality of one-way predictional motion detecting means for performing the block matching processing on data of said template block and the partial reference frame stored in a corresponding buffer storage to produce a motion vector and an estimation value for supply to said determination means.

43. A device according to claim 41, wherein said template block data are supplied to said interpolated motion vector detecting means through one of said plurality of one-way predictional motion detecting means.

44. A method of obtaining a motion vector through a block matching processing on a current frame picture and a reference frame picture, storing data of a template block of the current frame picture in first storage elements;

storing data of a search window block of the reference frame picture on second storage elements;

performing a predetermined calculation on data stored in said first and second storage elements to generate an estimation value indicating correlationship between the template block and the search window block;

shifting data through said second storage elements in a one-way direction to load data of another search window block in said second storage elements;

repeating the steps of performing and shifting until all search window blocks in a search area related to said template block are subject to the estimation; and determining a motion vector according to the estimation values.

45. A method according to claim 44, wherein said step of performing includes the steps of;

selecting a plurality of sets of data from said first and second storage elements sequentially, and performing the calculation by calculators one provided for the plurality of sets, each said calculator sequentially performing sequentially the calculation on the plurality of sets of data.

* * * * *